(12) United States Patent
Padmanabhan et al.

(10) Patent No.: US 11,288,280 B2
(45) Date of Patent: Mar. 29, 2022

(54) SYSTEMS, METHODS, AND APPARATUSES FOR IMPLEMENTING CONSUMER DATA VALIDATION, MATCHING, AND MERGING ACROSS TENANTS WITH OPTIONAL VERIFICATION PROMPTS UTILIZING BLOCKCHAIN

(71) Applicant: salesforce.com, inc., San Francisco, CA (US)

(72) Inventors: Prithvi Krishnan Padmanabhan, San Ramon, CA (US); Lik Mui, Hayward, CA (US)

(73) Assignee: salesforce.com, inc., San Francisco, CA (US)

( * ) Notice: Subject to any disclaimer, the term of this patent is extended or adjusted under 35 U.S.C. 154(b) by 297 days.

(21) Appl. No.: 16/683,932

(22) Filed: Nov. 14, 2019

(65) Prior Publication Data
US 2020/0133955 A1    Apr. 30, 2020

Related U.S. Application Data

(63) Continuation-in-part of application No. 16/177,305, filed on Oct. 31, 2018.
(Continued)

(51) Int. Cl.
*G06F 16/25* (2019.01)
*H04L 9/32* (2006.01)
(Continued)

(52) U.S. Cl.
CPC .......... *G06F 16/25* (2019.01); *G06F 16/2379* (2019.01); *G06Q 30/01* (2013.01);
(Continued)

(58) Field of Classification Search
None
See application file for complete search history.

(56) References Cited

U.S. PATENT DOCUMENTS

| 5,634,053 A | 5/1997 | Noble et al. |
| 6,333,929 B1 | 12/2001 | Drottar et al. |

(Continued)

FOREIGN PATENT DOCUMENTS

| CN | 108021986 A | 5/2018 |
| CN | 109173261 A | 1/2019 |

(Continued)

OTHER PUBLICATIONS

"Deloitte IoT Powered by Blockchain", dated May 2017, 20 pages.
(Continued)

*Primary Examiner* — Giuseppi Giuliani
(74) *Attorney, Agent, or Firm* — Elliott, Ostrander & Preston, P.C.

(57) ABSTRACT

Systems, methods, and apparatuses for implementing consumer data validation, matching, and merging across tenants with optional verification prompts utilizing blockchain technologies in conjunction with a cloud based computing environment are described herein. For example, according to one embodiment there is a system having at least a processor and a memory therein executing within a host organization and having therein, means for: operating multiple cloud platforms on behalf of a plurality of merchants, in which each of the multiple cloud platforms store customer records on behalf of the plurality of merchants; retrieving a first customer record associated with a first tenant of the host organization using one of the multiple cloud platforms; retrieving a second customer record for comparison with the first customer record, in which the second customer record is either a customer record from any of the multiple cloud platforms which is associated with a second tenant of the
(Continued)

host organization or a customer record associated with the first tenant from a different one of the multiple cloud platforms; determining at least a partial match exists for the first customer record and the second customer record and generating a candidate record with a proposed data merge of the first and second customer records; creating a new global ID for a user represented by the generated candidate record; issuing a transaction to the blockchain with a new asset embodying the candidate record; and subjecting the new asset to consensus by one of: (i) the user represented by the candidate record, (ii) the first tenant, (iii) the second tenant, or any combination thereof. Other related embodiments are disclosed.

22 Claims, 25 Drawing Sheets

Related U.S. Application Data

(60) Provisional application No. 62/840,074, filed on Apr. 29, 2019, provisional application No. 62/839,521, filed on Apr. 26, 2019, provisional application No. 62/839,525, filed on Apr. 26, 2019, provisional application No. 62/839,561, filed on Apr. 26, 2019, provisional application No. 62/839,523, filed on Apr. 26, 2019, provisional application No. 62/839,529, filed on Apr. 26, 2019, provisional application No. 62/839,462, filed on Apr. 26, 2019.

(51) Int. Cl.
  *G06F 16/23* (2019.01)
  *G06Q 30/00* (2012.01)
  *G06K 9/00* (2006.01)

(52) U.S. Cl.
  CPC ........ *H04L 9/3221* (2013.01); *G06K 9/00013* (2013.01); *G06K 9/00604* (2013.01); *H04L 2209/38* (2013.01)

(56) References Cited

U.S. PATENT DOCUMENTS

| | | | |
|---|---|---|---|
| 7,587,348 B2 | 9/2009 | Liao et al. | |
| 8,095,463 B1 | 1/2012 | Hartmaier | |
| 9,027,094 B1 | 5/2015 | Balazs et al. | |
| 9,569,700 B1 | 2/2017 | Santos et al. | |
| 9,690,822 B2 | 6/2017 | Roy-Faderman | |
| 9,978,067 B1 | 5/2018 | Sadaghiani et al. | |
| 10,042,636 B1 | 8/2018 | Srivastava et al. | |
| 10,311,230 B2 | 6/2019 | Jagadeesan et al. | |
| 10,425,399 B2 | 9/2019 | Kravitz et al. | |
| 10,482,466 B1 | 11/2019 | Walters et al. | |
| 10,505,726 B1 | 12/2019 | Andon et al. | |
| 10,521,196 B1 | 12/2019 | Wang et al. | |
| 10,521,780 B1 | 12/2019 | Hopkins, III et al. | |
| 10,541,821 B2 | 1/2020 | Toll et al. | |
| 10,762,506 B1 | 9/2020 | Cash et al. | |
| 10,885,567 B2 | 1/2021 | Bhattacherjee et al. | |
| 2005/0102159 A1 | 5/2005 | Mondshine | |
| 2006/0259361 A1 | 11/2006 | Barhydt et al. | |
| 2008/0066165 A1 | 3/2008 | Rosenoer | |
| 2009/0037949 A1 | 2/2009 | Birch | |
| 2011/0289140 A1 | 11/2011 | Pletter et al. | |
| 2013/0041934 A1 | 2/2013 | Annamalaisami et al. | |
| 2013/0346173 A1 | 12/2013 | Chandoor | |
| 2014/0278894 A1 | 9/2014 | Toumayan et al. | |
| 2015/0026061 A1 | 1/2015 | Siegel et al. | |
| 2016/0027229 A1 | 1/2016 | Spanos et al. | |
| 2016/0092872 A1 | 3/2016 | Prakash et al. | |
| 2016/0148251 A1 | 5/2016 | Thomas et al. | |
| 2016/0350860 A1 | 12/2016 | Dintenfass et al. | |
| 2016/0358267 A1 | 12/2016 | Arjomand et al. | |
| 2017/0046698 A1 | 2/2017 | Haldenby et al. | |
| 2017/0085545 A1 | 3/2017 | Lohe et al. | |
| 2017/0103167 A1 | 4/2017 | Shah | |
| 2017/0132625 A1 | 5/2017 | Kennedy | |
| 2017/0140145 A1 | 5/2017 | Shah | |
| 2017/0200157 A1 | 7/2017 | Bergeon et al. | |
| 2017/0206603 A1 | 7/2017 | Al-Masoud | |
| 2017/0236215 A1 | 8/2017 | Eisen et al. | |
| 2017/0295021 A1 | 10/2017 | Gutiérrez et al. | |
| 2017/0295023 A1 | 10/2017 | Madhavan et al. | |
| 2017/0300876 A1 | 10/2017 | Musiala, Jr. et al. | |
| 2017/0337534 A1 | 11/2017 | Goeringer et al. | |
| 2017/0344988 A1 | 11/2017 | Cusden et al. | |
| 2017/0353309 A1 | 12/2017 | Gray | |
| 2017/0364549 A1 | 12/2017 | Abalos | |
| 2018/0005186 A1 | 1/2018 | Hunn | |
| 2018/0006831 A1 | 1/2018 | Toll et al. | |
| 2018/0019879 A1 | 1/2018 | Kravitz et al. | |
| 2018/0026505 A1 | 1/2018 | Galmiche et al. | |
| 2018/0041345 A1 | 2/2018 | Maim | |
| 2018/0082256 A1 | 3/2018 | Tummuru et al. | |
| 2018/0088928 A1 | 3/2018 | Smith et al. | |
| 2018/0123779 A1 | 5/2018 | Zhang | |
| 2018/0139186 A1* | 5/2018 | Castagna | H04L 9/3242 |
| 2018/0144042 A1 | 5/2018 | Sheng et al. | |
| 2018/0158162 A1 | 6/2018 | Ramasamy | |
| 2018/0165416 A1 | 6/2018 | Saxena et al. | |
| 2018/0189100 A1 | 7/2018 | Nemoto et al. | |
| 2018/0191503 A1 | 7/2018 | Alwar et al. | |
| 2018/0204213 A1 | 7/2018 | Zappier et al. | |
| 2018/0218176 A1 | 8/2018 | Voorhees et al. | |
| 2018/0225611 A1 | 8/2018 | Daniel et al. | |
| 2018/0232644 A1 | 8/2018 | Acharya et al. | |
| 2018/0232659 A1 | 8/2018 | Ranatunga et al. | |
| 2018/0247191 A1 | 8/2018 | Katz et al. | |
| 2018/0253661 A1 | 9/2018 | Strauss | |
| 2018/0262505 A1 | 9/2018 | Ligatti | |
| 2018/0268506 A1 | 9/2018 | Wodetzki et al. | |
| 2018/0276553 A1 | 9/2018 | Redkar et al. | |
| 2018/0276626 A1 | 9/2018 | Laiben | |
| 2018/0307993 A1 | 10/2018 | Chawla et al. | |
| 2018/0365686 A1 | 12/2018 | Kondo | |
| 2018/0367528 A1 | 12/2018 | Schwarz et al. | |
| 2019/0012249 A1 | 1/2019 | Mercuri et al. | |
| 2019/0012595 A1 | 1/2019 | Beser et al. | |
| 2019/0019090 A1 | 1/2019 | Chacko et al. | |
| 2019/0028276 A1 | 1/2019 | Pierce et al. | |
| 2019/0034404 A1 | 1/2019 | Anderson et al. | |
| 2019/0035018 A1 | 1/2019 | Nolan et al. | |
| 2019/0050855 A1 | 2/2019 | Martino et al. | |
| 2019/0052454 A1 | 2/2019 | Wright et al. | |
| 2019/0058709 A1 | 2/2019 | Kempf et al. | |
| 2019/0081796 A1 | 3/2019 | Chow et al. | |
| 2019/0086988 A1 | 3/2019 | He et al. | |
| 2019/0087598 A1 | 3/2019 | Adkins et al. | |
| 2019/0087892 A1 | 3/2019 | Pinski et al. | |
| 2019/0102409 A1 | 4/2019 | Shi et al. | |
| 2019/0102423 A1 | 4/2019 | Little et al. | |
| 2019/0109702 A1 | 4/2019 | Maggu et al. | |
| 2019/0109713 A1 | 4/2019 | Clark et al. | |
| 2019/0122186 A1 | 4/2019 | Kano et al. | |
| 2019/0147532 A1 | 5/2019 | Singh et al. | |
| 2019/0149325 A1 | 5/2019 | Garagiola et al. | |
| 2019/0149334 A1 | 5/2019 | Velden | |
| 2019/0158270 A1 | 5/2019 | Berti | |
| 2019/0164156 A1 | 5/2019 | Lindemann | |
| 2019/0164220 A1 | 5/2019 | Raj et al. | |
| 2019/0172282 A1 | 6/2019 | Patel | |
| 2019/0182047 A1 | 6/2019 | Andreina et al. | |
| 2019/0188706 A1 | 6/2019 | McCurtis | |
| 2019/0215149 A1 | 7/2019 | Ramasamy et al. | |
| 2019/0228006 A1 | 7/2019 | Tormasov et al. | |
| 2019/0236559 A1 | 8/2019 | Padmanabhan | |
| 2019/0236562 A1 | 8/2019 | Padmanabhan | |
| 2019/0236598 A1 | 8/2019 | Padmanabhan | |
| 2019/0236606 A1 | 8/2019 | Padmanabhan et al. | |
| 2019/0238316 A1 | 8/2019 | Padmanabhan | |

(56) References Cited

U.S. PATENT DOCUMENTS

| | | |
|---|---|---|
| 2019/0238525 A1 | 8/2019 | Padmanabhan et al. |
| 2019/0287026 A1 | 9/2019 | Calmon et al. |
| 2019/0287116 A1 | 9/2019 | Karantzis |
| 2019/0295114 A1 | 9/2019 | Pavletic et al. |
| 2019/0303121 A1 | 10/2019 | Padmanabhan |
| 2019/0303445 A1 | 10/2019 | Padmanabhan |
| 2019/0303579 A1 | 10/2019 | Reddy et al. |
| 2019/0334716 A1 | 10/2019 | Kocsis et al. |
| 2019/0370634 A1 | 12/2019 | Moreno et al. |
| 2019/0370866 A1* | 12/2019 | Lawbaugh ......... G06Q 30/0254 |
| 2019/0377806 A1 | 12/2019 | Padmanabhan et al. |
| 2019/0385160 A1 | 12/2019 | Safak et al. |
| 2019/0386834 A1 | 12/2019 | Furukawa |
| 2020/0019923 A1 | 1/2020 | Santhar et al. |
| 2020/0027005 A1 | 1/2020 | Harrison et al. |
| 2020/0027090 A1 | 1/2020 | Braundmeier |
| 2020/0042939 A1 | 2/2020 | Padmanabhan |
| 2020/0074477 A1 | 3/2020 | Lamba et al. |
| 2020/0074515 A1 | 3/2020 | Ghatage et al. |
| 2020/0076574 A1 | 3/2020 | Austin et al. |
| 2020/0089672 A1 | 3/2020 | Velisetti et al. |
| 2020/0089895 A1 | 3/2020 | Gollogly |
| 2020/0104636 A1 | 4/2020 | Halevi et al. |
| 2020/0118011 A1 | 4/2020 | Kaiser et al. |
| 2020/0143267 A1 | 5/2020 | Gidney |
| 2020/0186338 A1 | 6/2020 | Andon et al. |
| 2020/0252406 A1 | 8/2020 | Padmanabhan et al. |
| 2020/0336475 A1 | 10/2020 | Padmanabhan et al. |
| 2020/0344132 A1 | 10/2020 | Padmanabhan |
| 2020/0357084 A1 | 11/2020 | Hunn et al. |
| 2021/0152535 A1 | 5/2021 | Padmanabhan et al. |
| 2021/0152536 A1 | 5/2021 | Padmanabhan et al. |

FOREIGN PATENT DOCUMENTS

| | | | |
|---|---|---|---|
| CN | 2019800219289 | | 9/2020 |
| EP | 197071681 | | 8/2020 |
| JP | 2020541893 | | 7/2020 |
| WO | 2016161073 | A1 | 10/2016 |
| WO | 2018007827 | A1 | 1/2018 |
| WO | 2018007828 | A2 | 1/2018 |
| WO | 2018194707 | A1 | 10/2018 |
| WO | 2018230581 | A1 | 12/2018 |
| WO | 2019152750 | A1 | 8/2019 |

OTHER PUBLICATIONS

"How Creating Digital Twins In Blockchain Will Protect Brands?", dated Nov. 15, 2018, 4 pages.

"How Smart Certificates of Authenticity Improve Asset Management", Jan. 17, 2019, 4 pages.

"Nasdaq, Using Blockchain Track Assets Proof Ownership", dated Nov. 30, 2016, 30 pages.

Final Office Action for U.S. Appl. No. 15/885,803, dated Jul. 20, 2020, 29 pages.

Final Office Action for U.S. Appl. No. 15/885,811, dated Aug. 5, 2020, 45 pages.

Final Office Action for U.S. Appl. No. 15/932,092 dated Jun. 22, 2020, 42 pages.

Final Office Action for U.S. Appl. No. 15/932,099 dated Jun. 1, 2020, 26 pages.

International Search Report and Written Opinion for Application No. PCT/US2020/01561B dated May 11, 2020, 13 pages.

Notice of allowance for U.S. Appl. No. 16/264,653 dated Nov. 23, 2020, 16 pages.

Notice of Allowance for U.S. Appl. No. 15/932,100, dated Feb. 20, 2020, 5 pages.

Office Action for U.S. Appl. No. 16/177,305 dated Jul. 23, 2020, 41 pages.

Office Action for U.S. Appl. No. 16/264,657, dated Sep. 18, 2020, 33 pages.

Office Action for U.S. Appl. No. 16/683,945 dated Sep. 14, 2020, 26 Pages.

Office Action for U.S. Appl. No. 15/932,099 dated Oct. 3, 2019, 26 pages.

Office Action for EP Application No. 19707168.1 dated Sep. 24, 2020, 3 pages.

U.S. Appl. No. 17/153,872, filed Jan. 20, 2021, Prithvi Krishnan Padmanabhan.

U.S. Appl. No. 17/163,547, filed Jan. 31, 2021, Prithvi Krishnan Padmanabhan.

U.S. Appl. No. 17/348,286, filed Jun. 15, 2021, Prithvi Krishnan Padmanabhan.

Bendor-Samuel, P. (2017) Blockchain-enabled "smart-contracts" solve problems in administering IT ecosystem services, CIO, 3 pages.

Final Office Action for U.S. Appl. No. 15/932,099 dated Jun. 1, 2020, 27 pages.

Final Office Action for U.S. Appl. No. 16/177,305 dated Feb. 2, 2021, 47 pages.

Final Office Action for U.S. Appl. No. 16/264,657 dated May 17, 2021, 36 pages.

Non-final Office Action for U.S. Appl. No. 16/177,305 dated Jul. 23, 2020, 52 pages.

Normans Media Ltd., Smart Contracts: Blockchain-based contracts that don't require lawyers. 2016, 4 pages.

Notice of Allowance for U.S. Appl. No. 16/264,653 dated Jun. 7, 2021, 21 pages.

Notice of Allowance for U.S. Appl. No. 16/683,945, dated Feb. 10, 2021, 14 pages.

Office Action for U.S. Appl. No. 15/885,803, dated Apr. 14, 2021, 31 pages.

Office Action for U.S. Appl. No. 15/932,092 dated Mar. 17, 2021, 23 pages.

Office Action for U.S. Appl. No. 16/177,300 dated Jun. 16, 2021, 80 pages.

Office Action for U.S. Appl. No. 16/683,945, dated Sep. 14, 2020, 18 pages.

Shukla, A., et al., "Smart Contracts for Multiagent Plan Execution in Untrusted Cyber-physical Systems," 2018 IEEE 25th International Conference on High Performance Computing Workshops (HiPCW), 10 pages.

"BigchainDB 2.0 The Blockchain Database," Berlin Germany dated May 2018, 14 pages.

Azaria, A., et al. "MedRec: Using Blockchain for Medical Data Access and Permission Management," 2016 2nd Int'l Conference on Open and Big Data, IEEE, (Aug. 22, 2016), pp. 25-30.

Genestier, P., et al., "Blockchain for Consent Management in the eHealth Environment: A Nugget for Privacy and Security Challenges," Journal of the Int'l Society for Telemedicine and eHealth, (Jan. 1, 2017), 4 pages.

International Search Report and Written Opinion for Application No. PCT/US2019/036103, dated Aug. 1, 2019, 12 pages.

International Search Report and Written Opinion for International Patent Application No. PCT/US2019/016199, dated Apr. 2, 2019, 12 pages.

McConaghy et al., "BigchainDB: A Scalable Blockchain Database (DRAFT)" dated Jun. 8, 2016.

Notice of Allowance for U.S. Appl. No. 15/940,646, dated Oct. 31, 2019, 8 pages.

Office Action for U.S. Appl. No. 15/885,803 dated Jan. 8, 2020, 47 pages.

Office Action for U.S. Appl. No. 15/885,811 dated Jan. 17, 2020, 40 pages.

Office Action for U.S. Appl. No. 15/932,092 dated Jan. 22, 2020, 36 pages.

Office Action for U.S. Appl. No. 15/932,100, dated Nov. 8, 2019, 9 pages.

Office Action for U.S. Appl. No. 15/940,646, dated Apr. 29, 2019, 7 pages.

Ojha, "Chaincode for Go Developers, Part 1: Writing Blockchain Chaincode in Go for Hyperledger Fabric v0.6," 2017, 15 pages.

Peterson, K., et al, "A Blockchain-Based Approach to Health Information Exchange Networks," (Aug. 8, 2016), Retrieved from

(56) References Cited

OTHER PUBLICATIONS the Internet: URL: http://kddlab.zjgsu.edu.cn:7200/research/blockchain/huyiyang-reference/A%20Blockchain-Based%20Approach%20to%20Health%20Information%20Exchange.pdf, Retrieved on Mar. 21, 2019), 10 pages.

Salesforce, "Force.com Apex Code Developer's Guide," version 34.0, 2015, 1000 pages.

Sandgaard, J., et al., "MedChain White Paper V1.1," (Oct. 1, 2017), Retrieved from the Internet: URL:https://www.medchain.global/doc/Medchain%20Whitepaper%20v1.1.pdf, Retrieved on Mar. 21, 2019, 54 pages.

Using Sawtooth with Docker: Configuring the List of Transaction Families, Apr. 6, 2018, 13 pages.

Wikipedia, "Federate database system," Jun. 8, 2016, https://en.wikipedia.org/w/index.php/?title=Federated%20database%20system&oldid=808166410, 6 pages.

Wikipedia, "Solidity," Feb. 2, 2017, https://web.archive.org/web/2017020202304/https://en.wikipeida.org/wiki/Solidity (Year: 2017), 3 pages.

Zyskind, G., et al., "Decentralizing Privacy: Using Blockchain to Protect Personal Data," 2015 IEEE Security and Privacy Workshops (May 1, 2015), 5 pages.

\* cited by examiner

FIG. 4F

Customer User Device 499

Graphical User Interface (GUI) 403

Record Matching Rule Engine 431

Rule Information 432
Rule Name: Name Match Exact Phone
Rule Description: Fluffy First Name Match Permitted, Last name Exact with Exact Phone Matching Criteria 433
Criteria: Lorem ipsum odio ultricies rhoncus senectus sociosqu phasellus Action 432
[Cancel] [Save and Activate]

Match Preview

< 5 of 30 Samples >

| Sample Record | Potential Match Record | Field Match | Match Results |
|---|---|---|---|
| First Name: John<br>Last Name: Doe<br>Phone: 555-555-5555 | John<br>Doe<br>555-555-5555 | ✓<br>✓<br>✓ | ✓ Matched |
| First Name: John<br>Last Name: Doe<br>Phone: 555-555-5555 | Jane<br>Smith<br>555-123-4567 | ⊘<br>⊘<br>⊘ | ⊘ Not Matched |
| First Name: John<br>Last Name: Doe<br>Phone: 555-555-5555 | Jonathon<br>Doe<br>555-555-5555 | ✓<br>✓<br>✓ | ✓ Matched |
| First Name: Bob<br>Last Name: Jones<br>Phone: 555-555-5555 | Robert<br>Doe<br>555-999-9999 | ✓<br>⊘<br>⊘ | ⊘ Not Matched |

405

FIG. 4G
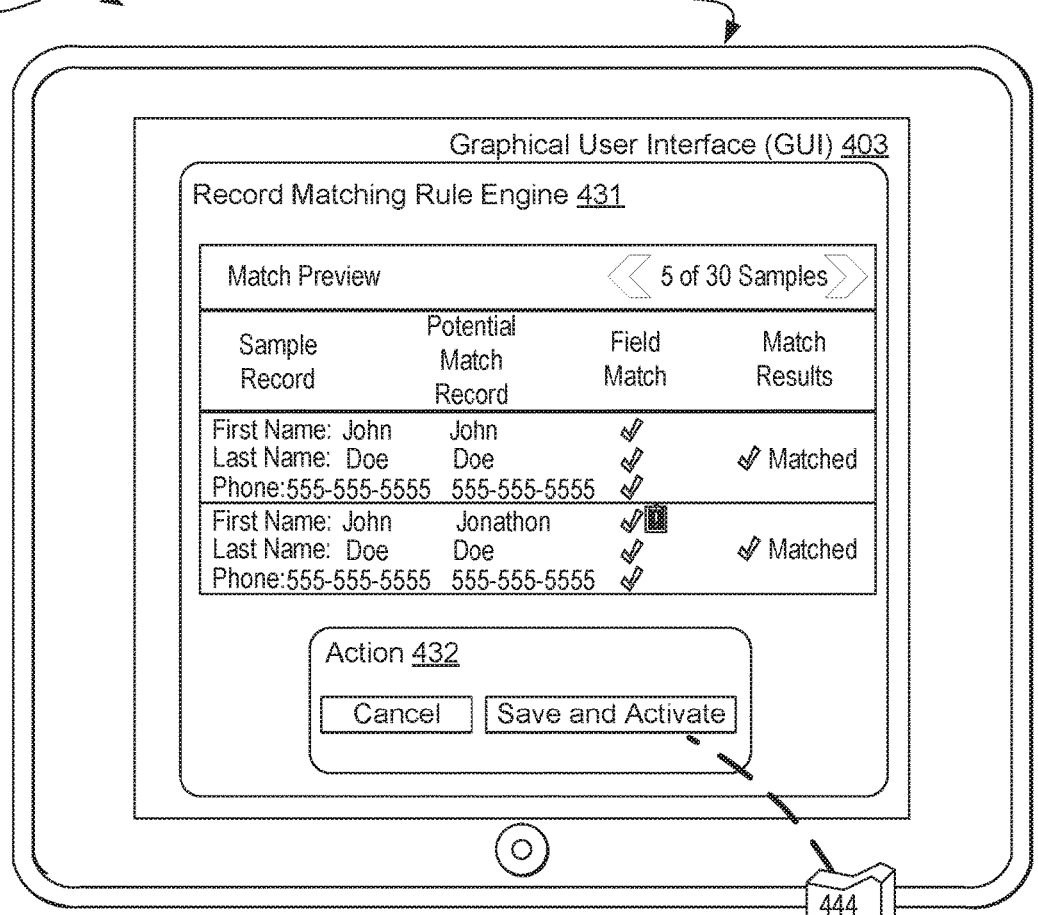
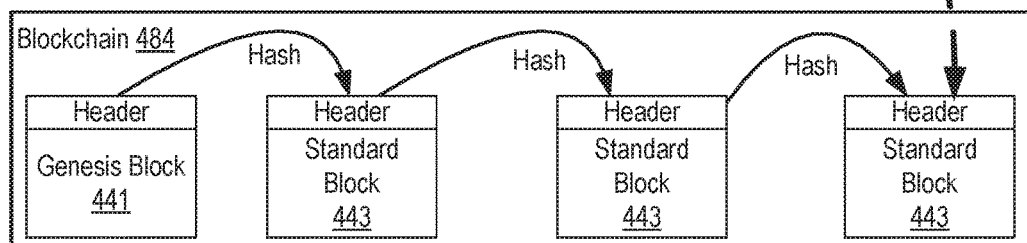
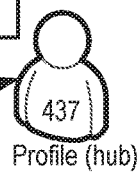

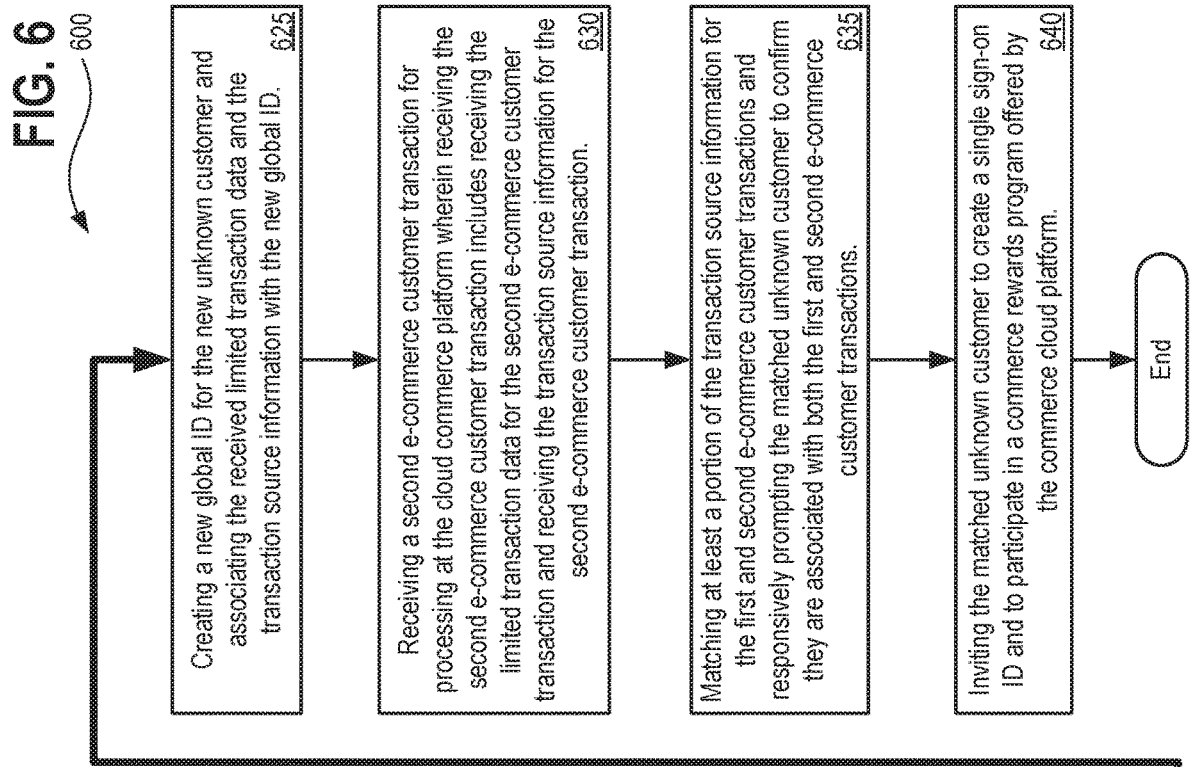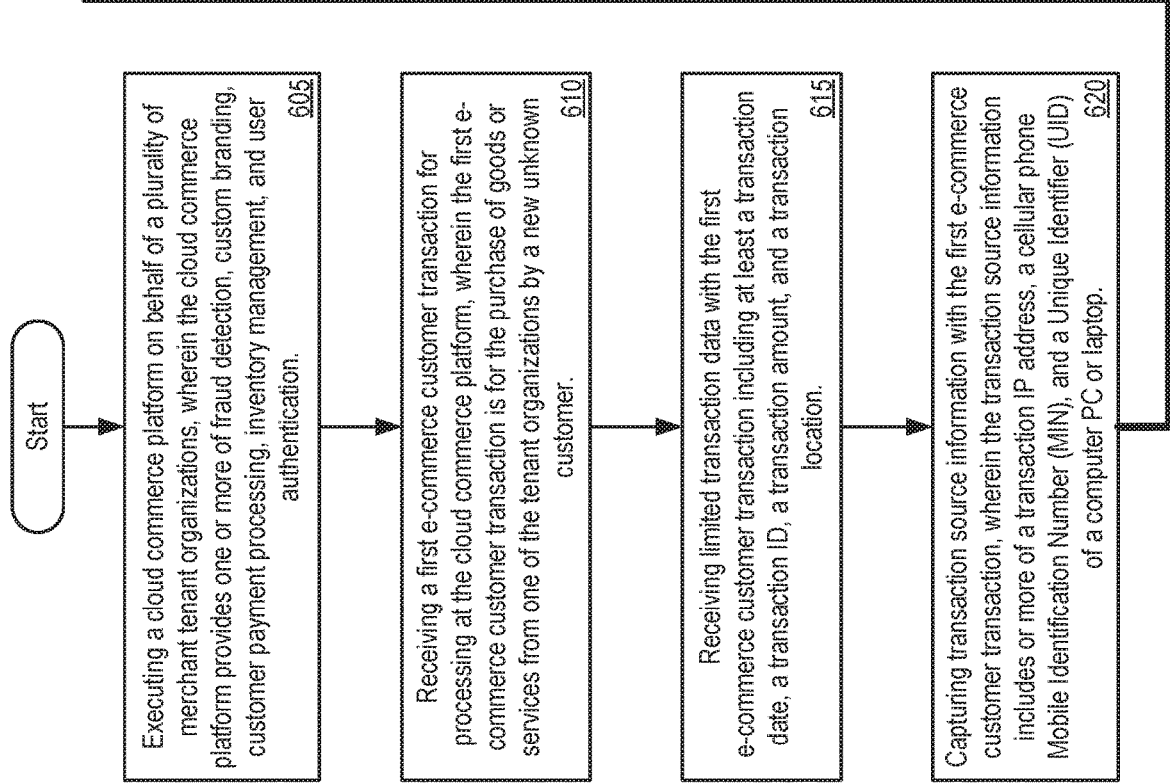

FIG. 7

```
                            ┌─────────┐
                            │  Start  │
                            └────┬────┘
                                 ▼
┌──────────────────────────────────────────────────────────────────────┐
│ Operating a commerce cloud platform on behalf of a plurality of       │
│ merchants, in which the commerce cloud platform provides at least     │
│ customer payment processing on behalf of the plurality of merchants.  │
│                                                                  705  │
└──────────────────────────────────────────────────────────────────────┘
                                 ▼
┌──────────────────────────────────────────────────────────────────────┐
│ Receiving a first purchase transaction for an unknown customer from a │
│ first one of the plurality of merchants, in which the purchase        │
│ transaction indicates transaction source information.                 │
│                                                                  710  │
└──────────────────────────────────────────────────────────────────────┘
                                 ▼
┌──────────────────────────────────────────────────────────────────────┐
│ Creating a new global ID for the unknown customer and associating the │
│ purchase transaction and the transaction source information with the  │
│ new global ID at the commerce cloud platform.                         │
│                                                                  715  │
└──────────────────────────────────────────────────────────────────────┘
                                 ▼
┌──────────────────────────────────────────────────────────────────────┐
│ Allocating commerce rewards points to the unknown customer via the    │
│ new global ID based on the first purchase transaction.                │
│                                                                  720  │
└──────────────────────────────────────────────────────────────────────┘
                                 ▼
┌──────────────────────────────────────────────────────────────────────┐
│ Receiving a second purchase transaction for the unknown customer from │
│ a second one of the plurality of merchants, in which the second       │
│ purchase transaction indicates transaction source information for the │
│ second purchase transaction.                                     725  │
└──────────────────────────────────────────────────────────────────────┘
                                 ▼
┌──────────────────────────────────────────────────────────────────────┐
│ Prompting the unknown customer associated with the second purchase    │
│ transaction to confirm they are associated with the first transaction │
│ based on at least a partial matching of the transaction source        │
│ information associated with the first and second purchase             │
│ transactions.                                                    730  │
└──────────────────────────────────────────────────────────────────────┘
                                 ▼
┌──────────────────────────────────────────────────────────────────────┐
│ Inviting the unknown customer to participate in a commerce rewards    │
│ program to redeem the commerce rewards points.                        │
│                                                                  735  │
└──────────────────────────────────────────────────────────────────────┘
                                 ▼
                            ┌─────────┐
                            │   End   │
                            └─────────┘
```

700

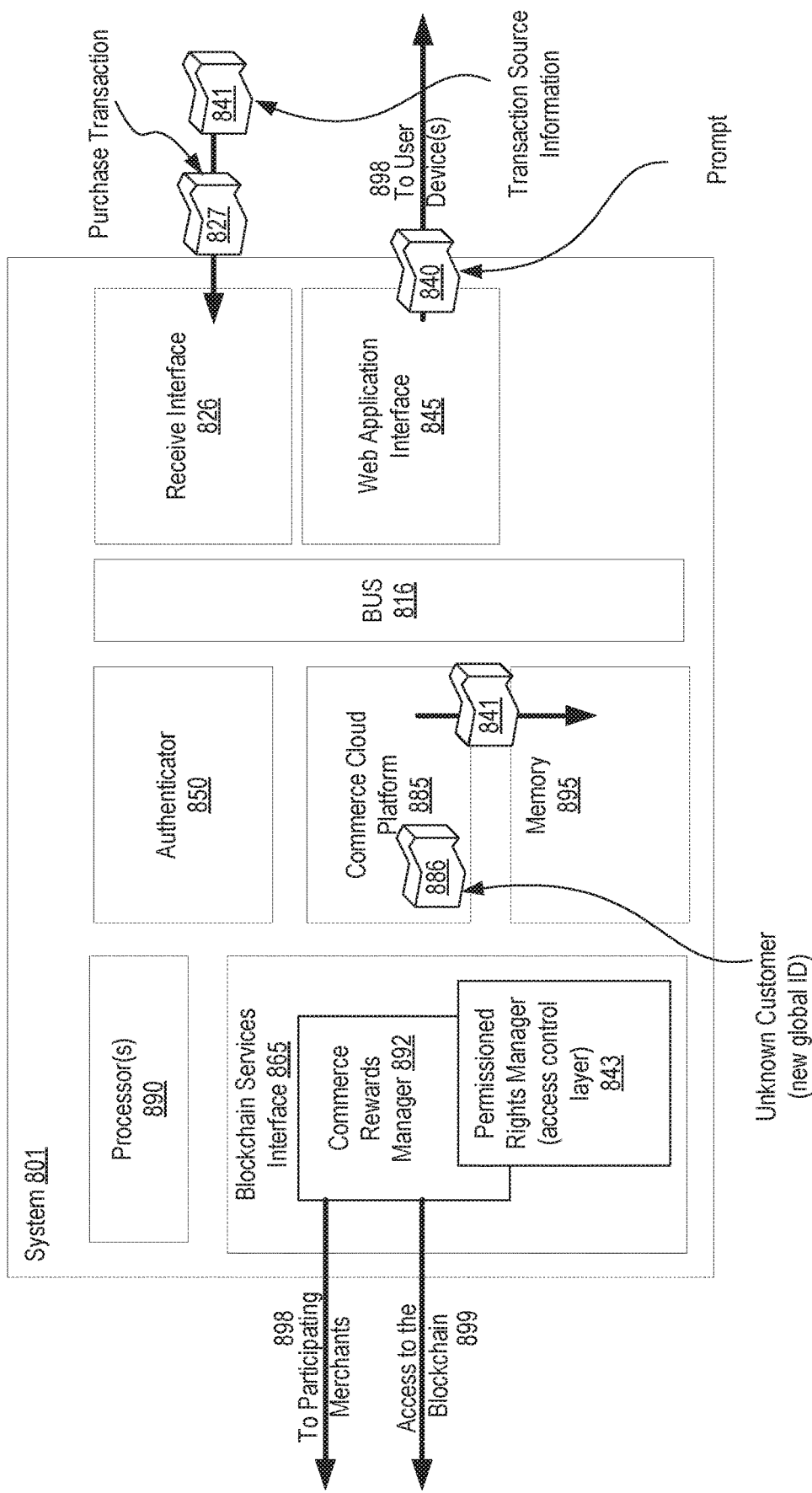

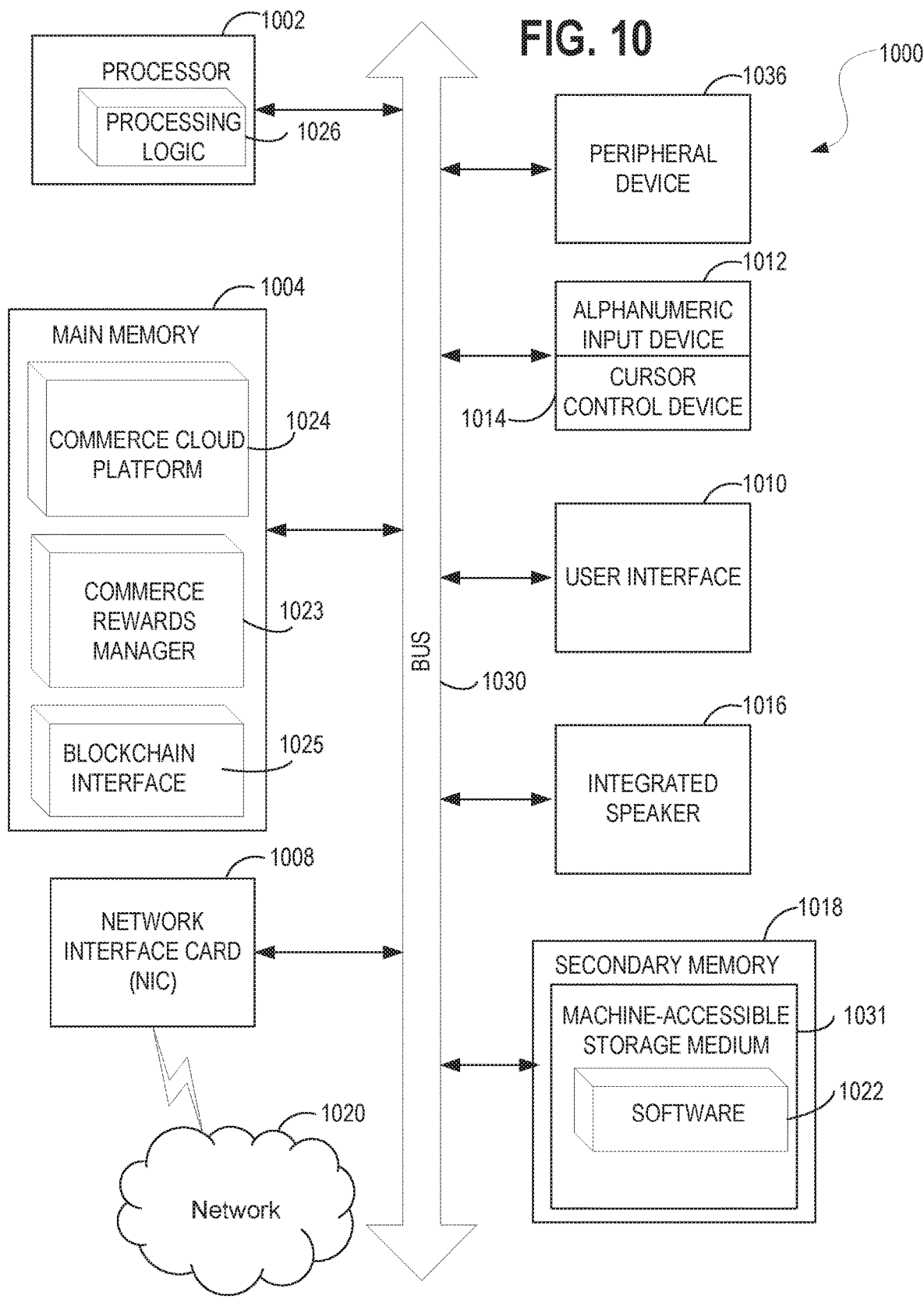

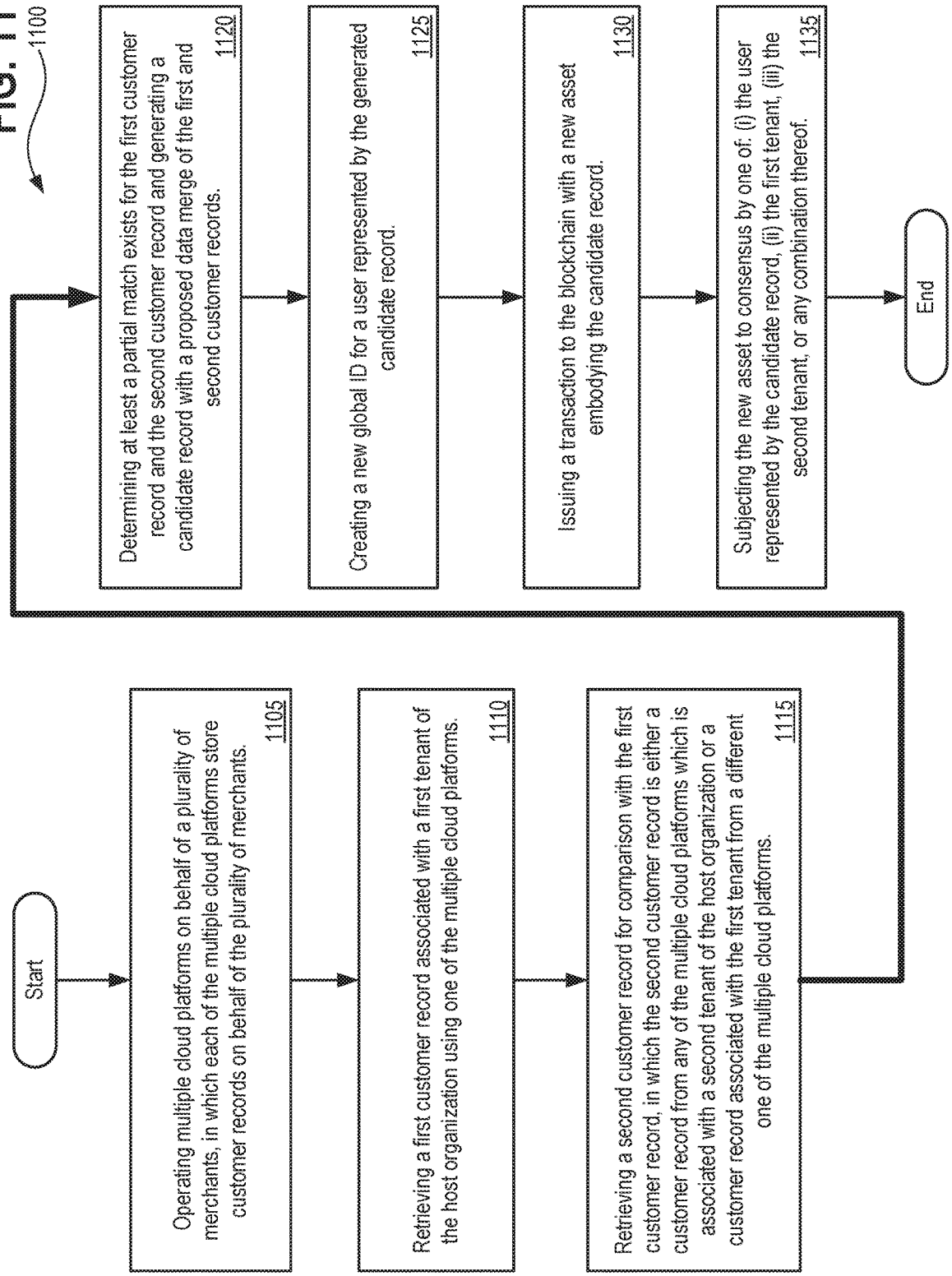

SYSTEMS, METHODS, AND APPARATUSES FOR IMPLEMENTING CONSUMER DATA VALIDATION, MATCHING, AND MERGING ACROSS TENANTS WITH OPTIONAL VERIFICATION PROMPTS UTILIZING BLOCKCHAIN

CLAIM OF PRIORITY

This United States Continuation-In-Part (CIP) patent application is related to, and claims priority to, the non-provisional U.S. Utility patent application entitled "Systems, Methods, and Apparatuses for Implementing Commerce Rewards Across Tenants for Commerce Cloud Customers Utilizing Blockchain," filed Oct. 31, 2018, having an application number of Ser. No. 16/177,305, and is further related to and claims priority to the provisional U.S. Utility patent application entitled "Systems, Methods, and Apparatuses for Implementing a Metadata Driven Rules Engine on Blockchain Using Distributed Ledger Technology (DLT)," filed Apr. 29, 2019, having an application number of 62/840,074, and is further related to and claims priority to the provisional U.S. Utility patent application entitled "Systems, Methods, and Apparatuses for Implementing Consumer Data Validation, Matching, and Merging Across Tenants with Optional Verification Prompts Utilizing Blockchain," filed Apr. 26, 2019, having an application number of 62/839,462, and is further related to and claims priority to the provisional U.S. Utility patent application entitled "Systems, Methods, and Apparatuses for Implementing a Multi Tenant Blockchain Platform for Managing Einstein Platform Decisions Using Distributed Ledger Technology (DLT)," filed Apr. 26, 2019, having an application number of 62/839,521, and is further related to and claims priority to the provisional U.S. Utility patent application entitled "Systems, Methods, and Apparatuses for Dynamically Assigning Nodes to a Group within Blockchains based on Transaction Type and Node Intelligence Using Distributed Ledger Technology (DLT)," filed Apr. 26, 2019, having an application number of 62/839,523, and is further related to and claims priority to the provisional U.S. Utility patent application entitled "Systems, Methods, and Apparatuses for Protecting Consumer Data Privacy Using Solid, Blockchain and IPFS Integrated With A Marketing Cloud Platform," filed Apr. 26, 2019, having an application number of 62/839,525, and is further related to and claims priority to the provisional U.S. Utility patent application entitled "Systems, Methods, and Apparatuses for Distributing a Metadata Driven Application to Customers and Non-Customers of a Host Organization using Distributed Ledger Technology (DLT)," filed Apr. 26, 2019, having an application number of 62/839,561, and is further related to and claims priority to the provisional U.S. Utility patent application entitled "Systems, Methods, and Apparatuses For Implementing an SQL Query And Filter Mechanism for Blockchain Stored Data using Distributed Ledger Technology (DLT)," filed Apr. 26, 2019, having an application number of 62/839,529, the entire contents of each being incorporated herein by reference in their entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments disclosed herein relate generally to the field of distributed ledger technology and blockchain platforms. More particularly, disclosed embodiments relate to systems, methods, and apparatuses for implementing consumer data validation, matching, and merging across tenants with optional verification prompts utilizing blockchain technologies in conjunction with a cloud based computing environment.

BACKGROUND

The subject matter discussed in the background section is not to be considered prior art merely because of its mention in the background section. Similarly, a problem mentioned in the background section or associated with the subject matter of the background section shall not be considered to have been previously recognized in the prior art. The subject matter in the background section merely represents different approaches, which in and of themselves, may also correspond to claimed embodiments.

In modern financial systems, assets such as currencies or securities are typically held and traded electronically. Transferring assets often requires point-to-point interaction between multiple intermediaries, and reconciliation of duplicated ledgers. This system has some disadvantages, such as the time required for settlement of asset transfers or payments, which often takes days. Moreover, transfers often involve fee payments to multiple intermediaries, and reconciliation involves expensive overhead. Further still, it may be difficult to determine the status of a pending transfer or the current owner of an asset. Other potential problems include transfers that fail to complete, leading to uncertainty within such a system. Still further, such systems are very often restricted insomuch that it is difficult or infeasible to make one transfer conditional on another. Lastly, the complexity of such systems makes it difficult to prevent fraud or theft, and, whether transactions are reversible depends on the transfer mechanism, rather than the business requirements of the transacting party.

Such problems are exacerbated when seeking to provide customers with commerce rewards (e.g., such as points, credits, or other incentives) for their loyalty and financial patronage. Such commerce rewards are customarily tied to a particular merchant and very difficult to share across multiple merchants. Moreover, there is little financial incentive for businesses to pay fees to enable an exchange system amongst various merchants as there is likely to be no return to the merchants to support such a system.

Many of these problems may be fixed if asset ownership were recorded on a single shared ledger. However, a combination of practical and technological constraints have made such ledgers difficult to adopt. Such a shared ledger would tend to require trust in a single party. That party would need to have the technical capacity to process every transaction in real time. Additionally, to address the disadvantages discussed above, the ledger would need to support more sophisticated logic than simple ownership changes. In 2009, a person or group of persons operating under the pseudonym Satoshi Nakamoto introduced Bitcoin, the first implementation of a protocol that enables issuance of a digital bearer instrument without a trusted third party, using an electronic ledger replication system known as a blockchain. Bitcoin solves the problem of implementing decentralized digital cash, but its security model limits its efficiency and throughput, its design only supports a single asset, and its virtual machine has only limited support for custom programs that determine asset movement, sometimes called smart contracts.

Ethereum, introduced in 2015, generalizes the concept of a blockchain to a fully programmable state replication mechanism. While it includes a much more powerful programming language, it presents additional challenges for scalability and efficiency.

In contrast to Bitcoin and Ethereum, which are designed to operate on the public Internet, most financial activity already occurs within restricted networks of financial institutions. A shared ledger operated within this network can take advantage of blockchain technologies without sacrificing the efficiency, security, privacy, and flexibility needed by financial institutions.

The present state of the art may therefore benefit from the systems, methods, and apparatuses for improving upon, modifying, and expanding upon blockchain and related distributed ledger technologies by providing means for implementing consumer data validation, matching, and merging across tenants with optional verification prompts utilizing blockchain technologies in conjunction with a cloud based computing environment as is described herein.

BRIEF DESCRIPTION OF THE DRAWINGS

Embodiments are illustrated by way of example, and not by way of limitation, and will be more fully understood with reference to the following detailed description when considered in connection with the figures in which:

FIGS. 4E and 4F depict additional exemplary architectures in accordance with described embodiments;

FIG. 4G depicts another exemplary architecture in accordance with described embodiments;

FIGS. 6 and 7 depict flow diagrams illustrating methods for implementing commerce rewards across tenants for commerce cloud customers utilizing blockchain technologies, in accordance with described embodiments;

FIG. 8 shows a diagrammatic representation of a system within which embodiments may operate, be installed, integrated, or configured, in accordance with described embodiments;

FIG. 10 illustrates a diagrammatic representation of a machine in the exemplary form of a computer system, in accordance with one embodiment;

FIG. 11 depicts a flow diagram illustrating a method for implementing consumer data validation, matching, and merging across tenants with optional verification prompts utilizing blockchain technologies, in accordance with described embodiments.

DETAILED DESCRIPTION

Figure 1A:
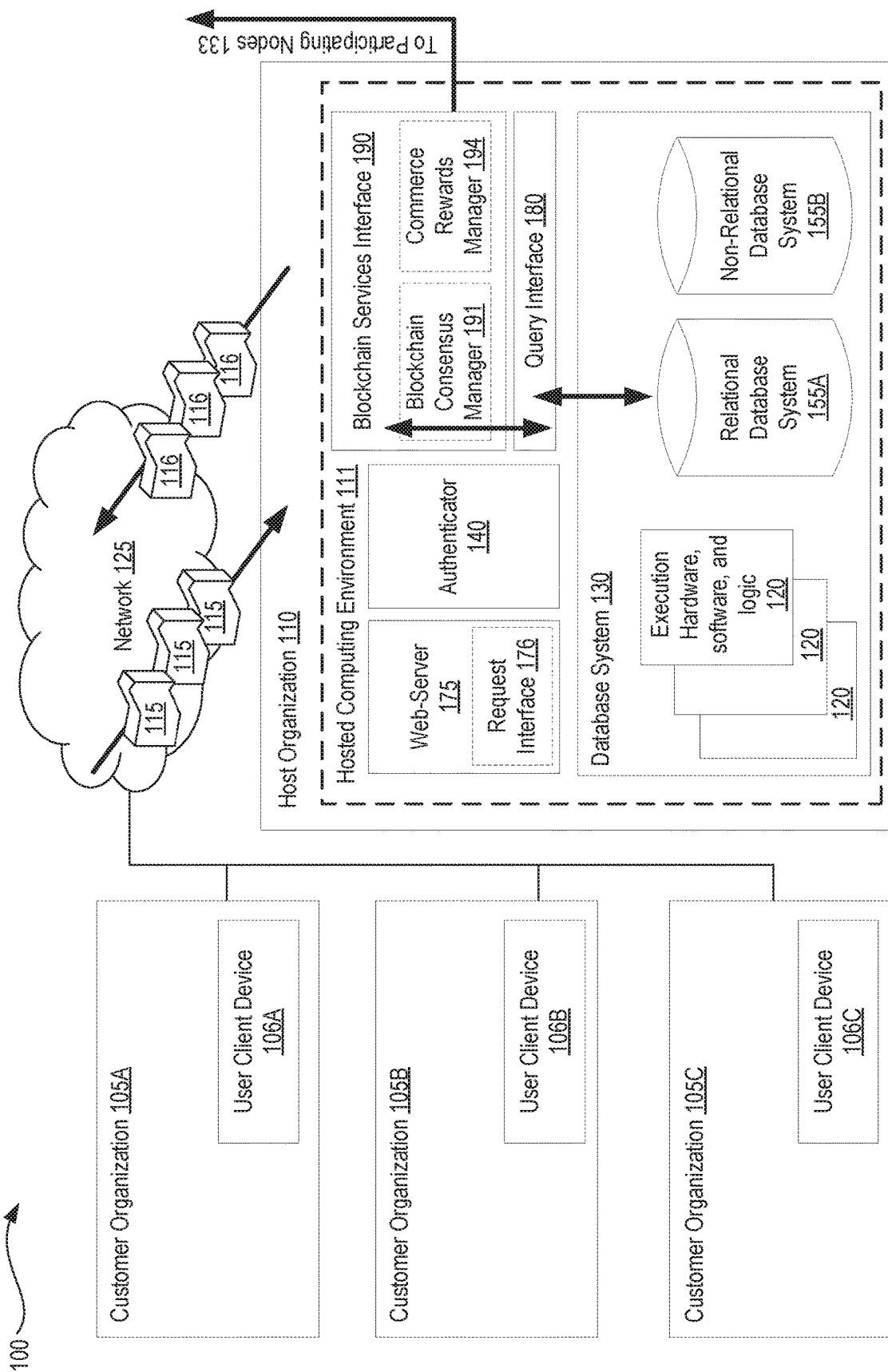
FIG. 1A depicts an exemplary architecture in accordance with described embodiments.

Described herein are systems, methods, and apparatuses for implementing consumer data validation, matching, and merging across tenants with optional verification prompts utilizing blockchain technologies in conjunction with a cloud based computing environment.

For instance, according to a particular embodiment, there is a system having at least a processor and a memory therein executing within a host organization and having therein, means for: operating multiple cloud platforms on behalf of a plurality of merchants, in which each of the multiple cloud platforms store customer records on behalf of the plurality of merchants; retrieving a first customer record associated with a first tenant of the host organization using one of the multiple cloud platforms; retrieving a second customer record for comparison with the first customer record, in which the second customer record is either a customer record from any of the multiple cloud platforms which is associated with a second tenant of the host organization or a customer record associated with the first tenant from a different one of the multiple cloud platforms; determining at least a partial match exists for the first customer record and the second customer record and generating a candidate record with a proposed data merge of the first and second customer records; creating a new global ID for a user represented by the generated candidate record; issuing a transaction to the blockchain with a new asset embodying the candidate record; and subjecting the new asset to consensus by one of: (i) the user represented by the candidate record, (ii) the first tenant, (iii) the second tenant, or any combination thereof.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

FIG. 1A depicts an exemplary architecture 100 in accordance with described embodiments.

In one embodiment, a hosted computing environment 111 is communicably interfaced with a plurality of user client devices 106A-C (e.g., such as mobile devices, smart phones, tablets, PCs, etc.) through host organization 110. In one embodiment, a database system 130 includes databases 155A and 155B, for example, to store application code, object data, tables, datasets, and underlying database records comprising user data on behalf of customer organizations 105A-C (e.g., users of such a database system 130 or tenants of a multi-tenant database type database system or the affiliated users of such a database system). Such databases include various database system types including, for example, a relational database system 155A and a non-relational database system 155B according to certain embodiments.

In certain embodiments, a client-server computing architecture may be utilized to supplement features, functionality, or computing resources for the database system 130 or alternatively, a computing grid, or a pool of work servers, or some combination of hosted computing architectures may provide some or all of computational workload and processing demanded of the host organization 110 in conjunction with the database system 130.

The database system 130 depicted in the embodiment shown includes a plurality of underlying hardware, software, and logic elements 120 that implement database functionality and a code execution environment within the host organization 110.

In accordance with one embodiment, database system 130 utilizes the underlying database system implementations 155A and 155B to service database queries and other data interactions with the database system 130 that communicate with the database system 130 via the query interface 180. The hardware, software, and logic elements 120 of the database system 130 are separate and distinct from the customer organizations (105A, 105B, and 105C) which utilize web services and other service offerings as provided by the host organization 110 by communicably interfacing to the host organization 110 via network 125. In such a way, host organization 110 may implement on-demand services, on-demand database services or cloud computing services to subscribing customer organizations 105A-C.

In one embodiment, each customer organization 105A-C is an entity selected from the group consisting of: a separate and distinct remote organization, an organizational group within the host organization 110, a business partner of the host organization 110, or a customer organization 105A-C that subscribes to cloud computing services provided by the host organization 110.

Further depicted is the host organization 110 receiving input and other requests 115 from customer organizations 105A-C via network 125 (such as a public Internet). For example, incoming search queries, database queries, API requests, interactions with displayed graphical user interfaces and displays at the user client devices 106A-C, or other inputs may be received from the customer organizations 105A-C to be processed against the database system 130, or such queries may be constructed from the inputs and other requests 115 for execution against the databases 155A and 155B or the query interface 180, pursuant to which results 116 are then returned to an originator or requestor, such as a user of one of a user client device 106A-C at a customer organization 105A-C.

In one embodiment, requests 115 are received at, or submitted to, a web-server 175 within host organization 110. Host organization 110 may receive a variety of requests for processing by the host organization 110 and its database system 130. Incoming requests 115 received at web-server 175 may specify which services from the host organization 110 are to be provided, such as query requests, search request, status requests, database transactions, graphical user interface requests and interactions, processing requests to retrieve, update, or store data on behalf of one of the customer organizations 105A-C, code execution requests, and so forth. Web-server 175 may be responsible for receiving requests 115 from various customer organizations 105A-C via network 125 on behalf of the query interface 180 and for providing a web-based interface or other graphical displays to an end-user user client device 106A-C or machine originating such data requests 115.

Certain requests 115 received at the host organization may be directed toward a blockchain for which the blockchain services interface 190 of the host organization 110 operates as an intermediary.

The query interface 180 is capable of receiving and executing requested queries against the databases and storage components of the database system 130 and returning a result set, response, or other requested data in furtherance of the methodologies described. The query interface 180 additionally provides functionality to pass queries from web-server 175 into the database system 130 for execution against the databases 155A and 155B for processing search queries, or into the other available data stores of the host organization's computing environment 111. In one embodiment, the query interface 180 implements an Application Programming Interface (API) through which queries may be executed against the databases 155A and 155B or the other data stores.

Additionally, the query interface 180 provides interoperability with the blockchain services interface 190, thus permitting the host organization 110 to conduct transactions with either the database system 130 via the query interface 180 or to transact blockchain transactions onto a connected blockchain for which the host organization 110 is a participating node or is in communication with the participating nodes 133, or the host organization 110 may conduct transactions involving both data persisted by the database system 130 (accessible via the query interface 180) and involving data persisted by a connected blockchain (e.g., accessible from a participating node 133 or from a connected blockchain directly, where the host organization operates a participating node on such a blockchain).

In certain embodiments, the Application Programming Interface (API) of the query interface 180 provides an API model through which programmers, developers, and administrators may interact with the blockchain services interface 190 or the database system 130, or both, as the needs and particular requirements of the API caller dictate.

Host organization 110 may implement a request interface 176 via web-server 175 or as a stand-alone interface to receive requests packets or other requests 115 from the user client devices 106A-C. Request interface 176 further supports the return of response packets or other replies and responses 116 in an outgoing direction from host organization 110 to the user client devices 106A-C. Authenticator 140 operates on behalf of the host organization to verify, authenticate, and otherwise credential users attempting to gain access to the host organization.

Further depicted within host organization 110 is the blockchain services interface 190 having included therein both a blockchain consensus manager 191 and a commerce rewards manager 194. Blockchain services interface 190 communicatively interfaces the host organization 110 with other participating nodes 133 (e.g., via the network 125) so as to enable the host organization 110 to participate in available blockchain protocols by acting as a blockchain protocol compliant node so as to permit the host organization 110 to access information within such a blockchain as well as enabling the host organization 110 to provide blockchain services to other participating nodes 133 for any number of blockchain protocols supported by, and offered to customers and subscribers by the host organization 110. In certain embodiments, the host organization 110 both provides the blockchain protocol upon which the host organization then also operates as participating node. In other embodiments, the host organization merely operates as a participating node so as to enable the host organization 110 to interact with the blockchain protocol(s) provided by others.

A blockchain is a continuously growing list of records, grouped in blocks, which are linked together and secured using cryptography. Each block typically contains a hash pointer as a link to a previous block, a timestamp and transaction data. By design, blockchains are inherently resistant to modification of the data. A blockchain system essentially is an open, distributed ledger that records transactions between two parties in an efficient and verifiable manner, which is also immutable and permanent. A distributed ledger (also called a shared or common ledger, or referred to as distributed ledger technology (DLT)) is a consensus of replicated, shared, and synchronized digital data geographically spread across multiple nodes. The nodes may be located in different sites, countries, institutions, user communities, customer organizations, host organizations, hosted computing environments, or application servers. There is no central administrator or centralized data storage.

Blockchain systems use a peer-to-peer (P2P) network of nodes, and consensus algorithms ensure replication of digital data across nodes. A blockchain system may be either public or private. Not all distributed ledgers necessarily employ a chain of blocks to successfully provide secure and valid achievement of distributed consensus: a blockchain is only one type of data structure considered to be a distributed ledger.

P2P computing or networking is a distributed application architecture that partitions tasks or workloads between peers. Peers are equally privileged, equally capable participants in an application that forms a peer-to-peer network of nodes. Peers make a portion of their resources, such as processing power, disk storage or network bandwidth, directly available to other network participants, without the need for central coordination by servers or hosts. Peers are both suppliers and consumers of resources, in contrast to the traditional client-server model in which the consumption and supply of resources is divided. A peer-to-peer network is thus designed around the notion of equal peer nodes simultaneously functioning as both clients and servers to the other nodes on the network.

For use as a distributed ledger, a blockchain is typically managed by a peer-to-peer network collectively adhering to a protocol for validating new blocks. Once recorded, the data in any given block cannot be altered retroactively without the alteration of all subsequent blocks, which requires collusion of the network majority. In this manner, blockchains are secure by design and are an example of a distributed computing system with high Byzantine fault tolerance. Decentralized consensus has therefore been achieved with a blockchain. This makes blockchains potentially suitable for the recording of events, medical records, insurance records, and other records management activities, such as identity management, transaction processing, documenting provenance, or voting.

A blockchain database is managed autonomously using a peer-to-peer network and a distributed timestamping server. Records, in the form of blocks, are authenticated in the blockchain by collaboration among the nodes, motivated by collective self-interests. As a result, participants' uncertainty regarding data security is minimized. The use of a blockchain removes the characteristic of reproducibility of a digital asset. It confirms that each unit of value, e.g., an asset, was transferred only once, solving the problem of double spending.

Blocks in a blockchain each hold batches ("blocks") of valid transactions that are hashed and encoded into a Merkle tree. Each block includes the hash of the prior block in the blockchain, linking the two. The linked blocks form a chain. This iterative process confirms the integrity of the previous block, all the way back to the first block in the chain, sometimes called a genesis block or a root block.

By storing data across its network, the blockchain eliminates the risks that come with data being held centrally and controlled by a single authority. Although the host organization 110 provides a wide array of data processing and storage services, including the capability of providing vast amounts of data with a single responsible agent, such as the host organization 110, blockchain services differ insomuch that the host organization 110 is not a single authority for such services, but rather, via the blockchain services interface 190, is merely one of many nodes for an available blockchain protocol or operates as blockchain protocol manager and provider, while other participating nodes 133 communicating with the host organization 110 via blockchain services interface 190 collectively operate as the repository for the information stored within a blockchain by implementing compliant distributed ledger technology (DLT) in accordance with the available blockchain protocol offered by the host organization 110.

The decentralized blockchain may use ad-hoc message passing and distributed networking. The blockchain network lacks centralized points of vulnerability that computer hackers may exploit. Likewise, it has no central point of failure. Blockchain security methods include the use of public-key cryptography. A public key is an address on the blockchain. Value tokens sent across the network are recorded as belonging to that address. A private key is like a password that gives its owner access to their digital assets or the means to otherwise interact with the various capabilities that blockchains support. Data stored on the blockchain is generally considered incorruptible. This is where blockchain has its advantage. While centralized data is more controllable, information and data manipulation are common. By decentralizing such data, blockchain makes data transparent to everyone involved.

Every participating node 133 for a particular blockchain protocol within a decentralized system has a copy of the blockchain for that specific blockchain protocol. Data quality is maintained by massive database replication and computational trust. No centralized official copy of the database exists and, by default, no user and none of the participating nodes 133 are trusted more than any other, although this default may be altered via certain specialized blockchain protocols as will be described in greater detail below. Blockchain transactions are broadcast to the network using software, via which any participating node 133, including the host organization 110 when operating as a node, receives such transaction broadcasts. Broadcast messages are delivered on a best effort basis. Nodes validate transactions, add them to the block they are building, and then broadcast the completed block to other nodes. Blockchains use various time-stamping schemes, such as proof-of-work, to serialize changes. Alternate consensus may be utilized in conjunction with the various blockchain protocols offered by and supported by the host organization, with such consensus mechanisms including, for example, proof-of-stake, proof-of-authority, and proof-of-burn, to name a few.

Open blockchains are more user friendly than conventional traditional ownership records, which, while open to the public, still require physical access to view. Because most of the early blockchains were permissionless, there is some debate about the specific accepted definition of a so called "blockchain," such as, whether a private system with verifiers tasked and authorized (permissioned) by a central authority is considered a blockchain. Proponents of permissioned or private chains argue that the term blockchain may be applied to any data structure that groups data into time-stamped blocks. These blockchains serve as a distributed version of multiversion concurrency control (MVCC) in databases. Just as MVCC prevents two transactions from concurrently modifying a single object in a database, blockchains prevent two transactions from spending the same single output in a blockchain. Regardless of the semantics or specific terminology applied to the varying types of blockchain technologies, the methodologies described herein with respect to a "blockchain" expand upon conventional blockchain protocol implementations to provide additional flexibility, open up new services and use cases for the described blockchain implementations, and depending upon the particular blockchain protocol offered or supported by the blockchain services interface 190 of the host organization 110, both private and public mechanisms are described herein and utilized as needed for different implementations supported by the host organization 110.

An advantage to an open, permissionless, or public, blockchain network is that guarding against bad actors is not required and no access control is needed. This means that applications can be added to the network without the approval or trust of others, using the blockchain as a transport layer. Conversely, permissioned (e.g., private) blockchains use an access control layer to govern who has access to the network. In contrast to public blockchain networks, validators on private blockchain networks are vetted, for example, by the network owner, or one or more members of a consortium. They rely on known nodes to validate transactions. Permissioned blockchains also go by the name of "consortium" or "hybrid" blockchains. Today, many corporations are using blockchain networks with private blockchains, or blockchain-based distributed ledgers, independent of a public blockchain system.

Figure 1B:
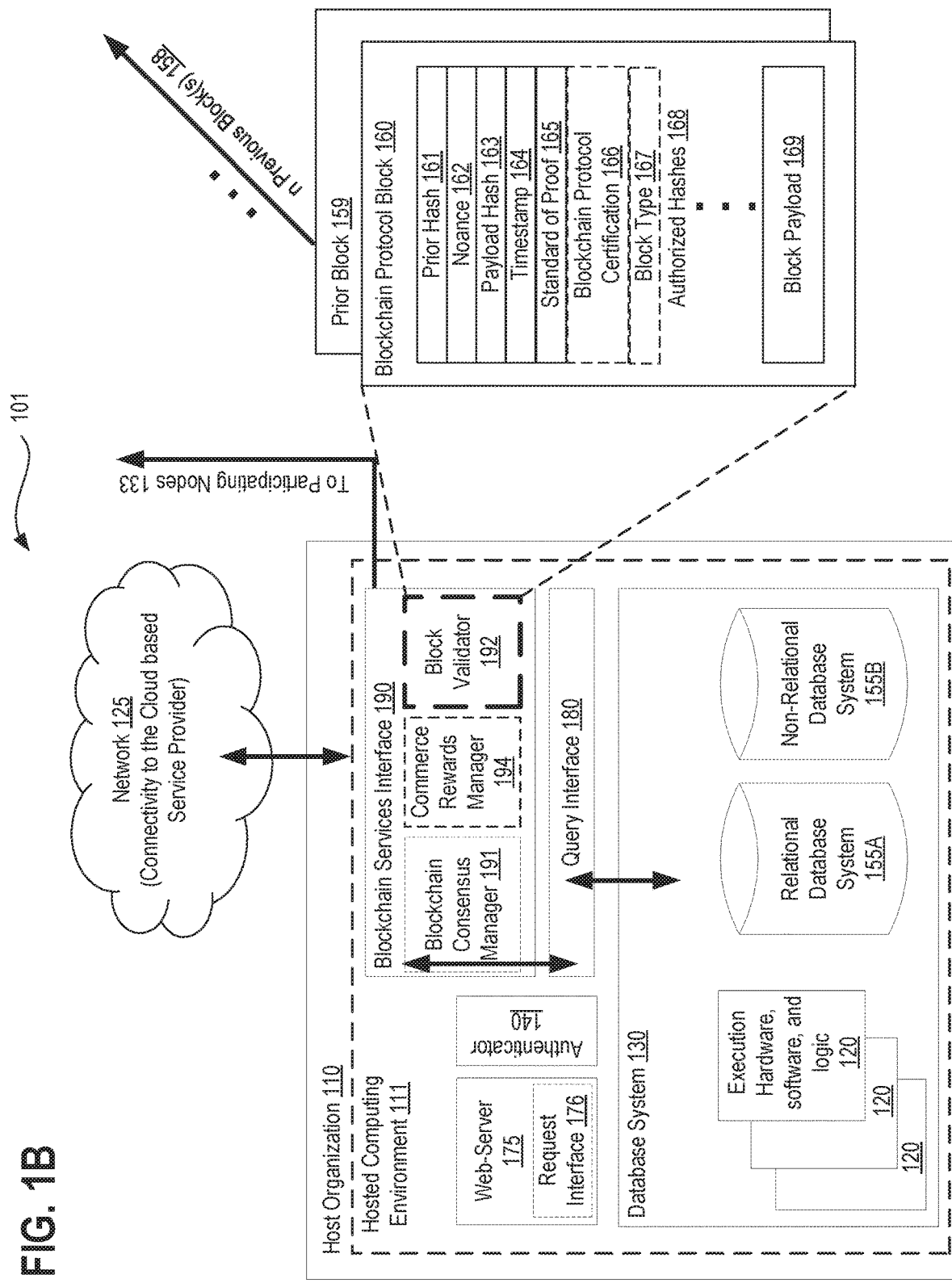
FIG. 1B depicts another exemplary architecture, with additional detail of a blockchain protocol block operating in conjunction with a block validator, in accordance with described embodiments.

FIG. 1B depicts another exemplary architecture 101, with additional detail of a blockchain protocol block 160 operating in conjunction with a block validator 192, in accordance with described embodiments.

In particular, a blockchain protocol block 160 is depicted here to be validated by the block validator 192 of the host organization 110, with the blockchain protocol block including addition detail of its various sub-components, and certain optional elements which may be utilized in conjunction with the blockchain protocol block 160 depending on the particular blockchain protocol being utilized via the blockchain services interface 190.

In accordance with a particular embodiment, the blockchain protocol block 160 depicted here defines a particular structure for how the fundamental blocks of any given blockchain protocol supported by the host organization 110 are organized.

The commerce rewards manager 194 may utilize a specific permissioned blockchain implemented only for the purposes of managing commerce rewards for customers across tenants, as will be described in greater detail below, or the commerce rewards manager 194 may utilize another available blockchain protocol which supports the asset type of a commerce reward for customers of the tenants of the host organization. However, it is envisioned that a customized blockchain protocol implementation will likely be utilized in most scenarios, so as to enable the host organization to provide a greater suite of functionality to tenants of the host organization 110 and to the customers of those tenants.

With respect to the blockchain protocol block 160 (regardless of whether it is an existing and already available blockchain protocol or a custom implemented blockchain protocol), the prior hash 161 is the result of a non-reversible mathematical computation using data from the prior block 159 as the input. The prior block 159 in turn utilized data from the n previous block(s) 158 to form the non-reversible mathematical computation forming the prior hash for those respective blocks. For instance, according to one embodiment, the non-reversible mathematical computation utilized is a SHA256 hash function, although other hash functions may be utilized. According to such an embodiment, the hash function results in any change to data in the prior block 159 or any of the n previous blocks 158 in the chain, causing an unpredictable change in the hash of those prior blocks, and consequently, invalidating the present or current blockchain protocol block 160. Prior hash 161 creates the link between blocks, chaining them together to form the current blockchain protocol block 160.

When the block validator 192 calculates the prior hash 161 for the prior block 159, the hash must meet certain criteria defined by data stored as the standard of proof 165. For instance, in one embodiment, this standard of proof 165 is a number that the calculated hash must be less than. Because the output of the hashing function is unpredictable, it cannot be known before the hash is calculated what input will result in an output that is less than the standard of proof 165. The nonce 162 is used to vary the data content of the block, allowing for a large number of different outputs to be produced by the hash function in pursuit of an output that meets the standard of proof 165, thus making it exceedingly computationally expensive (and therefore statistically improbable) of producing a valid block with a nonce 162 that results in a hash value meeting the criteria of the standard of proof 165.

Payload hash 163 provides a hash of the data stored within the block payload 169 portion of the blockchain protocol block 160 and need not meet any specific standard of proof 165. However, the payload hash is included as part of the input when the hash is calculated for the purpose of storing it as the prior hash 161 for the next or subsequent block. Timestamp 164 indicates what time the blockchain protocol block 160 was created within a certain range of error. According to certain blockchain protocol implementations provided via the blockchain services interface 190, the distributed network of users (e.g., blockchain protocol nodes) checks the timestamp 164 against their own known time and will reject any block having a timestamp 164 which exceeds an error threshold, however, such functionality is optional and may be required by certain blockchain protocols and not utilized by others.

The blockchain protocol certification 166 defines the required size and/or data structure of the block payload 169 as well as certifying compliance with a particular blockchain protocol implementation, and thus, certifies the blockchain protocol block subscribes to, implements, and honors the particular requirements and configuration options for the indicated blockchain protocol. The blockchain protocol certification 166 may also indicate a version of a given blockchain protocol and the blockchain protocol may permit limited backward and forward compatibility for blocks before nodes will begin to reject new blockchain protocol blocks for non-compliance.

Block type 167 is optional depending on the particular blockchain protocol utilized. Where required for a specific blockchain protocol exposed via the blockchain services interface 190, a block type 167 must be indicated as being one of an enumerated list of permissible block types 167 as will be described in greater detail below. Certain blockchain protocols use multiple different block types 167, all of which may have varying payloads, but have a structure which is known a priori according to the blockchain protocol utilized, the declared block type 167, and the blockchain protocol certification 166 certifying compliance with such requirements. Non-compliance or an invalid block type or an unexpected structure or payload for a given declared block type 167 will result in the rejection of that block by network nodes.

Where a variable sized block payload 169 is utilized, the block type 167 may indicate permissibility of such a variable sized block payload 169 as well as indicate the index of the first byte in the block payload 169 and the total size of the block payload 169. The block type 167 may be utilized to store other information relevant to the reading, accessing, and correct processing and interpretation of the block payload 169.

Block payload 169 data stored within the block may relate to any number of a wide array of transactional data depending on the particular implementation and blockchain protocol utilized, including payload information related to, for example, financial transactions, ownership information, data access records, document versioning, medical records, voting records, compliance and certification, educational transcripts, purchase receipts, digital rights management records, or literally any kind of data that is storable via a payload of a blockchain protocol block 160, which is essentially any data capable of being digitized. Depending on the particular blockchain protocol chosen, the payload size may be a fixed size or a variable size, which in either case, will be utilized as at least part of the input for the hash that produces the payload hash 163.

Various standard of proofs 165 may utilized pursuant to the particular blockchain protocol chosen, such as proof of work, hash value requirements, proof of stake, a key, or some other indicator such as a consensus, or proof of consensus. Where consensus based techniques are utilized, the blockchain consensus manager 191 provides consensus management on behalf of the host organization 110, however, the host organization 110 may be operating only as one of many nodes for a given blockchain protocol which is accessed by the host organization 110 via the blockchain services interface 190 or alternatively, the host organization 110 may define and provide a particular blockchain protocol as a cloud based service to customers and subscribers (and potentially to non-authenticated public node participants), via the blockchain services interface 190. Such a standard of proof 165 may be applied as a rule that requires a hash value to be less than the proof standard, more than the proof standard, or may require a specific bit sequence (such as 10 zeros, or a defined binary sequence) or a required number of leading or trailing zeroes (e.g., such as a hash of an input which results in 20 leading or trailing zeros, which is computationally infeasible to provide without a known valid input).

The hash algorithms used for the prior hash 161, the payload hash 163, or the authorized hashes 168 may all of the same type or of different types, depending on the particular blockchain protocol implementation. For instance, permissible hash functions include MD5, SHA-1, SHA-224, SHA-256, SHA-384, SHA-515, SHA-515/224, SHA-515/256, SHA-3 or any suitable hash function resistant to pre-image attacks. There is also no requirement that a hash is computed only once. The results of a hash function may be reused as inputs into another or the same hash function again multiple times in order to produce a final result.

Figure 2A:
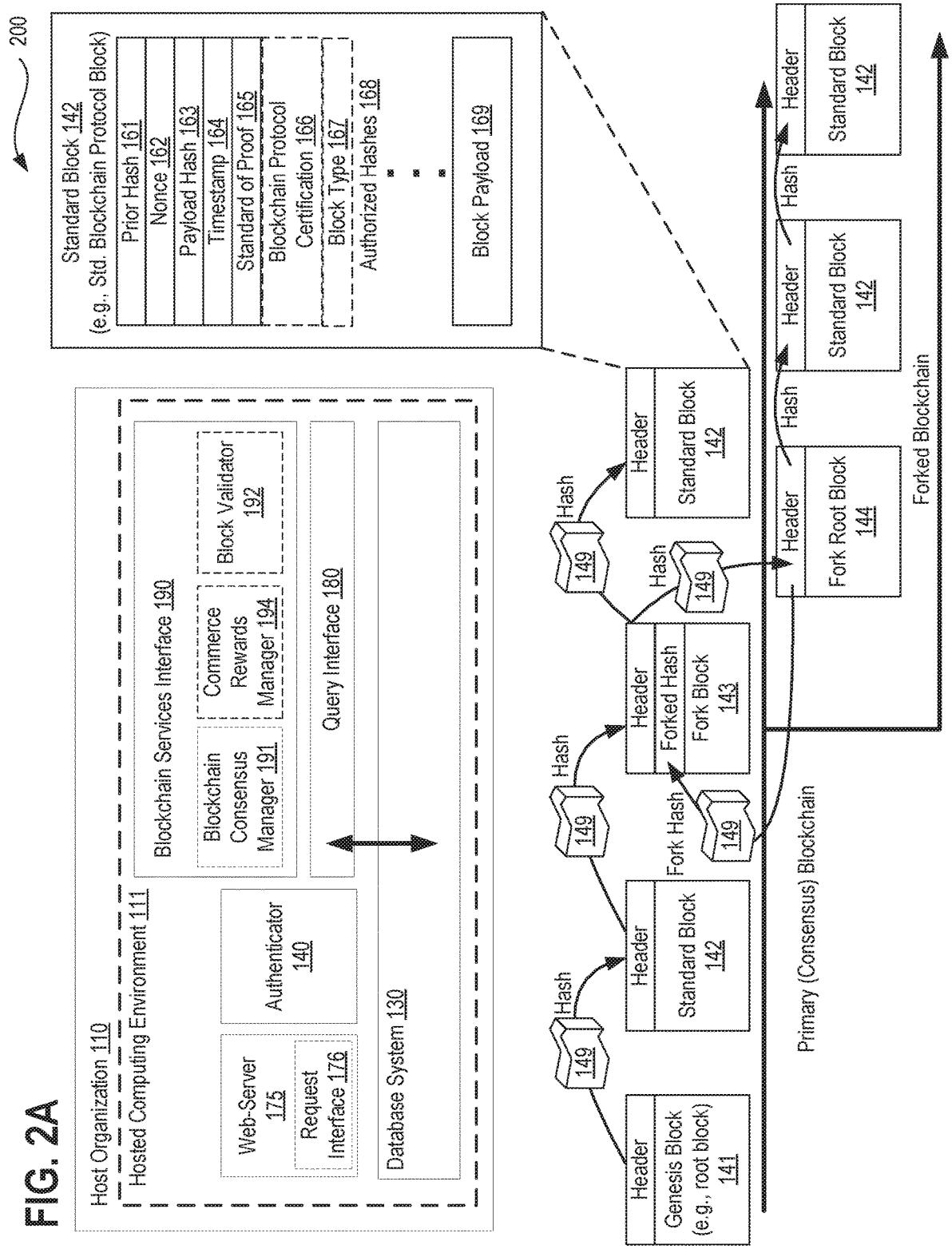
FIG. 2A depicts another exemplary architecture, with additional detail of a blockchain and a forked blockchain, in accordance with described embodiments.

FIG. 2A depicts another exemplary architecture 200, with additional detail of a blockchain and a forked blockchain, in accordance with described embodiments.

More particularly, there is now depicted a primary blockchain (e.g., a consensus blockchain) which begins with a genesis block 141 (sometimes called a root block) followed by a series of standard blocks 142, each having a header which is formed based at least in part from a hash of the header of the block which precedes it. There is additionally depicted a forked blockchain formed with an initial fork root block 144, followed by then a series of standard blocks 142. Because each block in the blockchain contains a hash of the immediately preceding block stored in the previous hash, a link going back through the chain from each block is effectively created via the blockchain and is a key component to making it prohibitively difficult or computationally infeasible to maliciously modify the chain.

As depicted, the primary blockchain includes a single fork which is originating from the fork block 143. As shown here, the genesis block 141 is a special block that begins the primary blockchain and is different from the other blocks because it is the first block in the primary block chain and therefore, cannot by definition, include a hash of any previous block. The genesis block 141 marks the beginning of the primary blockchain for the particular blockchain protocol being utilized. The blockchain protocol governs the manner by which the primary blockchain grows, what data may be stored within, and forked blockchains are created, as well as the validity of any block and any chain may be verified via the block validator 192 of the host organization or any other participating network node of the blockchain pursuant to the rules and requirements set forth by the blockchain protocol certification 166 which is embedded within the genesis block 141 and then must be certified to and complied with by every subsequent block in the primary blockchain or any forked blockchain.

The blockchain protocol certification 166 inside each block in the genesis chain defines the default set of rules and configuration parameters that allows for the creation of forks and the modification of rules and configuration parameters in those forks, if any. Some blockchain protocol implementations permit no variation or non-compliance with the default set of rules as established via the blockchain protocol certification 166 and therefore, any fork will be the result of pending consensus for multiple competing and potentially valid primary blockchains. Once consensus is reached (typically after one or two cycles of new block formations) then the branch having consensus will be adopted and the fork truncated, thus returning to a single primary consensus blockchain. Conversely, in other implementations, a forked blockchain may permissibly be created and continue to exist indefinitely alongside the primary blockchain, so long as the forked blockchain complies with the blockchain protocol certification 166 and permissible variation of rules and configuration parameters for a forked blockchain within that blockchain protocol.

Fork block 143 anchors the forked blockchain to the primary blockchain such that both the primary blockchain and the forked chain are considered valid and permissible chains where allowed pursuant to the blockchain protocol certification 166. Normally, in a blockchain, all non-consensus forks are eventually ignored or truncated and thus considered invalid except for the one chain representing the longest chain having consensus. Nevertheless, the fork block 143 expands beyond the conventional norms of prior blockchain protocols by operating as and appearing as though it is a standard block 142, while additionally including a reference to a fork hash 149 identifying the first block of the permissible forked blockchain, represented here as the fork root block 144 for the valid forked blockchain. The fork root block 144 of the forked blockchain is then followed by standard blocks, each having a header based on a prior valid block's hash, and will continue indefinitely.

According to a particular embodiment, the forked blockchain utilizes some variation from the rules and configuration parameters utilized by default within the primary consensus blockchain, resulting in the need for a valid forked blockchain. Therefore, the variation of the rules and configuration parameters are encoded within a new blockchain protocol certification 166 for the fork root block 144 which, as noted above, must remain compliant with the original rules and valid range of configuration parameters as set forth by the blockchain protocol certification 166 of the original genesis block 141 for the primary blockchain. Because the fork root block 144 must continue to carry the original blockchain protocol certification 166, a forked blockchain protocol certification may be stored within a block payload 169 segment of the fork root block 144 thus establishing the rules and permissible configuration parameters of subsequent standard blocks 142 in the forked blockchain.

When a new blockchain protocol certification 166 is applied for a valid fork, its rules and configuration is applied to all subsequent standard blocks for the fork and all subsequent sub-forks, where additional forks are permitted, and enforced by the participating nodes as though the forked blockchain were an original primary blockchain. Such forks may be desirable for certain customers seeking to apply a specialized set of rules or configurations for a particular group, such as a working group, a certain sub-type of transactions, or some other variation from the primary blockchain where an entirely separate "sidechain" is not required or desirable. A forked blockchain is distinguishable from a sidechain as it remains part of the same blockchain protocol and is permanently connected with the primary blockchain at the fork block 143 with a returned fork hash 149 being returned to and immutably written into the primary consensus blockchain where it will remain via the chain hashing scheme for all subsequent standard blocks of the primary blockchain. Stated very simply, the forked blockchain is explicitly tied to the primary blockchain via the fork block 143. Conversely, a sidechain may be an entirely distinct blockchain protocol for which an agreed rate of exchange or conversion factor is applied to all information or value passed between the primary blockchain and any sidechain without any explicit reference or fork hash 149 embedded within the primary blockchain.

Sidechaining therefore is a mechanism by which tokens, value, or payload entries from one blockchain may be securely used within a completely separate blockchain via a pre-defined exchange or conversion scheme, and yet, be permissibly moved back to the original chain, if necessary. By convention, the original blockchain is referred to as the main chain or the primary blockchain, whereas any additional blockchains which allow users to transact within them utilizing the tokens, values, or payload of the main chain are referred to as sidechains. For instance, there may be a private blockchain with a defined linkage to a public blockchain, thus allowing tokens, value, or payload data to be securely moved between the public blockchain and the private blockchain.

Consider for instance the host organization's use of a previously existing blockchain for the implementation of the services provided by the commerce rewards manager 194. It may be advantageous to utilize an existing blockchain, but then creating a specialized sidechain or a forked blockchain specifically for the services provided by the commerce rewards manager 194 yet remain in compliance with the blockchain protocol certification 166 required by the primary (consensus) blockchain.

According to described embodiments, the blockchain protocol certification 166 defining the protocol rules for a forked chain may be developed in any relevant programming or scripting language, such as, Python, Ruby, Perl, JavaScript, PHP, Scheme, VBScript, Java, Microsoft.Net, C++, C #, C, or a custom-created language for defining the protocol rules.

Under normal operating conditions, even conventional blockchains naturally fork from time to time, however, with previously known blockchains, ultimately only a single branch may form the primary consensus chain and all other forks must be ignored or truncated with only the primary consensus blockchain being considered as valid. Consensus on which chain is valid may be achieved by choosing the longest chain, which thus represents the blockchain having the most work put into completing it. Therefore, it is necessary to utilize the fork block 143 as described herein to permit permissibly forked chains to be created and certified as authorized forks via the fork hash 149 so as to prevent participating nodes to ignore or truncate the fork. Because each node may independently validate the forked blockchain, it will not be ignored, just as a validated primary blockchain will not be ignored upon having consensus.

Figure 2B:
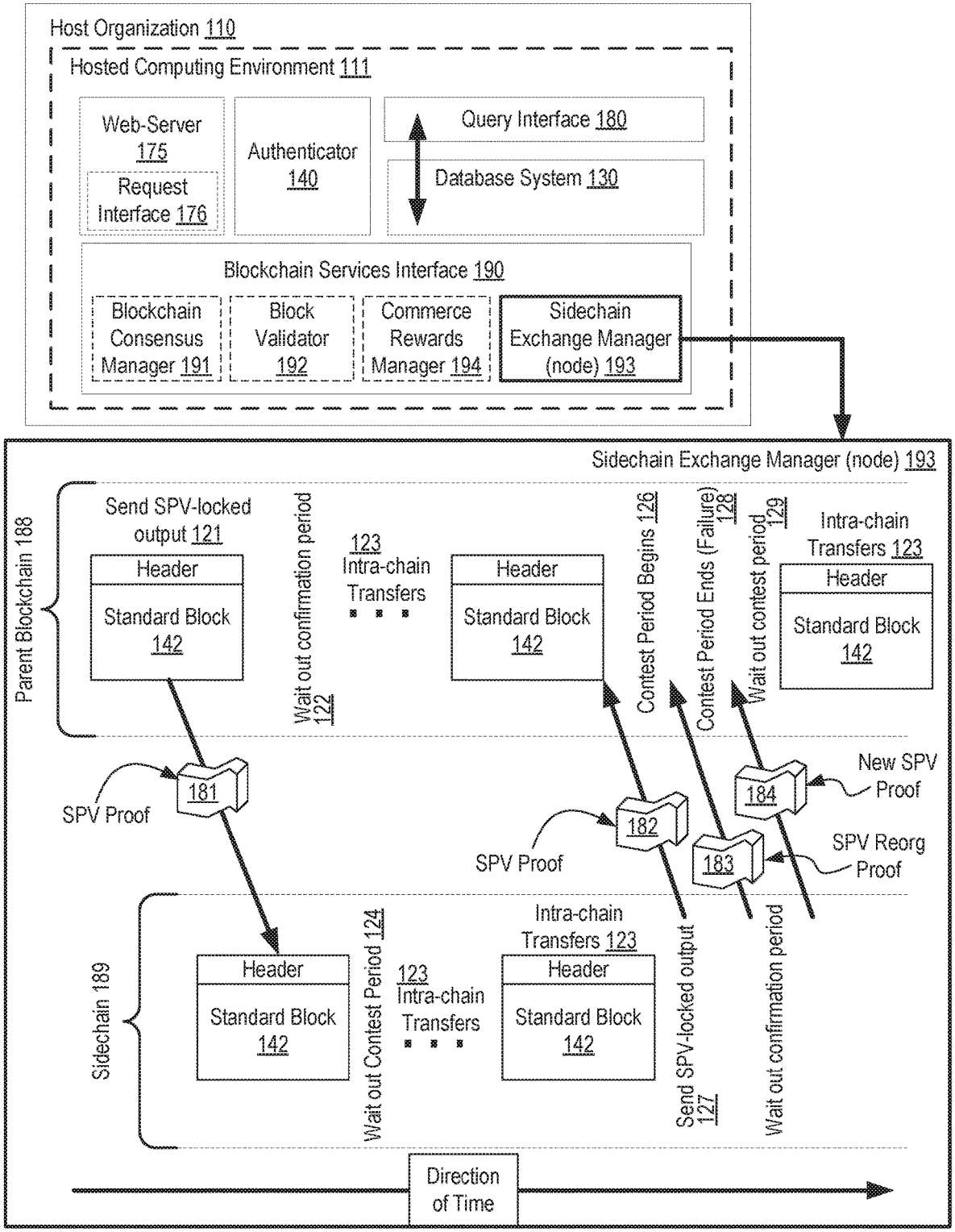
FIG. 2B depicts another exemplary architecture with additional detail for sidechains, in accordance with described embodiments.

FIG. 2B depicts another exemplary architecture 201 with additional detail for sidechains, in accordance with described embodiments.

More particularly, there is depicted here mechanism by which to perform a symmetric two-way pegged transfer from a parent blockchain 188 (e.g., e.g., a primary chain) to a sidechain 189, which may be a different blockchain protocol supported by and provided by the host organization 110 or the sidechain may be a foreign blockchain, public or private, for which the sidechain exchange manager 193 of the host organization 110 participates as a node, so as to permit access and transactional capabilities with the sidechain.

For instance, it may be advantageous at times to exchange the value of commerce rewards, such as those provided by and managed by the commerce rewards manager 194 with other blockchain platforms. Such an exchange may be facilitated via a sidechain exchange manager (node) 193.

Regardless, it is in accordance with described embodiments that inter-chain transfers between the parent blockchain 188 and the sidechain 189 may permissibly performed in compliance with the rules and conditions of each respective blockchain. Notably, as described here, the perspective of each blockchain is interchangeable insomuch that the sidechain 189 depicted here may consider itself as a primary or parent blockchain and consider the depicted parent blockchain 188 as the child blockchain or a sidechain. Regardless, each blockchain operates independently, yet has a defined exchange mechanism by which to exchange tokens, value, commerce rewards, or other payload information between them.

As shown here, the sidechain exchange manager 193 of the host organization may send a parent chain asset as an output of the parent blockchain 188 at operation 121.

A Simplified Payment Verification (SPV) proof 181 associated with the parent blockchain 188 asset is generated as the output and communicated to the sidechain 189. The SPV proof may include a threshold level of work, and the generating may take place over a predetermined period of time, which may also be referred to as a wait-out confirmation period 122. The confirmation period of a transfer between chains may be a duration for which a coin, token, or other exchanged value is locked on the parent blockchain 188 before it may be successfully transferred to the sidechain 189. This confirmation period may allow for sufficient work to be created such that a denial of service attack in the next waiting period becomes more computationally difficult.

Consider for instance an exemplary confirmation period which may be on the order of 1-2 days. The confirmation period may be implemented, in such an example, as a per-sidechain security parameter, which trades off cross-chain transfer speeds in exchange for greater security. Other confirmation periods which are much shorter may be utilized where sufficiently difficult proof of work conditions are effectuated so as to ensure adequate security so as to protect the integrity of both blockchains and negate the potential for fraudulent transactions.

The output created on the parent blockchain 188 may specify via rules and configuration parameters (e.g., stored within the blockchain protocol certification portion of each block of the parent blockchain 188) a requirement that any spending, transfer, or consumption of an asset received by the output in the future are burdened with additional conditions, in addition to the rules governing transfer within the parent chain. For example, any release of assets received by the output may require additional conditions for verifying a proof from the destination chain, such as validating that the rules for the destination chain proof show that the destination chain has released the asset and show to where the asset has been released. After creating the output on the parent blockchain 188, the user waits out the confirmation period, meanwhile, intra-chain transfers 123 continue to occur. Subsequent to waiting out the confirmation period 122, a transaction is then created on the sidechain 189 referencing the output from the parent blockchain 188.

The sidechain, using a sidechain validator service, such as the block validator 192 of the host organization, is then provided with an SPV proof that shows the parent chain asset was created and encumbered by sufficient work within the parent chain. A sidechain validator service (e.g., block validator 192 if performed by the host organization's available services) will then validate that the SPV proof associated with the parent blockchain 188 asset meets the required threshold level of work indicated by the SPV proof at operation 154 and a sidechain 189 asset corresponding to the parent blockchain 188 asset is then generated.

The generated sidechain 189 asset also may be held for a predetermined contest period at operation 124, during which time the transfer will be invalidated if a reorganization proof 183 associated with the parent blockchain 188 asset is detected in the parent blockchain.

The wait out contest period at operation 124 may be a duration during which a newly-transferred token, coin, value, or payload data may not be spent, accessed, or consumed on the sidechain 189. The predetermined contest period is implemented to prevent any possibility for double-spending in the parent blockchain 188 by transferring previously-locked coins, tokens, value, or payload data during a reorganization. If at any point during this delay, a new SPV proof 184 (known as a "reorganization proof") is published containing a chain with more aggregate work which does not include the block in which the lock output was created, the conversion is retroactively invalidated. If no reorganization proof is detected, the sidechain asset may be released. All participating nodes on the sidechain have an incentive to produce reorganization proofs if possible, as the consequence of a bad proof being admitted degrades the value of all sidechain tokens, coins, value, or trust in the authenticity of payload data stored by the sidechain 189.

Similar to the above, an exemplary contest period at operation 156 may also be on the order of 1-2 days. To avoid these delays, users may instead employ use atomic swaps for fungible transfers, so long as a liquid market is available. Where the exchanged asset is a unique or less common token, value, or payload data, atomic swaps will not be feasible and a sidechain transfer must instead occur, despite the necessity of a potentially lengthy 1-2 day waiting period.

Upon eventual release of the sidechain asset, the side chain asset corresponding to the parent chain asset may then be transferred or consumed within the sidechain one or more times the intra-chain transfers 153 of the sidechain 189. While locked on the parent blockchain 188, the asset is freely transferable within the sidechain and without requiring any further interaction with the parent blockchain 188, thus permitting the sidechain 189 to again operate wholly independently. Notwithstanding the above, the sidechain asset retains its identity as a parent chain token, coin, value, or payload data and may therefore, if the need arises, be transferred back to the originating parent blockchain 188 from which the sidechain asset originated. In certain embodiments, transfers are relegated to only a single hop, such that an asset cannot be transferred to a sidechain 189 and then transferred again to another sidechain, where it is necessary to prevent obfuscation of the source. Such restrictions are dependent upon the particular blockchain protocol chosen and the define exchange agreement (e.g., pegging conditions) established between a parent blockchain 188 and a sidechain 189.

Where it becomes necessary to redeem a sidechain asset in the parent blockchain 188, the sidechain asset may be sent to an output of the sidechain as depicted at operation 157. An SPV proof 182 associated with the sidechain asset is thus generated and communicated to the parent blockchain 188. A parent chain validator service, such as the block validator 192 of the host organization 110, may validate the SPV proof 182 associated with the sidechain asset. The validated SPV proof 182 associated with the sidechain 189 asset may include, for example, validation that the SPV proof 182 associated with the sidechain asset meets the threshold level of work indicated by the SPV proof 182 associated with the sidechain asset.

As before, the parent chain asset associated with the sidechain asset may be held for a second predetermined contest period at step 126, during which a release of the parent chain asset is denied at operation Contest Period Ends (Failure) 128, showing where the contest period ends (failure), if a reorganization proof 183 associated with the sidechain asset is detected in the sidechain. The parent chain asset may be released if no reorganization proof 183 associated with the sidechain asset is detected.

If validation failure occurs with respect to the second SPV proof 184, after the reorganization proof 183 is received, then a second SPV proof 184 associated with the sidechain asset may be received and validated by the parent blockchain 188 during a third predetermined contest period at operation 129. The parent blockchain 188 asset may be released if no reorganization proof associated with the sidechain asset is detected during the third predetermined contest period, after which the parent chain asset is free to be transferred within the parent chain via the depicted intra-chain transfers 123 shown at the rightmost side of the parent blockchain 188 flow.

Because pegged sidechains may carry assets from many different blockchains, it may be problematic to make assumptions about the security of the other foreign blockchains. It is therefore required in accordance with certain embodiments that different assets are not interchangeable (except by an explicit trade) within the sidechain. Otherwise, a malicious user may potentially execute a fraudulent transaction by creating a worthless chain with a worthless asset, and then proceed to move the worthless asset from their worthless chain into the primary blockchain 188 or into a sidechain 189 with which the primary blockchain 188 interacts and conducts exchanges. This presumes that the worthless chain secures a pegged exchange agreement with the sidechain. However, because the rules, configuration options, and security scheme of the sidechain 189 is not controlled by the primary blockchain 188 (assuming the sidechain is a foreign sidechain and not another blockchain protocol provided by the host organization 110), it simply cannot be known with certainty that the sidechain 189 being interacted with does not contain such vulnerabilities. To negate this potential security vulnerability, the sidechain 189 may be required, as per the pegged exchange agreement, to treat assets from separate parent blockchains as wholly as separate asset types, as denoted by the block type portion of a blockchain protocol block as depicted at FIG. 1B, element 167.

With a symmetric two-way pegged sidechain transfer, both the parent blockchain 188 and sidechains 189 may perform SPV validation services of data on each other, especially where the parent blockchain 188 is provided by the host organization and where the sidechain is a foreign sidechain for which the host organization is merely a participating node via the sidechain exchange manager node 193. Because the parent blockchain 188 clients (e.g., participating nodes) do not observe every sidechain, users import proofs of work from the sidechain into the parent chain in order to prove possession. In a symmetric two-way peg, the reverse is also true. For example, to use Bitcoin as a parent blockchain 188, an extension script to recognize and validate such SPV proofs may be utilized. To facilitate such transactions, the SPV proofs are sufficiently small in size so as to fit within a Bitcoin transaction payload. However, such a change may alternatively be implemented as a forking transaction, as described previously, without affecting transactions not involved in pegged sidechain transactions. Stated differently, using symmetric two-way pegged sidechains as described above, no further restrictions are necessarily placed upon any transaction deemed valid within Bitcoin.

Through the use of such pegged sidechains transactions, independent blockchains are made to be flexible enough to support many assets, including assets that did not exist when the chain was first created. Each of these assets may be labeled with the blockchain from which it was transferred so as to ensure that transfers may be unwound (e.g., transferred back) correctly.

According to certain embodiments, the duration of the contest period is made as a function of the relative hashpower of the parent chain and the sidechain, such that the receiving sidechain (or the parent blockchain with an incoming transfer) may only unlock tokens, coins, value, or data payloads, given an SPV proof of one day's worth of its own proof-of-work, which may, for example, correspond to several days of the sending blockchain's proof-of-work. Security parameters of the particular sidechain's blockchain protocol implementation may thus be tuned to each particular sidechain's implementation. The process may include sending SPV-locked output 121 as shown.

According to described embodiments, the blockchain validator 192 may require, utilize, or apply various types of consensus management to the blocks requiring validation.

When a block containing a particular asset or transaction is to be added to the blockchain, the transaction type database is queried using the type of the particular asset or transaction that is to be added to the blockchain to determine the corresponding consensus protocol type that is to be used to commit the particular asset or transaction, or block containing the particular asset or transaction, to the blockchain. For example, in the database, a transaction type of "loan" may be associated with a consensus protocol type of "proof of stake" (PoS), an asset type of "document" may be associated with a consensus protocol type of "Byzantine Fault Tolerant" (BFT), an asset or transaction type of "currency" may be associated with a consensus protocol type of "proof of work" (PoW), and a default transaction type to be used in the case of an otherwise unenumerated transaction type in the database may be associated with a default consensus protocol type, say, PoS.

For instance, when a block or transaction therein with a particular transaction having the type "commerce reward" is to be added to the blockchain, the consensus protocol type to be used to commit the block or transaction therein to the blockchain is PoS, when a block or transaction therein with a particular asset having the type "document" is to be added to the blockchain, the consensus protocol type to be used to commit the block or transaction therein to the blockchain is BFT, and when a block or transaction therein with a particular transaction having a transaction type that is not specified in the database is to be added to the blockchain, then the default consensus protocol type of PoS is to be used to commit the block or transaction therein to the blockchain.

This selected consensus protocol type may be communicated to the nodes in the consortium for use in for validating the request to add the new block or transaction therein to the blockchain. According to certain embodiments, the host organization 110 receives validation of the request to add the new block or transaction therein to the blockchain when the nodes in the consortium reach consensus according to the selected consensus protocol to add the block or transaction therein to the blockchain and communicate such to the host.

Any relevant factors may be used in determining which nodes participate in the consensus protocol, including, for example, the selected consensus protocol itself, a particular node's computing resources, the stake a particular node has in the consortium or the selected consensus protocol, relevant (domain) knowledge a particular node has, whether that knowledge is inside (on-chain) or outside (off-chain) with regard to the blockchain or consortium, a particular node's previous or historical performance, whether in terms of speed or accuracy, or lack thereof, in participating in the selected consensus protocol, the block number of the new block being added to the blockchain, the number of transactions in the new block, the size of the block, and the fiduciary or nonfiduciary nature of the assets or transactions in the block being added to the blockchain.

According to a particular embodiment, the host organization 110 receives from each of one or more of the nodes in a peer-to-peer network a weighted vote to validate or to add a new block or transaction therein to the blockchain, in response to the request, or in response to a request for a vote issued by the blockchain platform host. These nodes learn of the request either through a blockchain protocol packet broadcast by the node generating the request, or by communication with other nodes in the consortium or the blockchain platform host providing notice of the request in conjunction or combination with the request for a vote transmitted by the blockchain platform host. The host organization then responsively validates, or receives validation of, the request to add the new block or transaction therein to the blockchain when a sum of the received weighted votes exceeds a threshold.

According to another embodiment, a consortium of nodes participate in a private, or permissioned, blockchain within which each node is assigned a weight that its vote will be given, for example, based on domain (general) knowledge about the transactions, or types of transactions, the nodes may add to a new block in the blockchain. Certain nodes may be given a zero weight within such a permissioned blockchain, whereas other nodes may be given such a significant weight that their vote is near controlling or even controlling when combined with a limited number of other highly weighted nodes, depending upon the particular implementation.

Before a node adds a transaction to a new block of the blockchain, or before the new block including the transaction may be added to the blockchain, other nodes in the consortium vote on adding the transaction to the new block for the blockchain and/or adding the new block to the blockchain. When a majority of nodes agree the transaction and/or new block is valid and may thus be accepted as a valid block on the primary blockchain, the transaction and/or new block is added and accepted to that primary blockchain, sometimes called the main chain or the consensus chain. For instance, while an invalid block may be added to the blockchain, such an invalid block in effect creates a side chain which fails to attain consensus, and thus, is never accepted as an added valid block within the main or primary blockchain. Nodes are weighted such that a "majority" may be obtained or denied based on the votes of one or more of the nodes participating in the private blockchain, that is, a majority may be obtained from less than all of the nodes participating in the blockchain.

According to this embodiment, the parties in the consortium agree upon the weight, w, to assign each node in the consortium, for example, based on a party's domain knowledge, and/or other criteria, including for example, a party's participation in another blockchain or sidechain. The total weight, W, of the nodes in the consortium is equal to the sum of the individual node weights, $w_1+w_2+\ldots w_n$, where n is the number of nodes in the consortium. The weight, w, of any one member, or the ratio of w/W may or may not exceed a certain threshold, in one embodiment. Each node's weight is attributed to the respective node's vote. If the sum of the weights for the nodes that voted exceed a certain threshold, the transaction/new block is validated and added to the blockchain. In particular, the transaction/new block is added if the total weight, W, attributed to the votes meets or exceeds a threshold (e.g., a plurality, majority, supermajority, in terms of percentage of w/W, or absolute value for w, whatever is agreed upon by the consortium) to reach consensus for the blockchain. In this embodiment, the nodes in the blockchain do not need to come to a unanimous agreement about adding the transaction and/or new block to the blockchain, and indeed, after the threshold is met, a node need not begin, or continue, to participate in the voting process.

In one embodiment, at least a minimum number of nodes, k, vote on adding a transaction to the new block in the blockchain, or adding the new block that includes the transaction to the blockchain, to mitigate the risk of fraud or double-spending, or to prevent one node with a large weight, w, or a small group of nodes with a collectively large weight, from controlling the outcome of the vote. In one embodiment, the number of nodes that participate in voting, k, or the ratio of k/n must meet a minimum threshold.

Figure 3A:
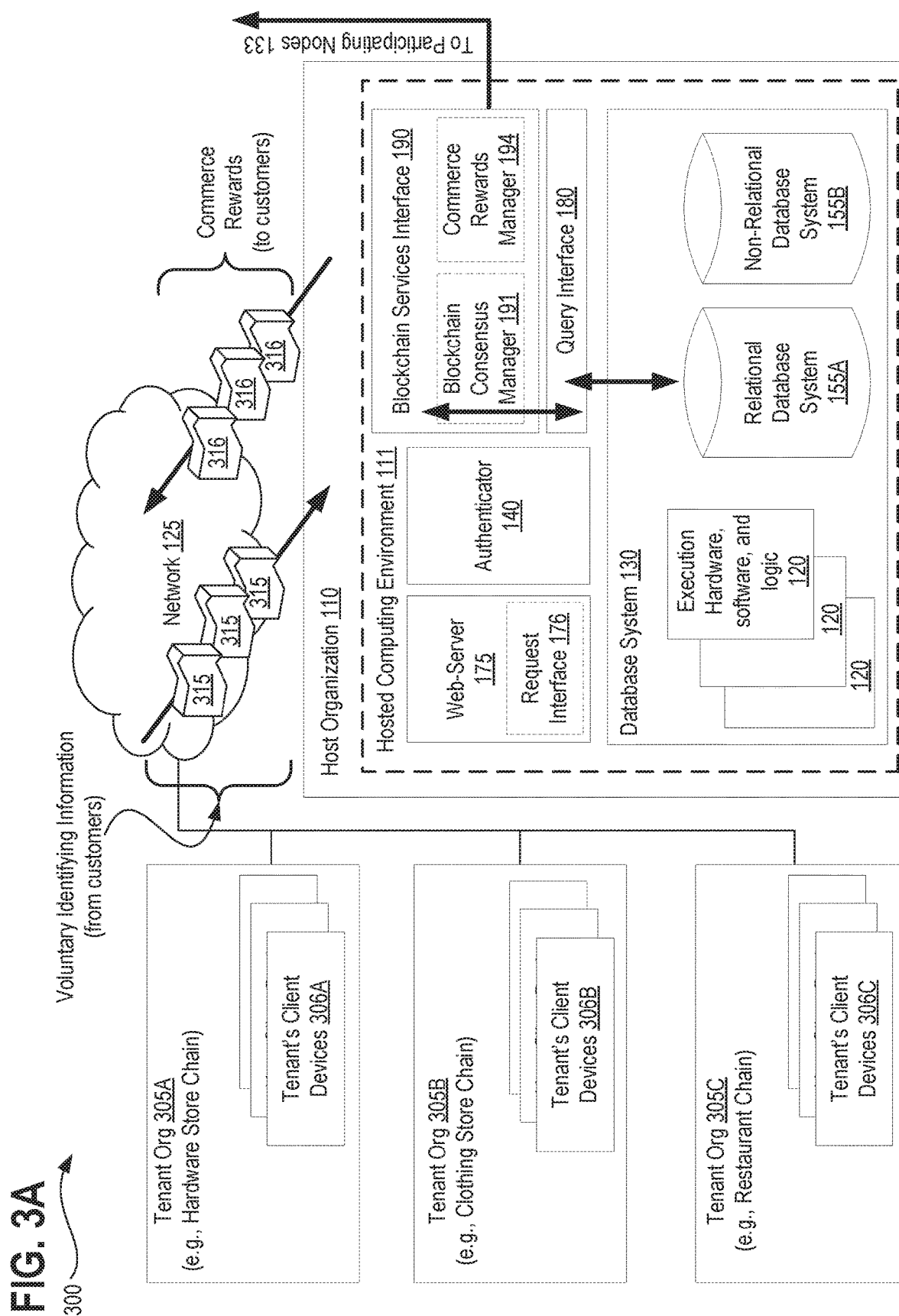
FIG. 3A depicts an exemplary architecture in accordance with described embodiments.

FIG. 3A depicts an exemplary architecture 300 in accordance with described embodiments.

As depicted before, there is again a host organization 110 having therein a hosted computing environment 111 which is communicably interfaced with a plurality of remote computing devices. However, here there is specifically depicted the host organization 110 being communicably interfaced with several tenant organizations, including tenant organization 305A (which in this example is a hardware store chain) and having therein multiple tenant client devices 306A. The host organization is further communicably interfaced with tenant organization 305B (which in this example is a clothing store chain) and having therein multiple tenant client devices 306B, and lastly, the host organization 110 is communicably interfaced with tenant organization 305C (which in this example is a restaurant chain) having therein multiple tenant client devices 306C.

As is further depicted here, the host organization 110 receives voluntary identifying information 315 from customers and the commerce rewards manager of the host organization responsively returns, or credits, commerce rewards to those customers 316.

Consider for example, the host organization 110 having multiple tenants, such as the hardware store chain 305A, the clothing store chain 305B and the restaurant chain 305C, as depicted here. While it is customary for merchants and retailers to award points to their customers, it is not known in the conventional art any platform or mechanism by which merchants which are unaffiliated with one another may allocate commerce rewards points to their customers and permit those customers to utilize the points at any of the unaffiliated merchants.

Pragmatically, there simply is no financial incentive for the unaffiliated merchants to allocate commerce rewards 316 points to the customers of different unaffiliated merchants. Moreover, there is no incentive for an unaffiliated merchant to accept commerce rewards 316 points from a customer when such commerce rewards 316 points originated with a different and unaffiliated merchant.

Simply stated, the unaffiliated merchants have no financial or business incentive to cooperate with one another, especially when their respective businesses are in wholly different industries.

Yet, there is value in granting commerce rewards 316 points to customers in this scenario, albeit, the incentive does not lie with the unaffiliated businesses. Rather, the host organization 110 depicted here may find value in granting such commerce rewards 316 points to the customers of the tenants (tenant orgs 305A-C) of the host organization and then permitting those customers of the tenants (tenant orgs 305A-C) to redeem those commerce rewards 316 points with any of the unaffiliated merchants. When such commerce rewards 316 points are redeemed for goods or services, it would thus be the host organization 110 which compensates the tenant orgs 305A-C by paying for the cost or equivalent value of the goods or services purchased by such customers utilizing the commerce rewards 316 points.

In many instances, the customer may effectively discount or reduce the cost of purchase of goods or services by utilizing commerce rewards 316 points toward the purchase, without requiring the commerce rewards 316 points necessarily covering the entire cost of the customer's purchase, although, it is feasible that such a customer could acquire sufficient commerce rewards 316 points to cover the full purchase price of selected goods or services.

Now then, obviously the concept of coupons and redeeming vouchers, points, coupons, and other customer appreciation tokens is not new. However, the ability for a cloud based host organization which offers services to the various tenants of the host organization presents a unique opportunity, as such a host organization can act as a type of bridge or intermediary for all of its tenant orgs 305A-C and provide commerce rewards 316 points to the customers of the tenant orgs 305A-C which are spendable and redeemable at any of the various tenant orgs 305A-C of the host organization 110, regardless of whether those tenant orgs 305A-C have offer commerce rewards 316 points themselves to their own customers.

Such commerce rewards 316 points are generally a component of so called "Loyalty Programs." Loyalty programs are structured marketing strategies designed by merchants to encourage customers to continue to shop at or use the services of businesses associated with each program, thus, in economic terms, increasing the "stickiness" of those businesses to those particular customers participating in the loyalty program. Stated differently, because the customers have commerce rewards 316 points from that particular merchant, they will be more inclined to conduct further business with that merchant in the hopes that they may redeem the value of their commerce rewards 316 points.

In marketing generally and in retailing more specifically, a loyalty card, rewards card, points card, advantage card, or club card is a plastic or paper card, visually similar to a credit card, debit card, or digital card that identifies the card holder as a participant in a loyalty program.

By presenting such a card, purchasers typically receive either a discount on the current purchase, or to an allotment of points that they can use for future purchases. Hence the card is the visible means of implementing a type of what economists call a two-part tariff.

Merchants often aggregate their customers' data internally, and sometimes externally, as part of its marketing research. Over time the data can reveal, for example, a given customer's favorite brand, their eating habits, their socio-economic status, etc.

Where a customer has provided sufficient identifying information, the loyalty card may also be used to access such information to expedite verification for the purposes of returns, acceptance of checks, dispensing medical prescriptions, or for other membership privileges such as access to an airport lounge using a frequent-flyer card.

Loyalty programs have been described as a form of centralized virtual currency, one with unidirectional cash flow, since reward points can be exchanged into a good or service but not into cash. Like conventional loyalty programs, the commerce rewards 316 points granted by the host organization 110 may be redeemed via a physical loyalty card, however, they are more likely to be redeemed virtually, such as due to the user's association with a particular cell phone, or association with a user account, and so forth, thus negating the need for a physical card.

Nevertheless, there are important distinctions with respect to the use of commerce rewards 316 points from the host organization 110. First, as noted above, the commerce rewards 316 points are granted by the host organization to the customers of the tenant orgs 305A-C and secondly, the commerce rewards 316 points are spendable by the customers of the tenant orgs 305A-C at any tenant of the host organization 110, despite such tenants likely being unaffiliated with one another. Indeed, it is irrelevant whether or not the tenant orgs 305A-C are affiliated with one another, as the value of the redeemed commerce rewards 316 points are paid for by the host organization 110 to the tenant org 305A-C at which such commerce rewards 316 points are redeemed.

There is yet a further distinction. With conventional rewards programs, the customer is signed up for the loyalty program directly with the merchant in question, having voluntarily opted in, having submitted an application, or having given personally identifiable information directly to the merchant. In fact, it is very likely that the customer is participating in such loyalty programs with one or more of the tenant orgs 305A-C that utilize the cloud computing platform of the host organization 110.

However, unlike such conventional rewards programs associated with such merchants, it is the host organization 110 which requests the opt-in participation by the customers and not the merchant tenant orgs 305A-C which utilize the host organization's 110 cloud services.

Figure 3B:
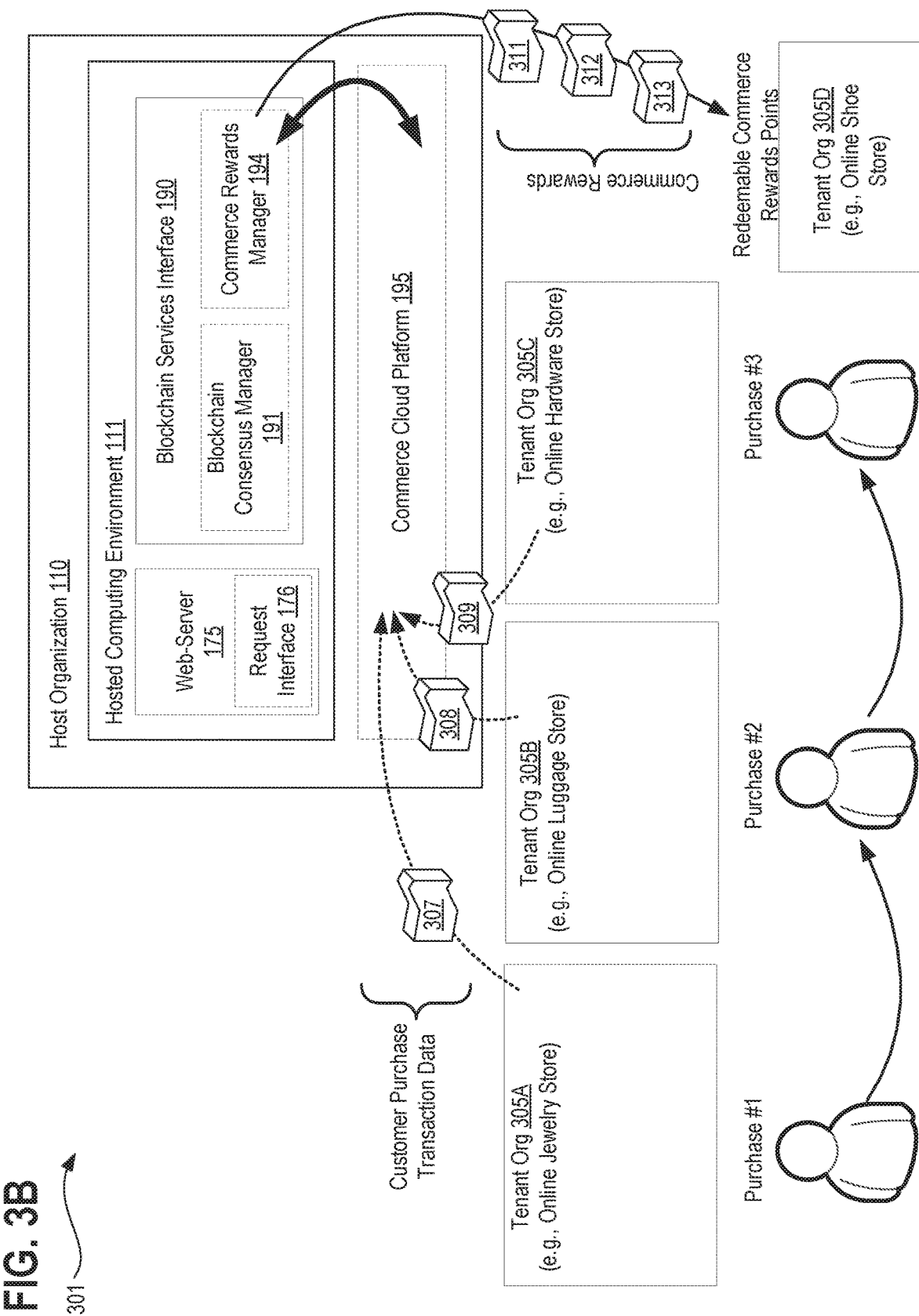
FIG. 3B depicts an exemplary architecture in accordance with described embodiments.

FIG. 3B depicts an exemplary architecture 301 in accordance with described embodiments.

Here again, there is depicted the host organization 110 which includes the hosted computing environment 111, within which there is a web-server 175, the request interface 176, the blockchain services interface 190 within which operates the blockchain consensus manager 191 and the commerce rewards manager 194. However, there is now additionally depicted the commerce cloud platform 195 of the host organization providing cloud based e-commerce services (e.g., storefronts, financial transaction processing, inventory and CRM systems, etc.) on behalf of a plurality of tenant organizations 305A-C which subscribe to and utilize such cloud based services of the host organization 110, while allowing those tenant organizations 305A-C to apply wholly customized branding to their interface. In such a way, the merchant may utilize their own logos, domain, and general look and feel, while utilizing the cloud based services provided by the commerce cloud platform 195.

Additionally depicted is a purchaser making a series of purchases, with purchase #1 at the online jewelry store of tenant organization 305A, and then purchase #2 at the online luggage store of tenant organization 305B, and finally purchase #3 at the online hardware store of tenant organization 305C. With each purchase, corresponding customer purchase transaction data is transmitted from the tenant orgs 305A-C to the commerce cloud platform 195 of the host organization 110. Specifically, with purchase #1 from the online jewelry store of tenant organization 305A, customer purchase transaction data 307 is transmitted from the tenant org 305A to the commerce cloud platform 195. Similarly, with purchase #2 from tenant organization 305B, customer purchase transaction data 308 is transmitted from the tenant org 305B to the commerce cloud platform 195, and finally with purchase #3 from tenant organization 305C, customer purchase transaction data 308 is transmitted from the tenant org 305C to the commerce cloud platform.

In such a way, the commerce cloud platform 195 of the host organization 110 now has customer purchase transaction data 307-309 for every customer purchase #1, #2, and #3, although, the transactions are not yet associated with one another nor is it known that the same purchaser conducted all three purchases #1, #2, and #3.

Consider therefore, the following example of a customer, Alice who shops from a variety of online stores. For example, Alice goes to the online jewelry store (tenant organization 305A) and purchases jewelry. In this instance, the merchant, an online jewelry store, is one of many merchant tenant orgs 305A-C which utilize the host organization's 110 cloud services and specifically the commerce cloud platform 195 of the host organization 110. When Alice makes a purchase from the jewelry store, the host organization 110 receives limited information (customer purchase transaction data 307) from the jewelry store (tenant organization 305A), but such information describes the purchase transaction and is not sufficient to uniquely identify Alice as the customer. Nevertheless, the host organization 110 may allocate some commerce rewards 311 points which are associated with that purchase #1 transaction by Alice, notwithstanding the fact that it is unknown at this point who Alice is as a customer.

Subsequently, Alice goes to a luggage store (tenant organization 305B), in which case the luggage store is also a commerce cloud customer and merchant tenant org 305A-C which utilizes the host organization's 110 cloud services. Again, Alice conducts purchase transaction #2, triggering the customer purchase transaction data 308 to be transmitted to the commerce cloud platform 195, and the commerce rewards manager 194 responsively allocates commerce rewards 312 points which are associated with the purchase #2 transaction, with both the first and second purchases being tracked by the host organization 110, although at this point the two transactions are not associated with one another or with Alice as a known individual.

Next, Alice goes to an online hardware store (tenant organization 305C) and makes conducts the purchase #3 transaction, and again some commerce rewards 313 points are allocated for that transaction by the commerce rewards manager 194 of the host organization 110 responsive to the commerce cloud platform 195 receiving customer purchase transaction data 309 from tenant org 305C.

Conventionally, the points earned by Alice at each of the jewelry store, the luggage store, and the hardware store would be unique to each of those respective merchants, tracked by each of those respective merchants, and not redeemable with one another. Essentially, Alice would have acquired all those points, but because they are specific to each of the particular stores, they are not available to be spent at another store.

However, with the commerce rewards 311, 312, and 313 points allocated by the commerce rewards manager 194 of the host organization 110 to the various transactions (purchases #1, #2, and #3) conducted by Alice, it is possible for Alice to spend those commerce rewards 311, 312, and 313 points at any of those prior stores, or at another merchant tenant org 305A-C of the host organization utilizing the host organization's 110 commerce cloud platform 195, regardless of whether or not Alice has ever been to such a merchant previously. For example, Alice may proceed to a shoe store next, and could spend those commerce rewards 311, 312, and 313 points earned from the jewelry store, the luggage store, and the hardware store at the shoe store (e.g., tenant org 305D) as redeemable commerce rewards points, subsequent to an opt-in and validation procedure which is described in greater detail below.

Conventional loyalty rewards programs simply do not permit the use of such commerce rewards 311, 312, and 313 points amongst one another absent each of the merchants purposefully operating within some kind of a sharing mechanism, similar to the way some airlines permit their points to be redeemed or exchanged with other merchants. However, with the commerce rewards 311, 312, and 313 points granted by the commerce rewards manager 194 of the host organization 110, it is not necessary for such merchants to participate within a sharing scheme, but rather, so long as each merchant is a merchant tenant org 305A-C of the host organization which utilizes the host organization's 110 commerce cloud platform 195, then Alice will be enabled to receive, accumulate, and ultimately utilize the commerce rewards 311, 312, and 313 points from any such merchant at any other merchant that is a merchant tenant org 305A-C of the host organization.

Another significant problem with conventional loyalty rewards programs is that there simply is no way to identify that Alice who purchased goods at the jewelry store (tenant org 305A) is the same purchaser at the hardware store (tenant org 305B) or the clothing store (tenant org 305C), because from the viewpoint of each merchant, Alice is a completely different transaction participant in all these three instances of the host organization's 110 commerce cloud platform transactions. Stated differently, while the host organization now has data specific to each of the transactions, having received customer purchase transaction data 307, 308, and 309, each transaction stands in isolation and is in no way affiliated with the other transactions.

Figure 3C:
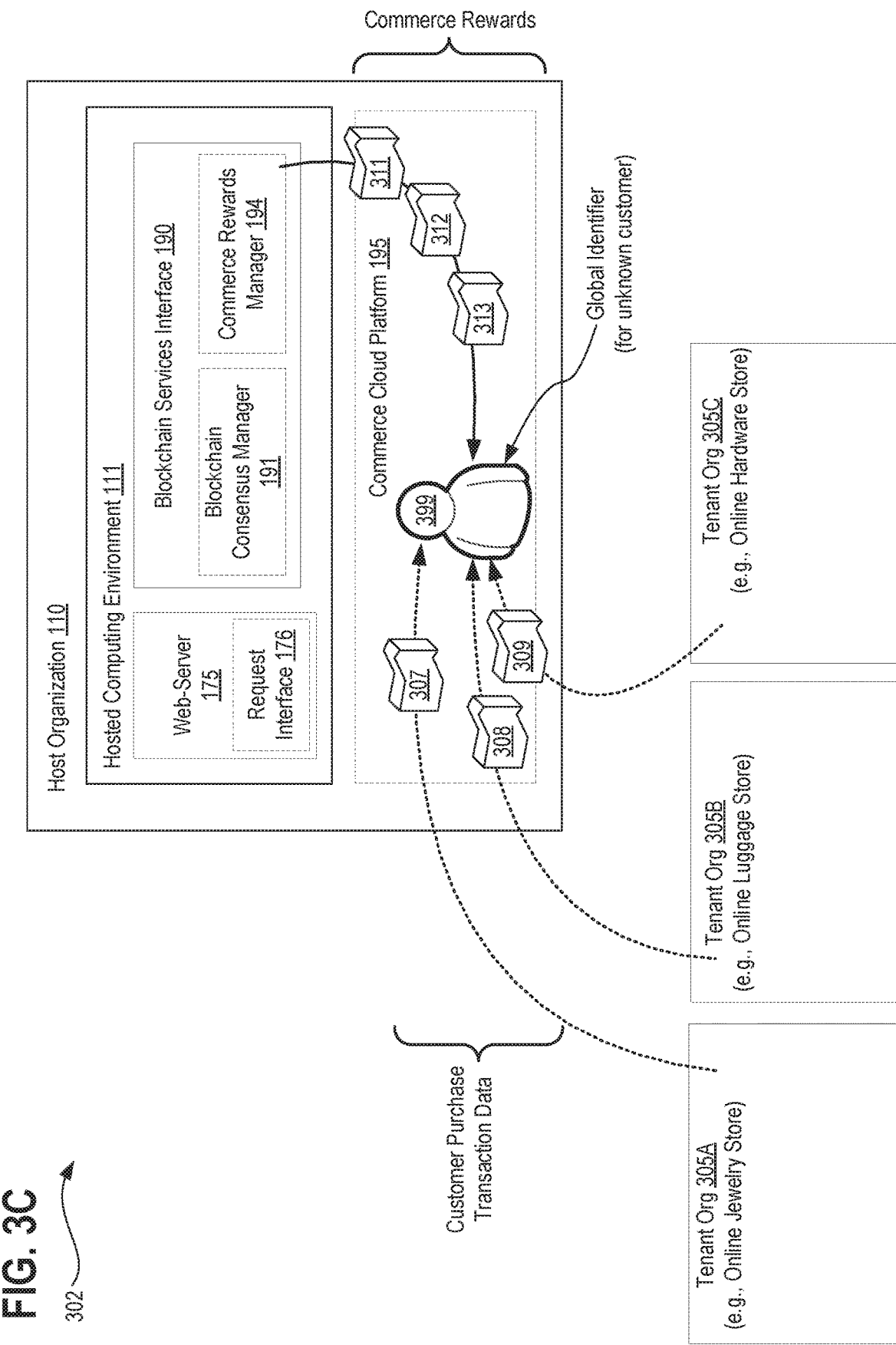
FIG. 3C depicts an exemplary architecture in accordance with described embodiments.

FIG. 3C depicts an exemplary architecture 302 in accordance with described embodiments.

There is again depicted the host organization 110 with its cloud commerce platform 195 which interacts with the commerce rewards manager 194 to grant commerce rewards 311, 312, and 313 points responsive to receipt of the customer purchase transaction data 307, 308, and 309. However, as is depicted here, when Alice purchases something from tenant Org 305A causing the customer purchase transaction data 307 to be transmitted to the cloud commerce platform, a global identifier 399 is created for Alice as an unknown customer. Thus, as soon as Alice purchase the jewelry from the online jewelry store (tenant Org 305A), she is assigned the global identifier 399 which is generated and stored by the commerce cloud platform 195 within the host organization 110, thus identifying this transaction purchaser (associated with customer purchase transaction data 307) across all customers, despite the fact that the commerce cloud platform 195 does not yet know the identity of Alice.

At this stage, the purchaser associated with customer purchase transaction data 307 is known to the commerce cloud platform via global identifier 399 and the commerce rewards 311 points generated and allocated by the commerce rewards manager 194 responsive to the receipt of customer purchase transaction data 307 are now also associated with global identifier 399. Thus, Alice will not lose her points, despite being an unknown customer.

As noted before, the commerce rewards 311 points are granted by the host organization 110 and not by the merchant associated with Tenant Org 305A. Such points may thus be utilized similar to a coupon or discount, and may be exchanged in lieu of cash at any merchant which utilizes the commerce cloud platform 195 of the host organization 110.

Now, because the global identifier 399 (also called a salesforce identity) has been created for Alice as the unknown customer, when Alice next goes to the online luggage store (tenant Org 305B) and signs in or creates an account with the online luggage store (tenant Org 305B), the commerce cloud platform 195 will prompt Alice after successfully logging into her account with the online luggage store: "Hello, are you the same customer that purchased the jewelry from Jewelry Store (Tenant Org 305A) recently?" Obviously the prompt would be customized to refer to the particular name of the store, rather than just "Jewelry Store" or "Tenant Org 305A" so as to better align with the customer Alice's shopping experience.

Assuming Alice confirms, "yes," she is the same customer, then any points gained from the purchase at the online luggage store (Tenant Org 305B) will be granted and associate with global identifier 399 on behalf of Alice.

Such an association, that Alice may be the same purchaser at both Tenant Orgs 305A and 305B may be made by the commerce cloud platform 195 based on a variety of information, such as a Unique Identifier (UID) of a computer PC or laptop passed with the customer purchase transaction data 307 at the time of the first transaction, or based on a Mobile Identification Number (MIN) similarly utilized to uniquely identify a cell phone and passed with the customer purchase transaction data 307, or based on a same Internet Protocol (IP) address passed with the customer purchase transaction data 307, or based on a media access control address (MAC address) passed with the customer purchase transaction data 307, or based on a same geographical locator tag associated with the device utilized for the purchase and passed with the customer purchase transaction data 307, etc. Similarly, a match on multiple of such potentially identifying information variables will increase the confidence of the commerce cloud platform 195 that the purchaser is likely the same individual. According to certain embodiments, when a match on any of the above information matches for multiple transactions, the commerce cloud platform 195 will responsively prompt the purchaser and inquire if they are the same individual for another prior purchase transaction. In other embodiments, when a probability or likelihood in excess of a threshold is attained (e.g., such as that determined by a machine learning model or other probabilistic model), then the commerce cloud platform 195 will again responsively prompt the purchaser and inquire if they are the same individual for another prior purchase transaction.

The global identifier 399 may be considered a pseudo anonymous ID because it does not yet tie back to Alice, who remains an unknown customer from the viewpoint of the commerce cloud platform 195, regardless of whether or not the tenant Org 305A knows Alice's actual identity. While Alice may have an account with tenant Org 305A and have fully authenticated with tenant Org 305A so as to conduct the purchase transaction with that merchant, the personally identifiable information known to tenant Org 305A is not shared with the commerce cloud platform 195 of the host organization, notwithstanding the fact that the host organization provides the cloud based services of the commerce cloud platform to the tenant organizations 305A-C. This is because the information of the tenant organizations' 305A-C is private and securely held in trust on behalf of those tenant organizations' 305A-C utilizing the host organization's cloud based services. In certain embodiments, the tenant organizations' 305A-C may affirmatively choose to share their data with the host organization 110 in which case that data is then known to the host organization 110, however, such explicit sharing is not required in accordance with the described embodiments, as the commerce cloud platform operates to independently identify the purchaser and associate the various transactions with the purchaser, by incentivizing the unknown purchaser to voluntarily opt-in to the incentives program and to receive the commerce rewards in exchange for confirming their identity and in exchange for providing additional verifiable information pertaining to their identity, in addition to the points gained from purchase transactions at the tenant organizations 305A-C who utilize the cloud based services of the host organization 110.

In such a way, every time that an unknown customer conducts a purchase transaction on the commerce cloud platform 195 at any participating Tenant Organization 305A-C, the host organization will create a record to store a global identifier 399 for that unknown customer and associate the limited customer purchase transaction data received at the host organization 110 from the respective merchant (e.g., one of tenant Orgs 305A-C) pursuant to that purchase transaction at the tenant organization 305A-C. The commerce cloud platform 195 will then retain the newly created global identifier 399 for comparison with other future purchase transactions in an effort to associate multiple such purchase transactions together and to then associate such purchase transactions with the unknown customer and ultimately attempt to identify the unknown customer responsive to prompting the unknown customer, all of which is stored and associated with the global identifier 399.

When the commerce cloud platform 195 has sufficient information to guess that an unknown customer for a current transaction is a match to a prior unknown customer for a prior transaction, the commerce cloud platform 195 will then prompt the customer: "hey, we think you're the same person!" and "Are you the same person that completed this luggage purchase transaction at the luggage store?" If the unknown customer does not respond to the prompt or answers in the negative, then no association is made. However, if the unknown customer answers in the affirmative, then the commerce cloud platform 195 will associate those multiple transactions together with the global identifier 399 for the unknown customer.

Subsequently, any user ID utilized to authenticate with any tenant organization 305A-C may be further matched with the global identifier 399 and it becomes easier for the commerce cloud platform 195 to match the unknown customer and the global identifier 399 with further transactions due to a greater availability of potential matching criteria for that unknown customer.

Assuming the unknown customer answers in the affirmative that they are the same purchaser, then the commerce cloud platform 195 may additionally prompt the unknown customer to opt-in to the commerce rewards program by creating a single ID. If the unknown customer then creates a single ID, it will be keyed to the global identifier 399 created previously, and additional identifying information about that unknown customer will be further associated with the global identifier 399 and the unknown customer's new single sign-on ID.

In such embodiments, if the unknown customer answers in the affirmative to the prompts, confirming that they are indeed the same purchaser associated with the multiple transactions, then additional commerce rewards points may be granted by the host organization 110 which will then be associated with the global identifier.

Similarly, if the unknown customer answers affirmative to the prompts, electing to create a new single sign-on ID, then additional commerce rewards points for creating the new single sign-on ID may be granted by the host organization 110 which will then be associated with the global identifier.

If the user creates a new single sign-on ID, then the commerce cloud platform 195 may additionally prompt the unknown customer requesting that they share their email, telephone number, full name, etc., which each piece of personal information voluntarily shared by the customer corresponding to a reward or a bounty for sharing such details with the commerce cloud platform 195, which responsively grants additional commerce rewards points to the now known customer which are then associated with that customer's global identifier and corresponding new single sign-on ID.

The commerce cloud platform 195 may additionally prompt or otherwise notify the now known customer that they may utilize their email or the new single sign-on ID to reliably log-in to any of the previously visited merchants so as to correspond their identity amongst the multiple various merchants.

Figure 3D:
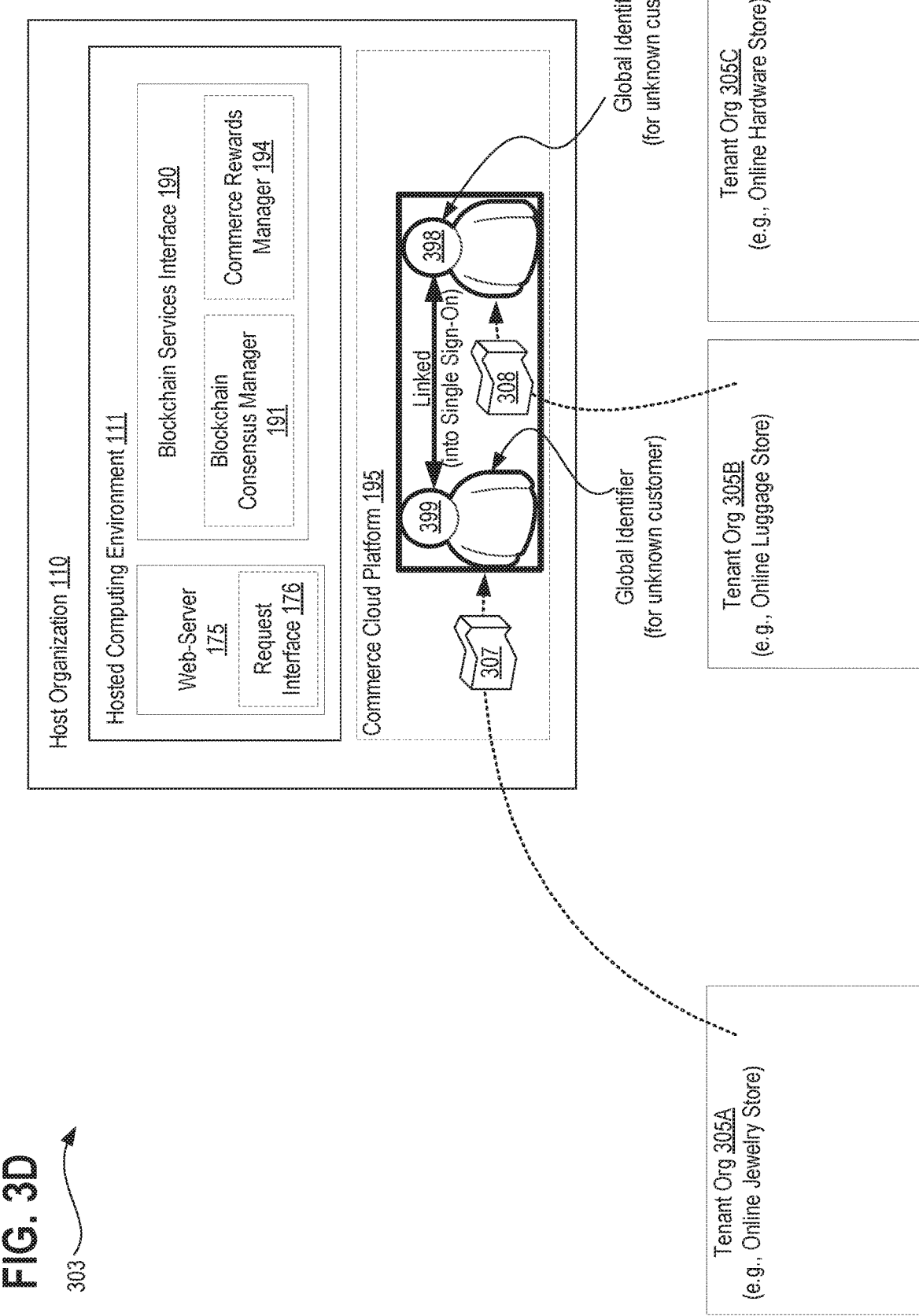
FIG. 3D depicts an exemplary architecture in accordance with described embodiments.

FIG. 3D depicts an exemplary architecture 303 in accordance with described embodiments.

According to certain embodiments, it is feasible that the same purchaser of multiple transactions triggers the creation of multiple global identifiers 398 and 399, for instance, a global identifier 399 is created pursuant to the receipt of the customer purchase transaction data 307 for the purchase transaction from tenant org 305A and a second global identifier 398 is then additionally created pursuant to the receipt of the customer purchase transaction data 308 for the purchase transaction from tenant org 305B, in each case the commerce cloud platform 195 creating and storing a record for an unknown purchaser whom, although the same individual, is not yet known to the commerce cloud platform 195 to be the same person.

Nevertheless, once the pseudo anonymous IDs from the jewelry store and the luggage store are created, they may be permanently linked together as a single joined global identifier on behalf of a single individual pursuant to the commerce cloud platform 195 identifying matching information between the two pseudo anonymous IDs, prompting the purchaser as described above, and receiving an answer in the affirmative that the purchaser of both transactions is indeed the same individual. In such an event, any points associated with either one of the two pseudo anonymous IDs will then be joined and aggregated into the confirmed linked/joined global identifier which is accessible to the purchaser through the purchaser's new single sign-on ID.

According to the described embodiments, while each of the various tenant organizations 305A-C may keep their own information about their customers private, the commerce cloud platform 195 nevertheless receives some extra pieces of information with each purchase transaction that the commerce cloud platform 195 handles on behalf of such tenant organizations 305A-C, such as the IP address, MIN, UID, MAC address, GeoTag, etc. Therefore, the commerce cloud platform 195 retains these extra pieces of information and then utilizes those to attempt the matching. Thus, whenever an unknown customer attempts to log in and authenticate with one of the tenant organizations 305A-C utilizing the commerce cloud platform 195, the host organization may recognize and match the information, such as a device logging in with a matching MIN, Mac address, UID, IP address, etc., which matches the same information stored within a global identifier 398 and 399, thus triggering the prompt to the user to confirm whether or not they are the same individual who conducted the prior transaction and requesting them to opt-in to the single sign-on service and to the commerce rewards program offered by the host organization.

According to certain embodiments, the commerce cloud platform 195 executes a matching algorithm or executes a machine learning model having been trained to perform the matching and generates as output, a verification score indicating the likelihood that the person attempting to log in is the same person associated with a global identifier 399 or 398 having conducted a prior transaction.

According to another embodiment, as part of the execution of the matching algorithm or the execution of the machine learning model having been trained to perform the matching, the commerce cloud platform 195 further queries the merchant (tenant organization 305A-C) from whom the matched transaction originated and the commerce cloud platform 195 requests confirmation from the merchant that the individual confirming that they made the prior transaction is indeed the person having made that transaction, according to the merchant. In such a way, false positives can be eliminated and an additional layer of security and certainty can be introduced without requiring the merchants to reveal their customer data. Rather than the merchants having to reveal their customer data, they simply confirm or deny the query requesting confirmation that the person attesting to a prior transaction also matches that merchant's records. According to such embodiments, the entire process is handled automatically within the host organization pursuant to permissions and permissible queries enabled by the various tenant organizations 305A-C. For instance, the query by the commerce cloud platform 195 may retrieve matching data from the Point Of Sale (POS) or Customer Relationship Management (CRM) system of the tenant organization 305A-C.

For instance, the commerce cloud platform 195 may query the POS or CRM systems of the merchant asking did this person, with this identity, name, email address, etc., conduct a purchase transaction on this specified date for this specified amount. The query is thus formed from a conformation of known data from the customer purchase transaction data 307, 308, and 308 received with the various transactions and some portion of data received from the potentially matching individual answering in the affirmative that they indeed conducted both purchase transactions.

If the merchant also responds in the affirmative, then the confidence score generated as an output of executing the matching algorithm or executing the machine learning model increases further. If the merchant fails to respond, or does not permit such queries, then the confidence score may not be increased, and if the merchant responds in the negative, then the confidence score will be degraded severely indicating that it is highly unlikely that this is a match.

According to such embodiments, the incoming customer purchase transaction data may identify limited information such as a transaction ID, the date of the transaction, the time of the transaction, the amount of the transaction, and some identifying information for the device upon which the transaction was conducted, such as the UID, MIN, GeoTag, MAC address, IP address, etc. However, the identity of the customer is not passed with the customer purchase transaction data received at the host organization from the various tenant orgs 305A-C.

Once the customer is identified by the host organization and associated with a global identifier and a single sign-on ID, the commerce cloud platform 195 no longer prompts the customer asking them if they are indeed the same person having made a prior transaction. Rather, the commerce cloud platform 195 now has a known customer associated with the global ID and the single sign-on which will match the IP address, MIN, UID, MAC address, or other matching information from incoming customer purchase transaction data and the commerce cloud platform 195 will responsively notify or prompt the known customer indicating that they have existing commerce rewards or loyalty points or indicating that they have just earned additional commerce rewards points, or indicating a new balance of commerce rewards points, etc. Moreover, the customer may elect to log in with their single sign-on ID or their email associated with their single sign-on ID, which will then give them authenticated access to the commerce rewards points with any merchant who utilizes the commerce cloud platform 195 services of the host organization.

Figure 4A:
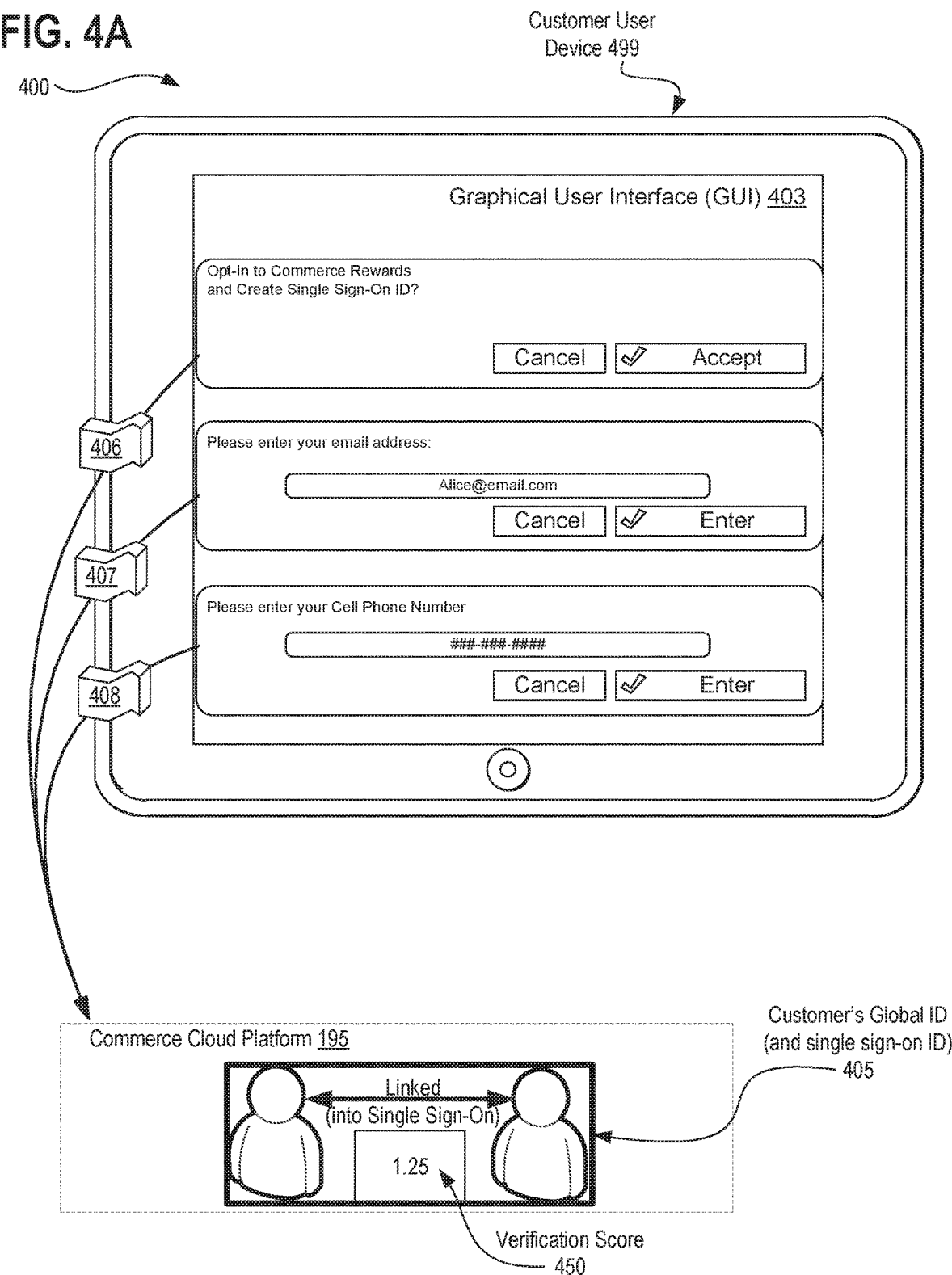
FIG. 4A depicts an exemplary architecture in accordance with described embodiments.

FIG. 4A depicts an exemplary architecture 400 in accordance with described embodiments.

For instance, there is depicted here a customer user device 499 communicably interfaced with the commerce cloud platform 195 of the host organization 110 (not shown here). The customer's single sign-on ID and global ID 405 are depicted as is a verification score of 1.25 for this particular customer. Further depicted at the Graphical User Interface (GUI) 403 of the customer user device 499 are multiple prompts. For instance, at the first prompt, the commerce cloud platform 195 is prompting the customer to opt-in to the commerce rewards program and to create a single sign-on ID. The customer may cancel or accept. If the customer accepts, then their affirmative acceptance 406 to opt-in is transmitted to the commerce cloud platform 195. Similarly, the commerce cloud platform 195 prompts the customer to enter their email address, which if entered, is transmitted 407 to the commerce cloud platform 195. Lastly, the commerce cloud platform 195 is prompting the customer to enter their cell phone number, and if entered, then their cell phone number is transmitted 408 to the commerce cloud platform 195 for storage as part of that customer's single sign-on ID or global ID 405.

According to certain embodiments, the more information the customer provides to the commerce cloud platform 195 as part of their global identifier 405 or single sign-on ID, the greater their verification score 450.

Similarly, if the customer opts-in to data sharing, or grants permission for the commerce cloud platform to share information, send marketing emails, or permit other email communications, then such permissions when granted by the customer may add another reward component and thus earn the customer still further commerce rewards points. For instance, responsive to receiving an opt-in from the previously unknown customer indicating the previously unknown customer consents to receiving marketing emails and/or marketing notifications from the plurality of merchants (and now a known customer associated with a new global ID and having their verification information validated as well as possibly having created a new single sign-on), the commerce cloud platform 195 will allocate or grant additional commerce reward points to the previously unknown customer responsive to receiving the customer's opt-in consent. Moreover, those commerce rewards points may be subjected to a multiplier and increased based on a corresponding increase in the customer's validation score.

In related embodiments, the greater the customer's verification score, the greater their commerce rewards points granted for any given transaction. According to certain embodiments, the verification score increases with additional identifying information provided to the commerce cloud platform 195 by the customer and commerce rewards earned by the customer are then proportionally increased based on their verification score, in which the verification score effectively operates as a multiplier for any commerce rewards points earned by the customer. Thus, if the customer spends a base amount of $10.00 at a merchant, their verification score may correspond to 1.0 in which case they earn the base 10.00 points, but with additional identifying information provided, their verification score may correspond to 1.25, thus corresponding to an earn of 12.50 points for the same $10.00 transaction.

In related embodiments, the customer may provide biometric or physical information, such as medical record ID, driver's license, passport, or other government issue cards, any of which may then be transmitted to the commerce cloud platform 195 for storage as part of the customer's global ID 405. With biometric data, such as a fingerprint capture from a touch screen fingerprint reader or a dedicated fingerprint reader, or a retina scan via a retina scanning sensor or cell phone, the digitized representation or digital signature of such biometric data may be transmitted to the commerce cloud platform 195 for storage as part of the customer's global ID 405.

Such biometric and physical information, once provided and stored, again increases the commerce cloud platform 195 confidence in the true identity of that person, and thus serves to increase the verification score 450 for that customer. While biometric information may be captured via a compatible cell phone, physical information such as government ID may be provided via a scan or photo capture utilizing the customer's user device 499.

Other information that may be captured includes banking details and/or credit card information. For instance, the commerce cloud platform 195 may store complete credit card information or possibly only store the last 4 digits of a card and an expiration date. Regardless, such information when matched against other sources, such as prior purchase transactions or future purchase transactions again helps to increase the commerce cloud platform 195 confidence in that individual's identity and thus increase the verification score 450 for that particular customer.

With the commerce cloud platform 195 having a high degree of confidence and thus a high validation score for the customer, it will then become exceedingly difficult for any malicious actor to imitate a known customer. Thus, fraudulent transactions may readily be detected and prevented as the matching data associated with such transactions are highly unlikely to correlate to the customer's known details in their global ID. Even if, for example, a MIN, or MAC address, or UID, or IP address were to match a transaction for the customer, the commerce cloud platform 195 could nevertheless request, for example, fingerprint confirmation from the customer to validate a questionable transaction. Similarly, the commerce cloud platform 195 could initiate a two-factor authentication process by sending a validation code to the customer's cell phone number or email address, which must then be entered to continue with an otherwise questionable transaction flagged by the commerce cloud platform 195.

The commerce cloud platform 195 may flag transactions for further validation randomly, or based on minor issues, such as the customer utilizing a new merchant, the customer spending outside of a normal range, the customer spending above or below a threshold, the customer initiating more transactions than usual within a defined period of time, the customer initiating a transaction after a long period of time, and other criteria, which may be defined manually or which may be generated and defined by a machine learning model which screens for potentially fraudulent transactions. Where a customer's transaction is flagged for further validation, customers that utilize the single sign-on ID and global ID and are thus known to the commerce cloud platform 195 may simply respond to a prompt for increased validation scrutiny, such as providing a fingerprint scan, retina scan, or responding to a two-factor authentication request.

In such a way, the commerce cloud platform 195 may stop fraudulent transactions associated with those customers that are known to the commerce cloud platform 195, thus saving time, money, and hassle for both the customer as well as the merchant and the host organization. The reduction in fraud thus reduces the costs associated with operating the commerce cloud platform 195 and thus provides a source of funds via which to incentivize and reward customers for providing their identifiable information to the commerce cloud platform 195.

According to certain embodiments, once a customer has created a global ID and or a single sign-on ID with the host organization, the customer may then utilize that single sign-on ID, or their email, to access other services provided by the host organization which are not necessarily purchase related. For example, the customer may utilize their single sign-on ID to access salesforce communities across different customers, other products and services such as the salesforce Chatter and salesforce Einstein platforms, as well as any other service or product offering to which the customer is subscribed or has access rights within the salesforce.com ecosystem.

In other related embodiments, transactions at merchants which utilize the commerce cloud platform 195 are also supported, such as exchanges, returns, and warranty requests. For example, if the customer purchased an item from the hardware store, their purchase history can quickly be located using their single sign-on ID, so as to facilitate the return, exchange, or warranty transaction.

If the customer visits a brick and mortar physical store location, many of which are participating merchants that utilize the commerce cloud platform 195 of the host organization, then again the customer can identify themselves and authenticate with the brick-and-mortar's physical location systems simply by scanning a QR code or entering their phone number or email at check out, or alternatively, by authenticating on their customer user device 499 via which the customer can pay for the transaction using stored payment data.

Customer can also download apps provided by the various merchants who utilize the commerce cloud platform 195 and those apps can authenticate utilizing the customer's single sign-on ID, from which the app then has access to the customer's validation score and global ID profile data, again to facilitate more seamless transactions with the merchants and to help prevent fraudulent use of that known customer's identity and payment details.

Within the healthcare space, the user can validate their identity with doctors and hospitals and pharmacies by scanning a QR code on their cell phone or other customer user device 499 at the service provider that links their known customer global ID with that provider's system, thus providing an attestation of identity to the service provider with a very high degree of confidence.

Further still, the host organization and the commerce cloud platform 195 may utilize the customer's validated identifying information to push more personalized content to the customer as well as provide better and more personalized recommendations to the customer. For instance, such recommendations and content may be based on all the information that the commerce cloud platform 195 has captured across all customers or based on particular information about a small group of customers or even based on particular information about a single customer.

For instance, as the customer provides validation information which is then associated with the customer's new global ID, not only does the commerce cloud platform 195 provide commerce rewards points to the customer for purchases from merchants utilizing the commerce cloud platform 195 and provide incentives to the customer for providing such validation information by applying a points multiplier to the customer's commerce rewards points based on the customer's increased validation score (e.g., a points multiplier may be applied to base points to increase total points allocated to the client based on an improved validation score), but the system additionally provides recommendations to the customer which are tailored to that particular customer's interests and usage patterns based on that customer's verified global information.

Once the customer has opted in to provide such information, additional identifying information and additional verification by the customer improves the verification score for that customer and thus translates into additional redeem offers for goods and services at the merchants of the commerce cloud platform 195 (with the redeem offer being paid for by the host organization) and increased earning rates of commerce rewards for everyday spending by that customer.

Figure 4B:
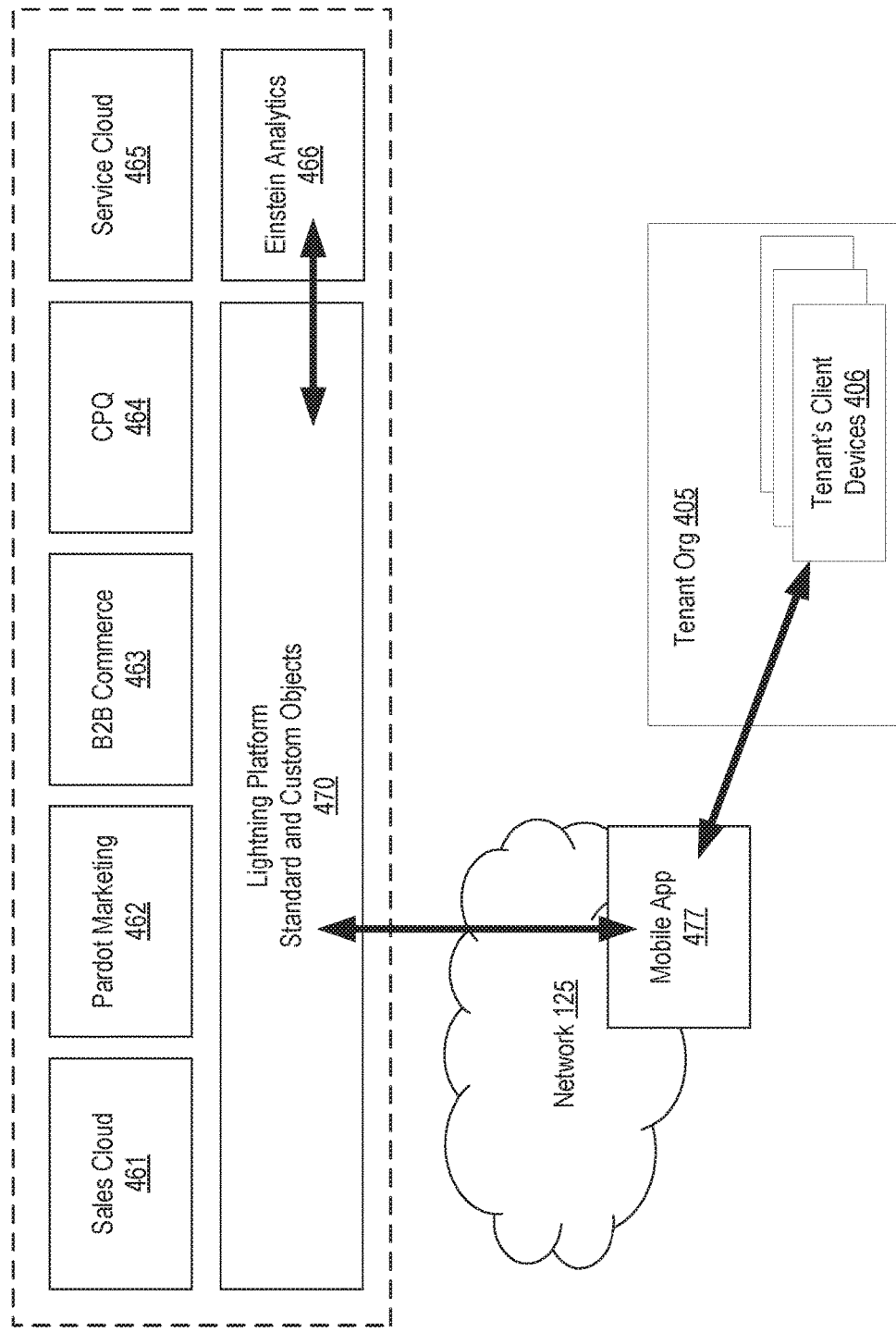
FIG. 4B depicts another exemplary architecture in accordance with described embodiments.

FIG. 4B depicts another exemplary architecture 401 in accordance with described embodiments.

Every company wants to deliver connected customer experiences across channels and departments. These experiences need to span siloed organizations, processes and infrastructure across marketing, commerce, sales and service.

For customers of Salesforce B2B (Business to Business) products, all information is in one place, in a single data model for marketing, sales, B2B commerce and service. This makes it easy for a marketer to see how their campaigns turn into leads, opportunities, pipeline, and sales. A sales rep can see support cases before they go into a meeting. Support reps can see open sales opportunities. Customer account hierarchies and contact relationships enable even deeper visibility.

Furthermore, the various platform modules offered by the host organization, including the Salesforce.com Sales Cloud 461, Service Cloud 465, Pardot marketing 462, B2B Commerce 463, CPQ platform 464 (e.g., "Configure, Price, Quote software" or "CPQ software"), Einstein Analytics 466 platform, as well as others including the Community Cloud platform, Health Cloud platform, Financial Services and Lightning Platforms, all use the same data model, called Standard and Custom Objects 470 which is exposed and provided by the lightning platform. Not only do these modules and platforms work together, but the data is also available via the Einstein Analytics 466 module and through and the Salesforce Mobile app 477.

The Einstein Analytics 466 permits users to explore all of their data quickly and easily by providing AI-powered advanced analytics, right within the Salesforce environment. Users can manage their datasets, query data with Salesforce Analytics Query Language (SAQL), and customize dashboards, all programatically. In addition to offering pre-built apps for Sales, Service, and Marketing, the Einstein Analytics Platform gives users the flexibility to: Build their own custom, intelligent analytics apps; utilize Salesforce APIs and SDKs to enhance the user's apps; connect to outside data sources to see all of their data in one place, even when such data is not actually stored internally to the Salesforce cloud.

For example, users are enabled to create analytics datasets and produce useful charts from those datasets. With analytics charts, users can transform tables of data into beautiful and informative visualizations that do not require audiences to do math in their heads. Analytics has built-in map charts of various geographical areas which may be utilized like any other chart to display a visualization of accessible data.

Through the supporting lightning platform providing standards and custom objects 470, all data within the Salesforce ecosphere is accessible to the tenant orgs 405 through PC GUI interfaces or mobile app 477 platforms.

Figure 4C:
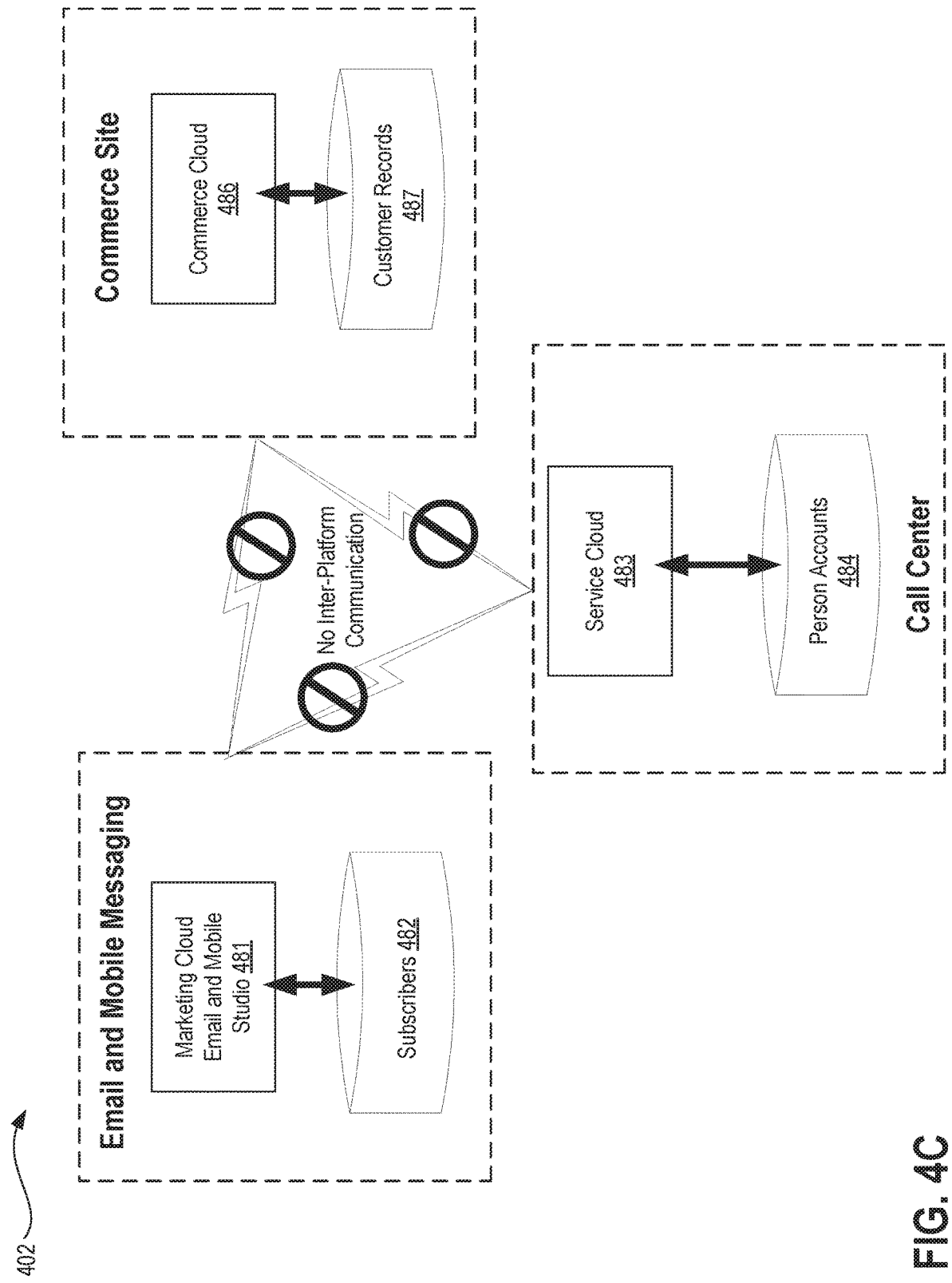
FIG. 4C depicts another exemplary architecture in accordance with described embodiments.

FIG. 4C depicts another exemplary architecture 402 in accordance with described embodiments.

In the world of Business to Consumer (B2C) services and applications, pre-defined connected, cross-channel experiences are commonplace for large ecommerce platforms.

Such platforms provide customers with product recommendations on ecommerce website platforms and via a mobile app. For example, after a customer places an order, the customer may receive emails and SMS messages, confirming the customer's order, giving the customer shipping updates, and cross selling related products. These services are provided by the email and mobile messaging platform as supported by the marketing cloud utilizing the email and mobile studio 481, supported by the subscribers 482 database.

Moreover, if the customer has a support issue, they may create a ticket or open a case and an agent will have all of the context they need to quickly solve that particular customer's issue. Such functionality is supported by the call center platform via the service cloud 483 which is supported by the connected person accounts database 484. The additional context may be provided by the commerce site's available customer records 487.

Notably, however, certain retailers, especially large brick and mortar retailers, often face extreme difficulties with integrating such data due to the fact that they simply lack any form of inter-platform communication, as is depicted here. For instance, while the call center permits communication between its database and its service cloud 483, there is no mechanism for such conventional retailers to communicate data from the service cloud to the commerce site or to the email and messaging platform, or vice versa.

Large ecommerce platforms have blurred the lines between Commerce, Marketing and Service, with the technology having been created by an army of engineers. Despite such developments, traditional retail, CPG, banking, government agencies, and pharmaceutical companies continue to struggle to deliver this type of integrated experience.

Salesforce provides leading apps for B2C engagement across Marketing, Commerce, and Service. For instance, the salesforce.com Marketing Cloud is tied for #1 in Market Share according to IDC. The salesforce.com Commerce Cloud is rated as the #1 Commerce App, according to Forrester. The salesforce.com Service Cloud is rated as the #1 Service App, according to Gartner. By themselves, such cloud platforms provide extensive benefits, yet, creating inter-platform communication channels between such platforms and rolling out cross-channel use cases can still be challenging for many customer organizations.

In Sales and Service Cloud, B2C customer records are represented as Person Accounts Objects which are stored within the person accounts 484 database. In Marketing Cloud Email & Mobile Studio (also referred to as ExactTarget), subscriber tables are provided as Data Extensions. In the Commerce Cloud (also referred to as Demandware), customer tables are called Customer Records. With conventional methodologies, it is the requirement of the system architect to tie them together, resolve multiple records of the same customer across systems, and then roll out connected experiences.

Even for those having high levels of technical expertise, architecting such solutions is extremely time consuming, error prone, and technically complex.

Therefore, an inter-platform communications mechanism would improve the present state of the art through the practice and implementation of the systems, methods, and apparatuses for improving upon, modifying, and expanding upon blockchain and related distributed ledger technologies by providing means for implementing consumer data validation, matching, and merging across tenants with optional verification prompts utilizing blockchain technologies in conjunction with a cloud based computing environment as is described herein.

Figure 4D:
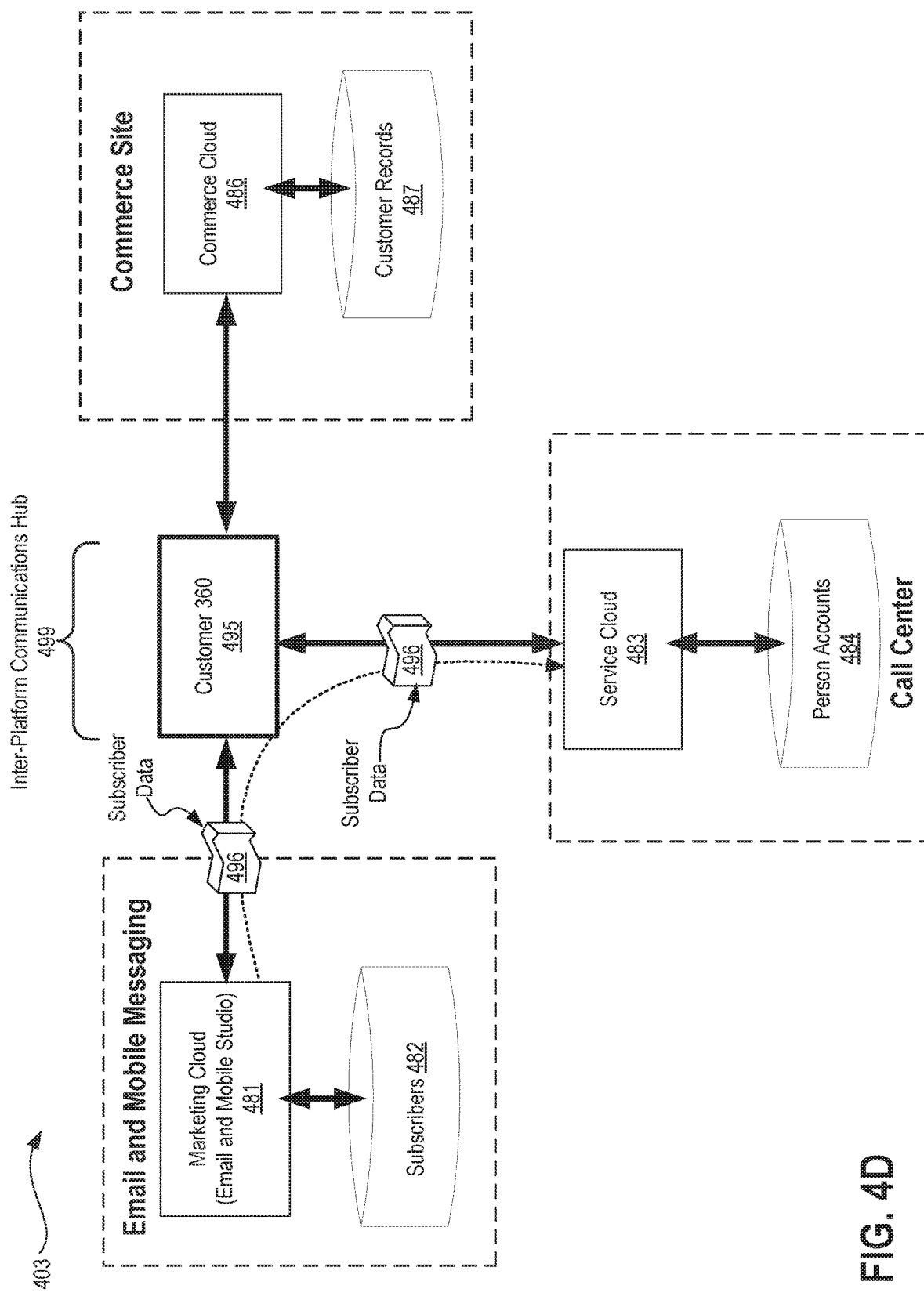
FIG. 4D depicts another exemplary architecture in accordance with described embodiments.

FIG. 4D depicts another exemplary architecture 403 in accordance with described embodiments.

As depicted here, the Salesforce Customer 360 platform (e.g., element 495) provides an inter-platform communications hub 499 operating as a new cross-cloud technology initiative which in turn provides the host organization's B2C Marketing, Commerce, and Service platforms and products with improved inter-operability, improved inter-platform communication, and generally permit such products to work better together.

With Customer 360 (e.g., element 495), administrators register their various instances of marketing cloud's email and mobile studio 481, commerce cloud 486, and service cloud 483. This enables customers to map customer records from service cloud 483 person accounts 484, marketing cloud 481 subscribers 482 (data extension), and commerce cloud 486 customer records 487 and profiles into one, single, unified, canonical view of the customer.

In such a way, Customer 360 (e.g., element 495) provides customer resolution by, for example, assigning a unique ID to each person such that the platform may utilize to later stitch together multiple records of that person across different and varied systems. For example, if John Doe has a customer record in Marketing Cloud, another record in Commerce Cloud, and another record in Service Cloud, the system can then search for, identify, and determine that John Doe is one person, not three people, thus permitting the business or organization to engage him accordingly with fuller and richer context for that particular customer.

Figure 4E:
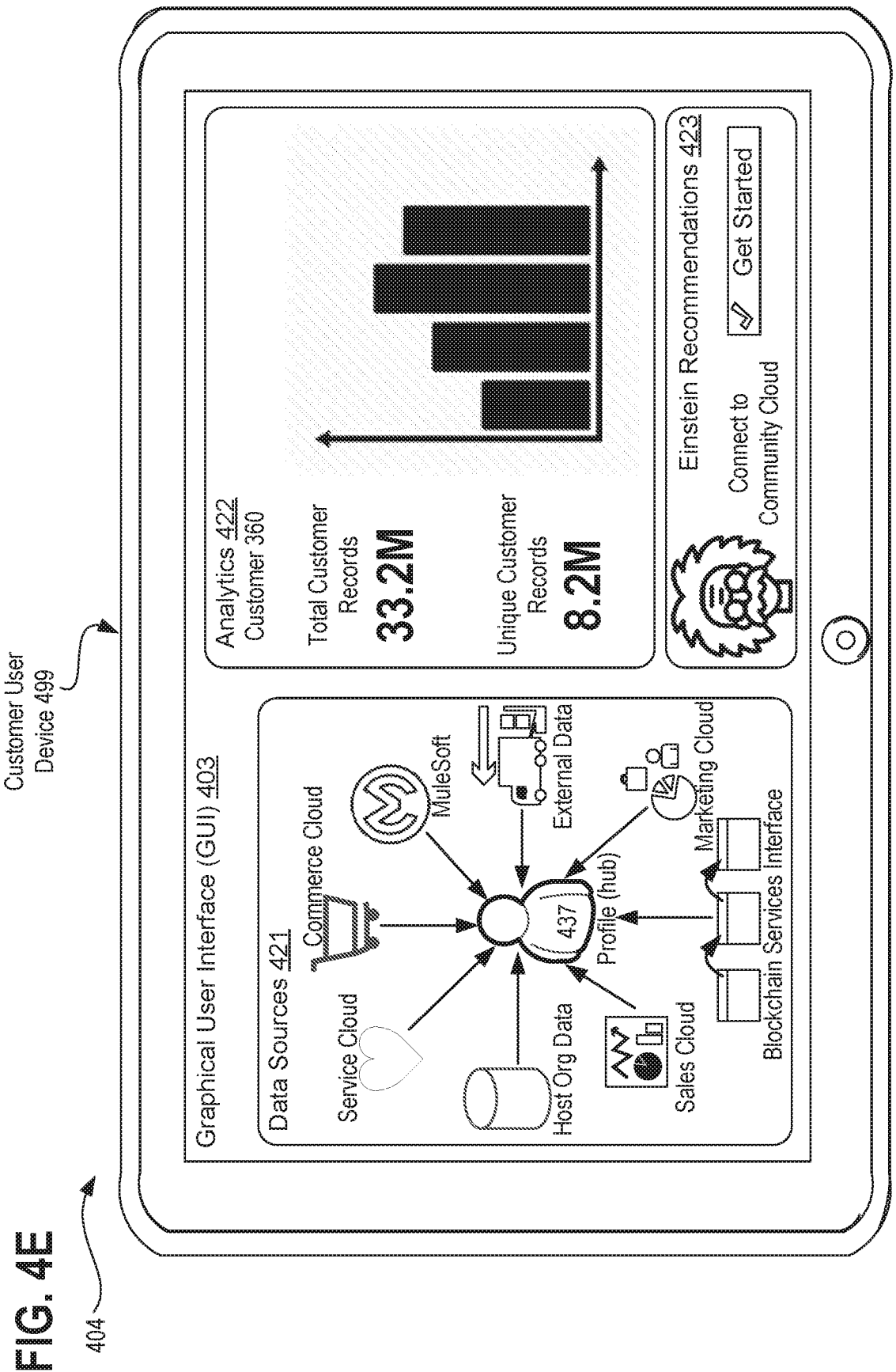

FIGS. 4E and 4F depict additional exemplary architectures 404 and 405 in accordance with described embodiments.

Rather than replicating all of the related data (such as opened tickets, customer service cases, order history, etc.) into one single central storage location, Customer 360 (e.g., element 495) creates and stores a customer profile 437 which then operates as a central hub through which to exchange data and events across the systems at the time of need for that particular customer represented by the profile 437.

For example, as depicted at FIG. 4E, there are multiple data sources 421, each of which are linked with a common profile 437 which operates as a hub through the use of a unique profile ID. For example, the profile 437 may be utilized to update, write, search, and retrieve data from any of the service cloud, the commerce cloud, from the MuleSoft platform, from internally stored host organization data sources (e.g., CRM records, stored application data within Salesforce.com, etc.) from the sales cloud, from the marketing cloud, from an internally or externally hosted blockchain via the blockchain services interface, or from any external data source communicably interfaced to the host organization, such as other cloud platforms.

This information may then be consumed in support of consolidated analytics 422 across the dataset, rather than having to rely upon fragmented analytics which likely will not tell a complete and holistic story for any large customer organization. For example, as depicted here, the analytics 422 has now identified 33.2 million total customer records and has identified that there are 8.2 million unique customer records within this massive dataset.

Still further enabled are therefore the ability to provide Einstein recommendations 423 by connecting the analytics and available data sources lined via the customer 360 platform with the community cloud.

Connected customer experiences are therefore powered by Customer 360 (e.g., element 495) enable customer organizations utilizing the Salesforce app, including platform and industry solution teams, to build out-of-the-box, cross-cloud features and experiences that use Customer 360. For example, a service cloud agent's console operating from the service cloud 483 will include a reconciled customer profile (see e.g., profile 437 at FIG. 4E), and may further include commerce cloud order history pulled from customer records 487 and may further include shopping cart data pulled from subscribers 482 data at the email and mobile messaging and marketing cloud 481 platform. For instance, as is shown here, subscriber data 496 is depicted as being passed from the marketing cloud 481 platform through Customer 360 (e.g., element 495) and down into the service cloud 483, although the direction of data travel may be different and is not limited to any particular direction.

With such functionality, it is therefore not only possible for a customer service agent utilizing the service cloud 483 to see the customer's profile and richer contextual information about that customer, but the customer experience may be further improved by enabling the customer service agent to actually place an order through the marketing cloud 481 from the service cloud platform 483 on behalf of a customer, all of which is powered by Customer 360 operating as the inter-platform communications hub 499.

Additional examples include the marketing cloud triggering abandoned shopping cart journeys, triggered by the Commerce Cloud, powered by Customer 360 and pre-built assets for enhanced functionality such as journey templates, all of which are delivered out of the box to customer organizations utilizing the host organization's services and specifically utilizing the customer 360 platform.

In such a way, the Salesforce Customer 360 platform provides a new way for companies to connect Salesforce apps and deliver unified cross-channel customer experiences. With the aid of the Customer Success Platform, Customer 360 will help companies move beyond an application-specific or a department-specific view of each customer by making it easier to create a single, holistic customer profile to inform every interaction through the practice and implementation of the customer 360 platform (element 495). By placing the customer at the center of the business, Customer 360 enables companies to usher in dynamic new customer engagement models that bring together service, marketing, commerce and more in entirely new ways.

Customer 360 further permits brands to go that extra mile to deliver an amazing cross-channel experience by creating a single, unified, and consolidated view of the customer to yield far richer context permitting such brands and businesses to better serve their customer base. While such consolidation is historically challenging for any company to deliver consistently themselves, the Customer 360 platform greatly simplifies this process on behalf of such brands, thus making it easier for companies to bring service, commerce and marketing together to deliver the unified experiences that their customers demand—with clicks, not code.

The Connected Experience Imperative: Seventy percent of customers say connected experiences—an engagement with a brand that reflects an understanding of past actions, product usage, and a host of other personalized factors—are very important to winning their business. They expect a consistent experience when connecting with a company, whether they are interacting with a service agent or shopping for a pair of shoes. Despite this desire, disconnected experiences are an all too common occurrence—whether it's the support agent who doesn't have a historical view of previous purchases, an email marketing offer for the very same product that was purchased just hours before, or a service representative who instructs the customer to reach out through a separate channel for additional assistance because they don't have all the relevant information at their fingertips.

These siloed experiences are equally frustrating for companies. Customer-facing employees lack a unified customer record, resulting in a fragmented view of each customer. Critical information that makes up a complete customer profile is spread across multiple systems. Traditional methods used to unify customer data and plug it back into engagement applications require extensive IT resources, and are difficult to change when organizations need to deliver new personalized customer experiences quickly.

Companies need a new way to empower their organizations to manage and create connected customers experiences that surface the right information to the right people at the right time and will thus benefit greatly through the use of the Customer 360 platform.

Delivering a Unified Customer Experience with Salesforce Customer 360 is made possible through a set of powerful platform services that enhance data management across Salesforce apps and provide instant access to consistent, reconciled customer data.

Such enabled capabilities include, for example: a click-based UI for app and data management enabling admins to establish trusted connections between Salesforce apps and orgs; a mapping and reconciliation function to identify, map, and reconcile data across the various clouds when connected via the customer 360 inter-platform communications hub 499; and the further ability to create a canonical data model that provides a single representation of a customer's data for connected systems, thus eliminating the problem of having redundant and fractured data spread across multiple distinct platforms.

Previously companies had to rely on point-to-point connections, but such connections are difficult to establish and fail to integrate all potentially available data for a single customer. Conversely, with the customer 360 platform capabilities as described herein, companies now have a straightforward and secure mechanism by which to connect their customer data, thus enabling such companies with one single place by which to view their customer related data within the wide array of available Salesforce apps provided by the host organization.

Still further provided via the customer 360 platform are reconciled 360 ID and profiles across connected apps. For instance, a single ID enables Salesforce apps to recognize a customer across multiple channels regardless of how that customer identifies themselves, be it via name, email, phone number, social media handle, etc. Data management capabilities prepare, match, reconcile and update the customer profile across clouds, and data exchange features enable employees to pull up the right customer data exactly when needed, such as when a service agent may need to pull a list of past purchases a customer has made so they can better assist in solving a problem. Unlike massive data lakes or data warehouses that can become costly and tend to slow businesses down, the customer 360 platform implemented by the inter-platform communication hub 499 leaves data at the source where it originated, retrieving it only when needed, thus eliminating all synchronization and data redundancy inefficiency issues.

Still further provided are pre-built packages for Service, Marketing and Commerce. These packages enable companies and customer organizations associated with the host organizations cloud computing suite of services to quickly deploy experiences for the most common use cases, such as a Service Cloud experience that enables agents to see purchase and browsing history from the Commerce Cloud, or a Marketing Cloud journey that is automatically triggered by an event in Commerce Cloud. Each package has the necessary components to accelerate the delivery of connected experiences. For example, utilizing the Service Cloud, components provided include pre-built connectivity to the Customer 360 platform. In the Marketing Cloud, pre-built journey and email templates are provided which contain content and data sourced directly from the Customer 360 platform. And in the Commerce Cloud, data and events are automatically distributed to every system connected to Customer 360 via the inter-platform communications hub 499 once identified, mapped and connected.

While the generalized concept of a single customer view is not new, the technology and capabilities which permit salesforce.com to deliver that view is entirely new and built from the ground up. The customer 360 platform handles data in a highly efficient and secure manner, by allowing such data to remain within the systems that originally stored and managed such data, and calling upon the data only when needed, rather than creating massive centralized lakes of duplicate data which require constant synchronization, reconciliation, management, and result in costly wasted computing recourses.

Therefore, tenants, customer organizations and partner businesses may focus less on data management and more on delivering truly unified cross-channel experiences. For example, if a customer of an apparel company fills up their cart with merchandise while on a Commerce Cloud-powered website and then abandons it, this event, according to certain embodiments, may be configured to automatically trigger an action related to unfulfilled shopping cart journeys via the marketing cloud 481. By adding such a customer into a campaign in the Marketing Cloud offering discounts to the customer for those products abandoned in their cart, potentially greater sales conversions may be realized. Similarly, if an ecommerce retail customer reaches out to support about changing an order, an agent using Service Cloud 483 now has access to all past purchases the customer made through a Commerce Cloud-powered website, despite such data originating with and remaining within disparate cloud platforms, with the data being retrieved and shuffled to the needed platform on an on-demand basis via the inter-platform communications hub 499.

Consider the exemplary customer 360 use case: According to a particular embodiment, the matching and merging of customer/consumer data is of utmost importance to tenants and customer organizations utilizing the cloud computing services of the host organization.

While the Customer 360 platform is enabled to provide a single, unified, consolidated, holistic view of the customer, the reality is that, in this digital age, data for a single human customer or a single business is quite often scattered across various sources and 3rd party vendors. The integration and resolution of the data is a hard problem to solve and even more complex is getting the matching and merging correct. Still further complicating matters is the necessity to have such data validated and verified.

Exemplary match and merge algorithms may be based on deterministic or probabilistic matches, which may be associated with a match score or a statistical confidence score. However, prior solutions in the marketplace required that the customer of the host organization work to solve this problem. Through the practice of the disclosed embodiments, the host organization (e.g., Salesforce.com) operates to solve this problem on behalf of its customer organizations and partner organizations.

Consider for example, a consumer Samantha who is a customer of Adidas, with Adidas being a customer organization or "tenant" of the Salesforce.com host organization. In this example, Adidas utilizes the host organization's Commerce Cloud and Adidas also has a service cloud.

Therefore, the customer organization Adidas may seek to merge their data within the Commerce Cloud and their data within the service cloud, so as to result in matched and merged data indicating that both sources are in actuality the same underlying customer, namely, Samantha according to this particular example.

However, further complicating issues is the fact that Nike, a separate tenant of the host organization, may also have data pertaining to Samantha as the individual human customer, notwithstanding the fact that Samantha now, according to this example, has customer records in the Commerce Cloud platform with Adidas, in the Service Cloud platform with Adidas, and yet further still, in another host organization cloud services platform utilized by the separate and competing customer organization (e.g., tenant), specifically Nike.

Now, consider for instance that both Nike and Adidas form a limited agreement for the betterment of their respective customer bases to share certain data. While such an agreement is challenging enough on the business side in terms of negotiations and contractual obligations, the technological burdens now faced by the two organizations are immense.

However, the host organization is well suited to address these technical complexities on behalf of their respective customer organizations and tenants (Adidas and Nike in this example) by acting as an intermediary and by applying their technological capabilities to the problem rather than districting Adidas and Nike from focusing on their core business objectives, which notably is not the means by which to merge disparate customer records.

Nevertheless, consider the difficulties faced by the organizations seeking to share and merge data. For example, Nike might erroneously merge data of a different Samantha on the Nike with a customer record for the original Samantha on the Adidas side, thus necessitating that both reset the data, and thus end up with lost data and with both organizations now finding themselves in a worse position than prior to the merge.

Such a problem becomes even more convoluted when 3rd party sources enrich the data, potentially injecting noise and misleading data and variables which then trigger false matches within the available data.

As depicted at FIG. 4F, there is further provided a record matching rule engine 431, shown here as operating at the graphical user interface (GUI) 403 at the customer user device 499.

As depicted, the record matching rule engine 431 has identified a listing under match preview, in which the sample records are compared against potential matches, with additional data showing the field matches for each record and the match results.

For instance, note that the first record, John Doe having phone number 555-555-5555 is a perfect match. Each field is an exact match and the match results indicate a match.

Conversely, the second record, also for John Doe at phone number 555-555-5555 has been compared to Jane Smith with a different phone number and all records are a mismatch and the match results thus indicate no match.

The third record indicates a "fluffy" or "fuzzy" match in which the record for John Doe at phone number 555-555-5555 has been compared to a record for "Jonathon" Doe with the same phone number and as indicated, the last name and phone number are an exact match but the first name "Jonathon" has been fuzzy matched against "John" which in this example, is permitted under the Rule Information 432 on the right hand pane showing that the rule name for "Name match exact phone" is described as a "Fluffy first name match permitted" and with "Last name Exact with Exact phone," thus permitting the similar but not exact first name to warrant the match results of a successful match. Such matching logic is implemented via the matching criteria 433. Once the potential matches are reviewed, an action 432 may be taken to either cancel or to save and activate the match which will then cause the matches to be transacted onto the blockchain, linking the disparate datasets via the single unique ID which will now be associated with both matched records within the blockchain. Note that the unique ID is associated with the records but the records are not moved or otherwise changed. Transacting match results onto the blockchain will trigger a consensus and validation scheme which is described in greater detail below.

Continuing with the example from above, it is clear that neither Nike nor Adidas truly own the data. Therefore, according to described embodiments, a Customer/Consumer Resolution Validation scheme across tenants is provided which enables a mechanism by which to match and merge customer/consumer data which is then supplemented with verification and validation of that data utilizing a Blockchain which is accessible to both customer organizations, Adidas and Nike, due to each operating as a participating node on the blockchain or alternatively, due to them each having access to the blockchain via the blockchain services interface provided by the host organization, which itself operates as a participating node on the blockchain.

Consider therefore the same customer Samantha from the above example who is a customer of Adidas who, as noted above, utilizes the Commerce Cloud and also has a service cloud, along with the sharing agreement formed with Nike, the separate tenant.

Consider now that Nike, with the sharing agreement in place with Adidas, wishes to update a Phone number of the Samantha customer record.

According to an exemplary embodiment, when the record is about to update, the record is first posted into the Blockchain and then both Samantha as the customer in question and Adidas as the other tenant with whom the data is shared, both get notified. Having been notified, customer organization Adidas may now run their own validation algorithm and determine whether or not the merge is not correct. If the merge is not correct, then Adidas does not grant its consensus and because consensus is not achieved the data is not updated on the blockchain. This is what we call the validation and verification mechanism.

Stated differently, Nike may seek to update the Samantha customer record with a new or changed phone number, and in so doing, Nike will transact an updated asset onto the blockchain connected or accessible via the host organization's blockchain services interface.

This information is therefore written to the blockchain as an attempted update which has not yet been accepted to the primary chain as lacking consensus. A monitoring entity, such as the host organization's event listener, observes the change to the blockchain (e.g., based on a matching blockchain transaction type and/or other criteria) and then triggers the notifications to both Adidas and also to Samantha as the customer in question for the customer record for which the update was attempted.

Next, it is possible that Samantha responds (e.g., responds to a prompt, email, etc.) and confirms that she is the correct person and that the change or update to her phone number is accurate. This confirmation may then contribute to a confidence score or contribute to a validation score which, according to one embodiment is considered and evaluated by Adidas. In other embodiments, Samantha is not prompted or does not respond, and Adidas evaluates the change. If they confirm the change and agree then consensus is granted and the transaction is accepted into the primary chain as a valid transaction for an accepted block. However, if Adidas rejects the change or does not respond, then the change is not adopted into the primary chain and the transaction is thus deemed invalid as having failed to reach consensus and is therefore never accepted into a primary change of the blockchain.

Above and beyond the benefits described above, such a scheme may solve certain privacy and regulation issues.

Consider a second use case for a customer who does not want his wife to know, from looking at Credit card transactions, that he has purchased her a surprise anniversary gift. In this example, when credit card data originating from 3rd party sources is merged with the data of the gift buying husband, the data will be flagged for the data merger, triggering notifications to both the customer and the two customer organizations which are sharing that merged customer record. A prompt sent to the customer for verification will not be verified by the gift buying husband in this particular example, and thus, the transaction will not be confirmed as being associated with the customer record in question. Consequently, consensus for that transaction will not be reached and the merge will not be accepted into the authoritative record on the blockchain.

Consider another way of presenting this problem as systematically identifying which Samantha or which gift buying husband is correct in the event of a non-perfect candidate record match, such as the "fuzzy" or "fluffy" matching described above and which is depicted at the third and fourth record rows at FIG. 4F. From a system design perspective, is desirable to have wholly automated merging of customer data across accounts without always having to rely upon a user or client's manual input regarding when and what data to merge, as doing so could potentially result in undesired consequences that could go against customer expectations and thus degrade the customer's trust and confidence in that brand or business. Therefore, it is desirable to sometimes implement fail-safes for such customer data merges which permit the customer to act as a mandatory gatekeeper, for instance, by mandating the customer's consent to any data merge, regardless of what business entity or customer organization claims ownership of such data.

Consider still another use case in which a person does not want data to be merged because of their privacy concerns. For example, while the gift buying husband example is somewhat innocuous, perhaps a consumer has a credit card purchase for medical equipment or medical services which could reveal a particular medical condition about that consumer if merged with a customer record of another business, and potentially expose that data to a workplace colleague, employer, or to some other person, business, or entity which has no right to see such private data.

Not only does this scenario present very real and quite problematic legal implications, but also presents a potentially devastating violation of trust by a brand for that particular customer, which could easily result in harm to the brand's reputation and lost revenue.

FIG. 4G depicts another exemplary architecture 406 in accordance with described embodiments.

For instance, as is shown here, the save and activate action 432 which initiated will submit the candidate matches 444 to the blockchain. According to a particular embodiment, a smart contract is triggered based on the matching transaction type for the candidate matches which will then in turn trigger notifications to the tenant org 405 or the user associated with the user's profile 437, or both.

According to a particular embodiment, every transaction submitted to the blockchain has a specific transaction type, for instance, defined as a blockchain storage transaction type, a blockchain candidate record generated pursuant to a proposed data merger of user/customer data, a blockchain data retrieval transaction type, a blockchain create new asset transaction type (e.g., a data write to the blockchain), each of which may thus be utilized to trigger execution of a smart contract which has previously been associated with that particular transaction type to perform validation of the transaction submitted to the blockchain and specifically to perform validation of the data or metadata within the asset being added to or transacted onto the blockchain.

For example, such a smart contract may execute via the host organization's blockchain services interface (element 190 of FIG. 1) which performs the validation and then transacts the new asset onto the blockchain pursuant to successful validation of the data or metadata within the asset being stored on the blockchain. As shown here at element 463, a smart contract executes and validates the transaction for the blockchain. Subsequently, a validated transaction is then added to or transacted onto the blockchain 484 so as to record the candidate matches 444 onto the blockchain.

Existing data matching and merging engines operate somewhat ignorant to the above described potential problems of injecting noise through a data merge process or the risk of exposing potentially private data to the wrong people. For example, such solutions may operate to pull data from multiple sources and when the data presents a perfect match (for instance, same first name, same last name, same phone number, same email), then such mechanisms may generate what is known as a "golden record" for the given customer. Thus, for Samantha who is described in the examples above, a system may connect with multiple disparate platforms via APIs and retrieve data, perform matching, and then merge data into a golden record, however, such a scheme wholly ignores the privacy and consent requirements noted above.

In other systems, non-perfect matching may result in a candidate match which is then merged pursuant to data confidence requirements, however, this results in undesirable situations, above the privacy and consent concerns, in which records could be erroneously merged or in which a human must intervene to review the candidate record proposed by a merge, both scenarios being highly undesirable. Unfortunately, any human intervention presents a non-scalable and non-systematic approach, and further, presents the opportunity to inject error and noise into a system.

Moreover, such systems are rules based, and thus, engineers or data analysts must spend resources to create the rules, such as when a first name and last name match, but an email is distinct, but has a percentage overlap with a portion of a name, etc., but such rules may quickly get overly complex and still, such rules in of themselves present opportunity for error.

For example, prior systems which rely upon confidence scores for a partial match of, by way of example, an email which partially matches a customer record name may permit the record to be merged. At any scale, there will inevitably be erroneous matches and thus, incorrectly merged records which will result in customer dissatisfaction.

Therefore, a multi-step operation utilizing blockchain technologies provides a scalable solution to the above mentioned problems in which merging and matching operations are performed resulting in candidate records, yet rather than accepting the resulting merged record, the candidate record is then transacted onto the blockchain and subjected to consensus.

In such a way, a blockchain transaction with, for example, a "merged candidate record" transaction type will then trigger notifications to one or more tenant or customer organizations which may then perform their own validation and verification procedures. If a customer organization fails to validate the merged data in the candidate record or fails to respond or outright rejects the proposed merge as represented by the candidate record, then the blockchain transacted will not reach consensus and will consequently fail to attain an accepted status within a block on the main or primary chain. Stated differently, the proposed merge will not be accepted to the blockchain despite having been transacted onto the blockchain and subjected to consensus.

For example, when an administrator, user, customer organization, or some other party clicks the save and activate action 432, the record matching rule engine's 431 match preview records depicted here at FIG. 4F will be submitted to the blockchain for consensus, thus initiating the above process (e.g., triggering notifications to customers or clients requesting consensus to be granted) and if that action fails to attain consensus, then the candidate merge changes will simply be discarded, just as any blockchain transaction will be discarded if it fails to attain consensus from the blockchain's participating nodes.

Conversely, if the transaction subjected to consensus is validated by the organizations evaluating the data then this will either contribute to consensus or in certain circumstances, result in consensus, depending on the particular consensus mechanism defined for the blockchain. For example, if there are two customer orgs sharing the data and both validate and agree with the proposed merge in the candidate record, then such validation may be sufficient for consensus to be reached for that transaction.

In an alternative embodiment, an optional user verification or user consent mechanism is further applied to the candidate record and the proposed data merge. In such an embodiment, different data sources each contribute data to a candidate record based on some matching (partial or full) and yet, the record is not altered, changed, updated, or deleted. Rather, the user to whom the data applies is prompted and requested to self identify and to confirm the proposed data merge is a proper match. Thus, by way of example, a prompt may be pushed to an end user, such as a customer or consumer for a retailer business, or in a B2B context, a business may be prompted or requested to self identify and confirm the data merge.

According to a particular embodiment, the self identification implements a leak prevention process in which a so called "zero knowledge proof" or a "zero knowledge proof protocol" is provided to the user without informing the user of data which is known only from a second record for the user within the candidate record.

In cryptography, a zero-knowledge proof or zero-knowledge protocol is a method by which one party (the prover) can prove to another party (the verifier) that they know a value x, without the verifier conveying any information apart from the fact that they know the value x. The essence of zero-knowledge proofs is that it is trivial to prove that one possesses knowledge of certain information by simply revealing it; the challenge is to prove such possession without revealing the information itself or any additional information.

If proving a statement requires that the prover possesses some secret information, then the verifier will not be able to prove the statement to anyone else without possessing the secret information. The statement being proved must include the assertion that the prover has such knowledge, but not the knowledge itself. Otherwise, the statement would not be proved in zero-knowledge because it provides the verifier with additional information about the statement by the end of the protocol.

Interactive zero-knowledge proof protocols require interaction between the individual (or computer system) proving their knowledge and the individual validating the proof.

Therefore, a protocol implementing zero-knowledge proofs of knowledge must necessarily require interactive input from the verifier. This interactive input is usually in the form of one or more challenges such that the responses from the prover will convince the verifier if and only if the statement is true. That is to say, if and only if the prover does indeed possess the claimed knowledge. If this were not the case, the verifier could record the execution of the protocol and replay it to convince someone else that they possess the secret information. The new party's acceptance is either justified since the re-player does possess the information (which implies that the protocol leaked information, and thus, is not proved in zero-knowledge), or the acceptance is spurious, such that it was accepted from someone who does not actually possess the information.

In certain embodiments, a prompt or a request to the user (e.g., to the user associated with user profile 437) solicits proof that they are the same person or proof that the business is indeed the same business as identified via a candidate match. For example, a user having been matched as the same user common to two distinct customer records may be requested to provide an email or a phone number to verify they are the same user. For example, a user with a hotmail-.com email address in a first record and a gmail.com address in a second record may be contacted via the hotmail.com email address and requested to confirm they are the same person by providing the gmail.com email address, without informing the user of the precise or complete email address.

If the user prompted via the candidate match is wrong, for instance, John Doe is prompted, but is the wrong person, then they will lack the requisite information and be unable to derive the information from the leak-proof zero knowledge proof protocol.

Conversely, if the prompt results in obtaining a correct match, then the system determines based on such proof that the person in both records are the same, and yet, does so without showing the private information to the user being prompted.

Subsequent to the user prompt and verification process, the candidate record is then written into the blockchain (having attained consensus) so as to record the user's consent for the merger of the two records represented by the candidate record. Further still, according to certain embodiments, the user's consent is additionally written into each originating system. Consequently, the blockchain has the merged record and also the users consent and each partner organization which is sharing data has the user's consent to merge the data and the candidate record which each partner organization may then subject to their own private data merger validation process and each may elect themselves whether or not to merge the records. All may merge, none may merge, or some may merge, based on their own rules and criteria.

When a merge does occur, an "off chain consensus" mechanism is then applied to the merger. For example, where both Nike and Adidas elect to work together, customer Samantha is may be common to both, but each partner may have different information for the same Samantha. An event monitor may therefore trigger the flow to prompt Samantha to identify herself, soliciting her consent and verification for the merge, at which point either or both businesses may accept the merged candidate record.

According to yet another embodiment, there is no prompt to the user. Rather, the candidate record is transacted onto the blockchain, but subjected to consensus, at which point, all involved businesses and the user may then engage to confirm or validate that the Samantha customer records represented by the customer record indeed correlate to the same actual user. For instance, Samantha's records may be confirmed as part of a consensus protocol through which not the blockchain, but the businesses responsible for consensus reach out to the user Samantha for consent, after which both businesses may approve or reject the proposed merger, all contributing to whether or not consensus is attained for that blockchain transaction or not.

For example, in this particular embodiment, all businesses sharing the data sources are notified and if just one of those businesses has information via which to invalidate the match, then that business will reject the candidate record and consequently, the proposed merger will be rejected for all parties involved. This scheme may be utilized where, for example, one of the businesses possesses proof (via their richer information) that constitutes proof the two records to be merged are not a match, despite perhaps a high confidence indicator, thus resulting in a rejection of the match on behalf of all parties, prohibiting that transaction from ever reaching consensus.

In another embodiment, one business may approve and another may reject the same candidate transaction, resulting in the first business accepting the merged candidate record as an update for their local view of the record and the second business rejecting the match and thus resulting in no change to the local view of that record and the global view also being unchanged due to consensus not being reached.

According to yet another embodiment, the history of the proposed candidate record matches, as well as the approval or rejection of those matches, along with any user provided proof and consent and verification is all retained on the blockchain as historical information which may then be utilized to contribute to future consensus considerations involving those records or similar records surfaced via candidate records for proposed mergers.

Figure 5A:
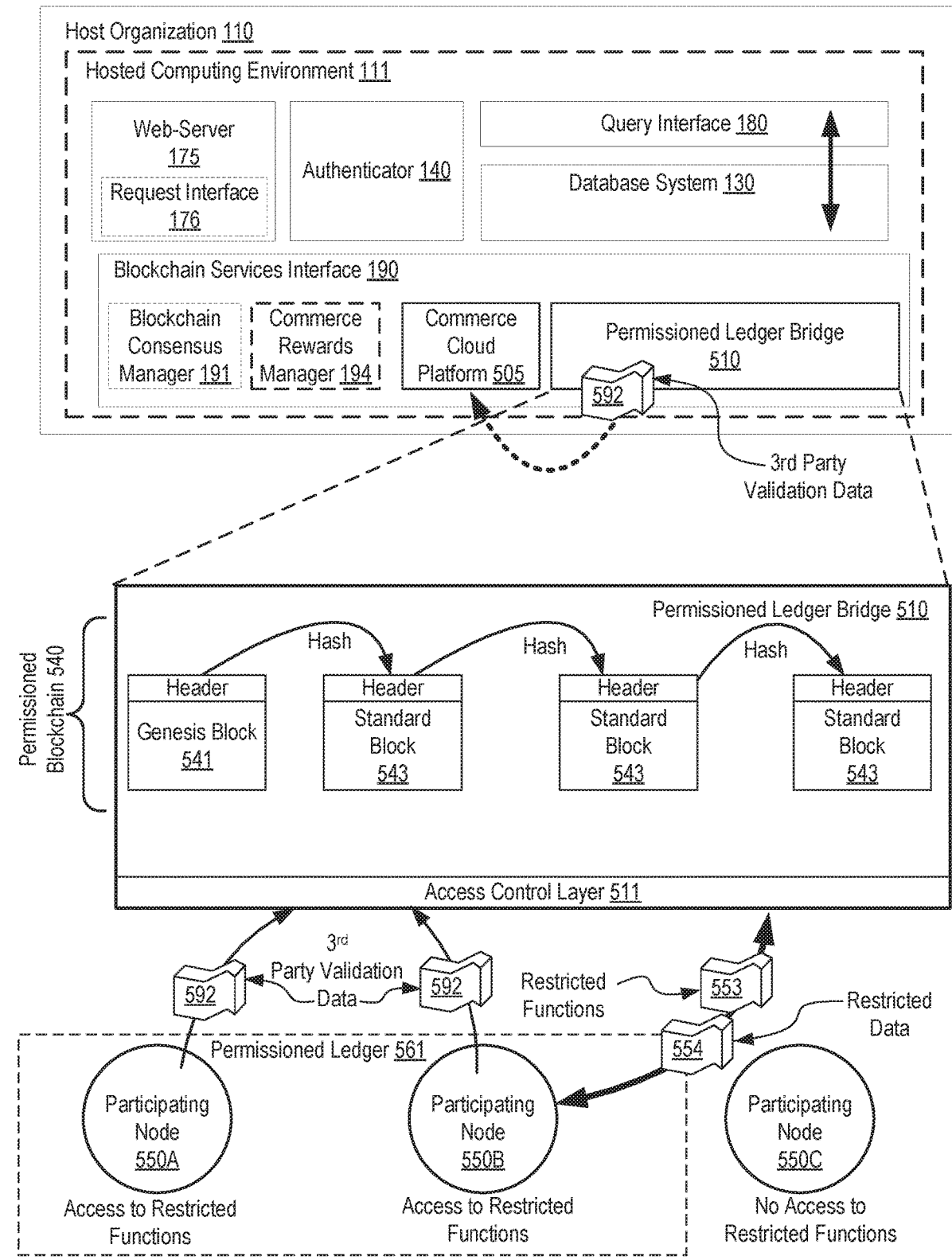
FIG. 5A depicts another exemplary architecture, with additional detail of a permissioned blockchain which enables the commerce cloud platform to receive third party validation data, in accordance with described embodiments.

FIG. 5A depicts another exemplary architecture 500, with additional detail of a permissioned blockchain 540 which enables the commerce cloud platform 505 to receive third party validation data 592, in accordance with described embodiments.

As depicted here, there is again a host organization 110 having a hosted computing environment 111 operating therein with a web-server 175, request interface 176, authenticator 140, query interface 180, and database system 130. As before, there is also a blockchain services interface 190 via which the host organization 110 provides a variety of blockchain related services to customers, subscribers, and other organizations and tenants which utilize the cloud computing services provided by the host organization 110, including consensus management via the blockchain consensus manager 191 and block validation. Also shown here are the commerce cloud platform 505 which is interacting with the permissioned ledger bridge 510 including querying the permissioned blockchain 540 accessible via the permissioned ledger bridge 510 and receiving third party validation data 592 from the permissioned blockchain 540 via the permissioned ledger bridge.

Consensus mechanisms define the protocols that make sure all participating nodes (e.g., devices on the blockchain that maintain the blockchain and possibly processes transactions for the blockchain) are not only synchronized with one another but additionally agree on which transactions are legitimate and may therefore be appropriately added to the blockchain.

Consensus mechanisms are crucial for a blockchain in order to function correctly as they ensure that all participating nodes with access to the blockchain uses the same chain of the blockchain, often referred to as the "primary" chain or the "main" chain or the "consensus" chain of the blockchain. Because any participating node can submit transactions to be added to the blockchain, it is necessary to constantly check all transactions added to the blockchain, effectively causing the blockchain to be perpetually and constantly audited by all participating nodes of the blockchain as failure to define and enforce a proper consensus mechanisms will leave the blockchain susceptible to risk, fraud, and malicious activity through cyber-attacks.

As was described above, there are many different ways to reach consensus. For example, Proof Of Work (POW) is known as mining with the nodes being known as miners. Miners solve complex mathematical puzzles which require significant computational power to resolve. The first participating node acting as a miner on the blockchain to solve the complex mathematical puzzle gets to create a block and receives a reward for creating a block. The complex mathematical puzzles are designed in such a way that it takes a significant amount of time and computational resource to find the answer, yet they are very fast and computationally efficient to verify if an answer is correct, thus providing computational asymmetry.

The computational intensity of the problems is configurable such that they may be made easier or more difficult based on the particular implementation.

Proof Of Stake (POS) is a more environmentally friendly variant of the Proof Of Work protocol, in which Proof Of Stake makes use of the premise that those who own most assets, tokens, coins, etc., in any given blockchain network will correspondingly have the greatest vested interest in keeping the blockchain network well maintained so as to guarantee the value and integrity of the assets, tokens, or coins transacted onto the blockchain.

In a system that uses Proof Of Stake consensus protocols, a randomized process is used to determine which of the many participating nodes is allowed to produce the next block on the blockchain. Users of the blockchain can stake their tokens to become a validator (e.g., a participating node allowed to produce blocks on the blockchain in accordance with the governing blockchain protocol), thus requiring such users to lock their tokens up for a period of time. After doing so, such users are eligible to produce blocks as one of the participating nodes on the blockchain having assumed the role of validator. Generally speaking, the participating node having the largest stake of assets, tokens, coins, etc., therefore will statistically exhibit the highest chance to produce a block on the blockchain. Other criteria may include, for example, the amount of time that assets, tokens, coins, etc., have been staked by any given participating node on the blockchain.

As with Proof Of Work (POW), Proof Of Stake (POS) Validators are also rewarded for their work. The reward that the participating node operating as a validator receives for creating the next block depends on the design of the blockchain. This may be all or part of transaction fees, subscription fees, fixed fees, or simply the benefit of enhanced control, depending on the implementation details and purpose of the particular blockchain.

Distinguished from Proof Of Work (POW) miners who may own literally none of the assets, tokens, coins, etc., on the blockchain, the Proof Of Stake (POS) Validators will correspond to those participating nodes having a significant stake in the assets, tokens, coins, etc., on the blockchain network, and therefore correspondingly have a much larger incentive to properly maintain the blockchain network to their own benefit as such participating nodes own or control the very assets, tokens, coins, etc., on the blockchain for which they are performing the validating.

Delegated Proof Of Stake (DPOS) provides a very fast consensus mechanism, often referred to as a digital democracy, due to its use of a stake-weighted voting system. In such a Delegated Proof Of Stake protocol, participating nodes on the blockchain stake their assets, tokens, coins, etc., to vote for a certain amount of delegates. The weight of their vote depends on their stake. The delegates are users, persons, or organizations which seek to produce blocks on the blockchain network. Therefore, the delegates that receive the highest amount of votes will in turn be permitted to produce greater quantities of blocks and are rewarded for creating the blocks.

Proof Of Capacity (POC) provides a consensus mechanism that uses a process called plotting, where solutions are pre-stored in digital storages or hard disk drive space, etc.

After a storage has been plotted and thus fully filled with solutions by a participating node, that participating node is then permitted to take part in the block creation process for the blockchain network.

Therefore, whichever participating node has the fastest solution to the puzzle of a (new) block, gets to create the new block and the more storage capacity that participating node has correlates to the more solutions that participating node can store, and therefore higher odds of creating a block for that participating node.

Proof Of Elapsed Time (POET) provides a consensus mechanism that aims to randomly and fairly determine which participating nodes get produce a block based on the time that they each of the many participating nodes have waited. Such a process assigns a random wait time to each node and the participating node whose wait time finishes first is then permitted to produce the next block.

Such a consensus mechanism may further utilize a system to verify that no single participating node is running multiple instances of participating nodes on the same blockchain network and further requires a mechanism to ensure that the assigned waiting time is sufficiently random.

Further depicted within the permissioned blockchain 540 are a series of blocks forming the accepted blockchain, formed from the genesis block 541 and then a series of standard blocks 543, each having a header connected to a prior hash. There are not currently any fork blocks or side chain blocks for this permissioned blockchain, although such mechanisms remain permissible.

Take for instance a permissioned blockchain 540 having implemented a permissioned ledger 561 for banking industry participants, such as Visa, MasterCard, American Express, Chase, Bank of America and JP Morgan, and others. Any participating node 550 within the permissioned ledger can utilize the cloud computing platform 505 to specify the kinds of queryable data that they wish to expose for use as third party validation data for use with identifying valid and legitimate transactions as well as the data that they have captured for fraudulent transactions.

Although the participating nodes represent different companies or different banks, such as Chase, Bank of America and JP Morgan, and therefore are technically in competition with one another, the participating nodes 550 nevertheless have a common interest to participate on the permissioned blockchain network and provide such information as all of the participating nodes will collectively benefit from improved fraud detection for transactions which are conducted amongst them or on behalf of any of them.

As depicted here, a permissioned ledger 561 (as implemented by the permissioned blockchain 540) provides a blockchain implementation which maintains an access control layer 511 by which to permit or prohibit access to certain functions and/or data, with only those participating nodes 550A and 550B having access to the restricted functions being permitted to be perform and/or view the restricted functions 553 and restricted data 554 of the permissioned blockchain 540.

For instance, the access control layer 511 may specify a subset of restricted functions 553 which are permissibly performed and accessed only by certain identifiable participants of the permissioned ledger 561, such as the participating node 550A and participating node 550B which fall within the dashed line forming the permissioned ledger 561. Notably, there is also a participating node 550C which has the ability to view the content of the permissioned blockchain 540, yet participating node 550C has no access to the restricted functions 553 for the permissioned ledger 551 as specified and managed by the access control layer 511 for the permissioned ledger. In other embodiments, read-only view access to the permissioned ledger may be wholly restricted to only those with access to the restricted functions 553, such as participating nodes 550A and 550B, and thus, participating node 550C would not only lack access to the restricted functions 553 for the permissioned ledger 561, but also lack access to any of the restricted data 554 stored by the permissioned blockchain 540 itself.

For example, the commerce rewards manager 505 may have read-only access to data maintained by the permissioned blockchain 540, thus enabling the commerce rewards manager 505 to query the permissioned blockchain 540 for third party validation data, while not allowing the commerce rewards manager 505 to contribute to consensus or voting mechanisms on the permissioned blockchain 540, or even adding blocks to or adding transactions onto the permissioned blockchain 540.

Such permissioned blockchains differ from public blockchains and differ also from private blockchains. Depending on the particular blockchain protocol and the implementation decisions for the blockchain, a blockchain can be built and accessed in multiple ways. For instance, Bitcoin provides a popular cryptocurrency blockchain which allows anyone to participate in the network (as a participating node) and with the uninhibited functional capacity of a full node, or a contributing miner. Therefore, an access control layer 511 simply does not exist for the Bitcoin blockchain protocol implementation, which thus permits any system to take on a read-only role, or to introduce and make legitimate and permissible changes to the blockchain, such as adding a new block or maintaining a full copy of the entire blockchain.

Such blockchains, which allow equal and open rights to all participants, are referred to as open, public, or un-permissioned blockchains, readily identifiable by the lack of an access control layer 511.

Additionally, there are certain blockchains that need special permissions to read, access, and write information on them. The intrinsic configuration of such blockchains controls the participants' transactions and defines their roles in which each participant can access and contribute to the blockchain. The configuration may also include maintaining the identity of each blockchain participant on the network. Such blockchains are therefore called permissioned blockchains, such as the permissioned blockchain 540 which is utilized here and which implements the permissioned ledger 561. For example, the blockchain protocol for the permissioned blockchain may specify roles for a select number of participants who can act as transaction validators on the permissioned blockchain network.

Permissioned blockchains sometimes used by industry-level enterprises and businesses, for which security, identity and role definition are important. For instance, a manufacturer producing a product may use a permissioned blockchain that also takes care of supply chain management. However, the transactions that occur on such a blockchain may also involve logistics partners, financing banks, and other vendors involved in the supply and financing process. These external parties, though part of the permissioned blockchain network 540, need not know the price at which the manufacturer supplies the products to various clients, with such information being controlled via the access control layer 511 of the permissioned blockchain network 540 as restricted data 554 or perhaps certain participants are prohibited from accessing restricted functions 553 of the permissioned blockchain network pursuant to their role, such as adding a transaction to the permissioned blockchain or voting in a consensus mechanism for the permissioned blockchain. Use of permissioned blockchains allows such role-limited implementations.

A developer configuring a permissioned blockchain may opt to make a few select records, like product name and quantity involved in a transaction, available for every participating node 550A, 550B, and 550C to read, despite participating node lacking access to the restricted functions 553 and lacking access to restricted data 554. However, only select participants 550A and 550B are allowed to view the transaction price which is defined as restricted data 554 or to perform certain protected functions, which are defined by the access control layer 511 as restricted functions 553. Other implementations may include limiting participants from acting as participating nodes on the permissioned blockchain 540 network, which enhances the network's security.

According to certain embodiments, the permissioned blockchain 540 network provisions the access-control layer 511 in such a way that it is built into the blockchain participating nodes 550A-C themselves and all permissioning and profile maintenance is handled by the access-control layer 511, and thus, the permissioned blockchain 540 differs from un-permissioned and public blockchain networks which do not implement such an access control layer 511.

Permissioned blockchains are further distinguished from the private blockchain networks described above, as private blockchain networks only allow known nodes to participate in the network. The nodes either have access to the network and thus have access to all functionality or they do not have access to the network, and therefore, cannot view any data and cannot perform any functions on the private blockchain network. For example, a bank may operate a private blockchain through a specified group of nodes internal to the bank or a bank may participate as a participating node with access to restricted data and restricted functions within a permissioned blockchain network 540.

According to certain embodiments, the commerce cloud platform 505 has access to a blockchain, or a permissioned ledger, or a permissioned blockchain 540 through a permissioned ledger bridge operated by the host organization 110.

In accordance with such embodiments, a transaction ID is received by the commerce cloud platform pursuant to a transaction occurring with a merchant which utilizes the commerce cloud platform 505 services of the host organization. For instance, if a customer utilizes a Visa credit card, then Visa will provide certain information with the transaction via which to further validate the transaction as being non-fraudulent. Moreover, Visa may operate as a participating node 550A or 550B within the permissioned blockchain 540 and thus, stand ready to validate transactions or provide an indication of validity or invalidity or an indication of a transaction being fraudulent or non-fraudulent.

Because the commerce cloud platform 505 has access to the permissioned ledger bridge 510, the commerce cloud platform 505 can query the permissioned blockchain 540 via the permissioned ledger bridge 510 of the host organization. Such a query may inquire with Visa or another participating node on the permissioned blockchain if the provided credit card information for the transaction in question is legitimate, valid, and being utilized non-fraudulently.

While the host organization may be able to apply its own prediction of a transaction's validity, the ability to query the source of funds, such Visa for a credit card or Bank of America for an Electronic Funds Transfer (EFT) or an electronic check (e-check) funds transfer transaction, brings a greater level of assurance for any given transaction.

According to another embodiment, the commerce cloud platform 505 may further validate a known customer to increase that customer's validation score by, for example, accepting credit card information or banking information from the customer directly, and then comparing that information with the source directly by querying the source (e.g., such as querying Visa or Bank of America) which operate as participating nodes 550A and 550B on the permissioned blockchain 540.

If the third party validation data 592 is returned from the permissioned ledger bridge 510 to the commerce cloud platform and matches what is provided by the customer, then the commerce cloud platform 505 may further increase that customer's validation score and the commerce rewards manager may issue additional commerce rewards points to that customer.

Unlike the attestation from the user that they are who they say they are, use of third party validation data 592 greatly improves the confidence by the commerce cloud platform that the customer is who they say. This is because the customer cannot manipulate or modify the information held by the third party, such as credit card details held by Visa, which operates as a participating node on the permissioned blockchain 540 or social security information which may be confirmed by the U.S. Social Security Administration, also operating as a participating node on the permissioned blockchain 540.

Consequently, the customer may attest to their identity but additionally provide a separately verifiable claim which can then be challenged and confirmed via third party validation data 592 retrieved from the permissioned blockchain 540, when queried through the permissioned ledger bridge. In other embodiments, the third party validation data 592 may be retrieved from a public blockchain which returns matching information confirming that the customer is who they attest to be.

Similarly, rather than merely accepting a government ID, medical ID, or passport as valid, the commerce cloud platform 505 of the host organization may further improve the confidence in the identity of the customer in question by querying the blockchain or a permissioned blockchain utilizing the blockchain services interface 190 to retrieve confirming and matching data from the relevant third party source, such as a state agency for a government ID, or the federal government for a passport identity or a health insurer entity to validate the medical ID.

While such information likely is not available within the assets of the host organization, the information may be accessible through government agencies and other entities which expose their data utilizing blockchain technologies, so as to permit such queries and thus the retrieval of third party validation data 592 from such sources.

In accordance with such an embodiment, any third party verifiable claim would significantly increase the validation score for that customer, and thus improve that customer's commerce rewards earning ratio, provide additional redemption offers, and drastically reduce the likelihood of a malicious actor misappropriating that customer's identity.

Similarly, the customer may provide their social security as a third party verifiable claim, responsive to which the commerce cloud platform 505 will query against the credit reporting agencies, such as Experience, Equifax, and TransUnion, each of which would be operating as a participating node on the permissioned blockchain or possibly a public blockchain, and responsive to a query for the social security number provided by the customer, the credit reporting agencies would return third party validation data 592 which may then be compared with what was provided by the customer, so as to increase the confidence in that customer's identity. Similarly, birthdays, names, addresses, and other such information may be challenged and then verified via third party validation data 592 received from a source that is outside of the control of the customer seeking to verify their identity.

Because the commerce cloud platform 505 is validating with a Blockchain outside of the customer's control, the validation establishes a verifiable claim by a third party organization which thus in turn increases the verification score even more for that particular customer.

Figure 5B:
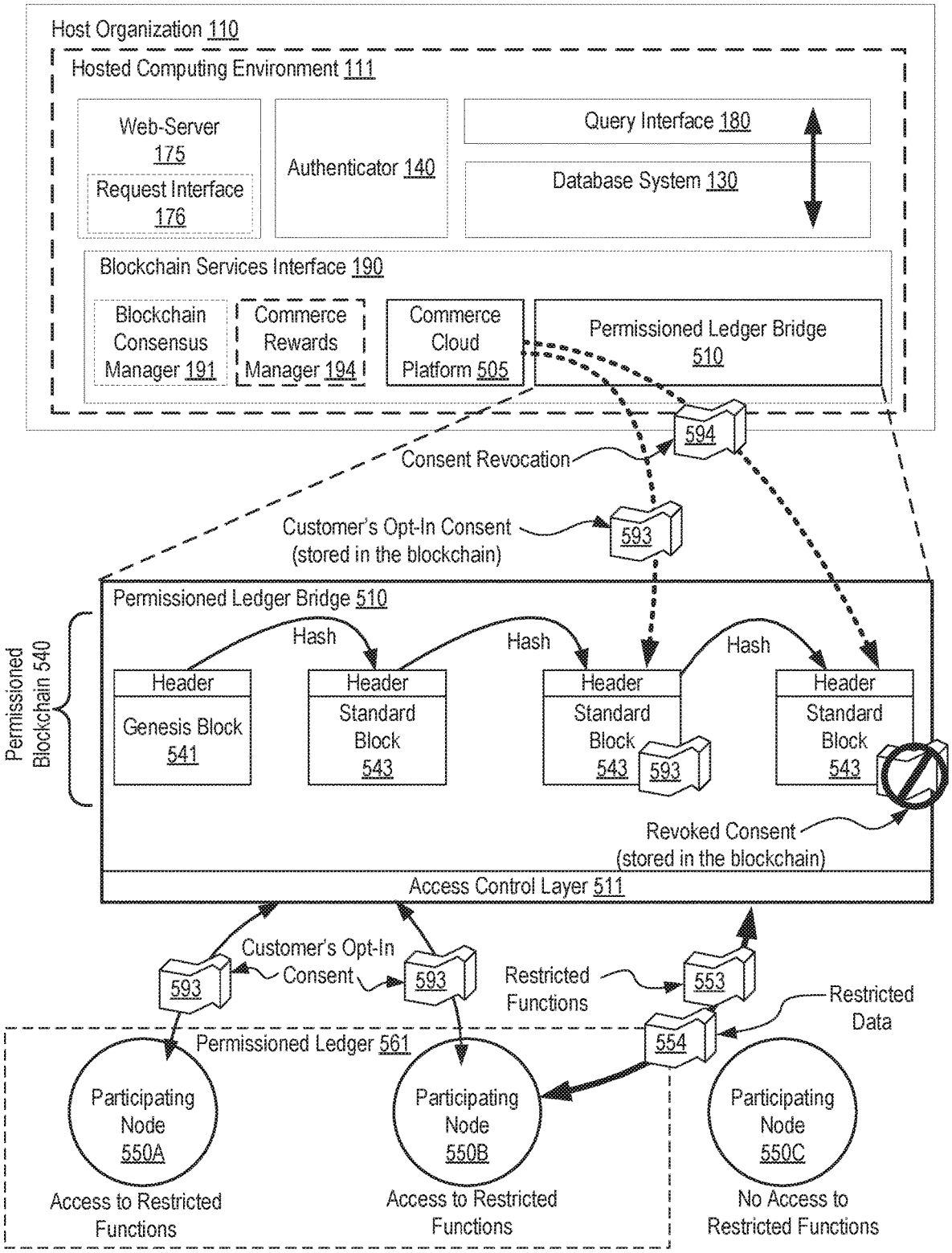
FIG. 5B depicts another exemplary architecture, with additional detail of a permissioned blockchain which enables the commerce cloud platform to store customer's opt-in consent and consent revocation within a permissioned blockchain, in accordance with described embodiments.

FIG. 5B depicts another exemplary architecture 501, with additional detail of a permissioned blockchain 540 which enables the commerce cloud platform 505 to store customer's opt-in consent 593 and consent revocation 594 within a permissioned blockchain, in accordance with described embodiments.

As can be seen here, the commerce cloud platform 505 has requested the customer's consent to opt-in to marketing emails, or to opt-in to receiving personalized marketing recommendations for products and services, or received the customer's opt-in consent to participate in the commerce rewards program facilitated by the host organization and the commerce cloud platform 505 responsively writes the customer's opt-in consent 593 into the blockchain for storage and for read access to other participating nodes 505A-B that have sufficient permissioned to access the restricted functions 553 and access to the restricted data 554 of the permissioned ledger 561.

According to such embodiments, the commerce cloud platform 505 additionally generates a log and stores the log with the customer's opt-in consent 593 within the permissioned blockchain 540. For example, the commerce cloud platform 505 may generate a log indicating with whom or with which entities the customer's data was shared with, pursuant to the customer granting their consent. Additionally, the commerce cloud platform 505 may generate and store a log within the permissioned blockchain 540 indicating which entities have referenced the customer's stored consent and which entities have sent marketing emails or sent recommendation notifications to the customer, pursuant to the customer's opt-in consent being stored within the blockchain. For example, participating nodes 550A and 550B may be merchants that utilize the commerce cloud platform 505 and have access to the restricted data 554 within the permissioned blockchain 540, and thus, those participating nodes 550A and 550B may access the customer's consent to receive opt-in emails and marketing push recommendations from the from the permissioned blockchain 540, utilize the information to perform the push notification recommendations and to send marketing emails, and then update the stored logs within the permissioned blockchain 540 so as to keep and maintain an accurate record specifying which customer's opt-in consent was referenced and utilized and what marketing information was sent to such customers and which entity sent the marketing information.

In a related embodiment, the customer may elect to revoke their prior opt-in consent to receive marketing emails and/or marketing push notifications. The customer may therefore revoke such consent at any time and for any reason. When the customer revokes their consent, the commerce cloud platform 505 issues a consent revocation which is then again written into the permissioned blockchain 540 as depicted here, thus storing the customer's revoked consent within the blockchain as the most up-to-date record and information for that particular customer. In related embodiments, the customer may elect to revoke consent for only a specific merchant or for a class or category of merchants or for a specified group of merchants, in which case the customer indicates their consent revocation, thus causing the commerce cloud platform 505 to write the customer's partial consent revocation into the permissioned blockchain 540 and to correspondingly update the logs where necessary indicating information sharing permissions of that customer for the variously participating merchants.

In yet another related embodiment, an auditing mechanism is provided to reconcile the opt-in consent by those customers having provided consent to the commerce cloud platform 505 to receive marketing emails and marketing push recommendation notifications against the logs generated, stored, updated, and maintained within the blockchain, so as to ensure merchant compliance with the customer's opt-in consent preferences.

FIGS. 6 and 7 depict flow diagrams illustrating methods 600 and 700 for implementing commerce rewards across tenants for commerce cloud customers utilizing blockchain technologies in conjunction with a cloud based computing environment such as a database system implementation supported by a processor and a memory to execute such functionality to provide cloud based on-demand functionality to users, customers, and subscribers.

Methods 600 and 700 may be performed by processing logic that may include hardware (e.g., circuitry, dedicated logic, programmable logic, microcode, etc.), software (e.g., instructions run on a processing device) to perform various operations such as receiving, training, distributing, associating, transacting, processing, transmitting, analyzing, triggering, pushing, recommending, defining, retrieving, parsing, persisting, exposing, loading, operating, generating, storing, maintaining, creating, returning, presenting, interfacing, communicating, querying, providing, determining, displaying, updating, sending, etc., in pursuance of the systems and methods as described herein. For example, the hosted computing environment 111, the blockchain services interface 1150, and its database system 130 as depicted at FIG. 1, et seq., and other systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 600 depicted at FIG. 6, at block 605, processing logic executes a cloud commerce platform on behalf of a plurality of merchant tenant organizations, wherein the cloud commerce platform provides one or more of fraud detection, custom branding, customer payment processing, inventory management, and user authentication.

At block 610, processing logic receives a first e-commerce customer transaction for processing at the cloud commerce platform, wherein the first e-commerce customer transaction is for the purchase of goods or services from one of the tenant organizations by a new unknown customer.

At block 615, processing logic receives limited transaction data with the first e-commerce customer transaction including at least a transaction date, a transaction ID, a transaction amount, and a transaction location.

At block 620, processing logic captures transaction source information with the first e-commerce customer transaction, wherein the transaction source information includes or more of a transaction IP address, a cellular phone Mobile Identification Number (MIN), and a Unique Identifier (UID) of a computer PC or laptop.

At block 625, processing logic creates a new global ID for the new unknown customer and associating the received limited transaction data and the transaction source information with the new global ID.

At block 630, processing logic receives a second e-commerce customer transaction for processing at the cloud commerce platform wherein receiving the second e-commerce customer transaction includes receiving the limited transaction data for the second e-commerce customer transaction and receiving the transaction source information for the second e-commerce customer transaction.

At block 635, processing logic matches at least a portion of the transaction source information for the first and second e-commerce customer transactions and responsively prompting the matched unknown customer to confirm they are associated with both the first and second e-commerce customer transactions.

At block 640, processing logic invites the matched unknown customer to create a single sign-on ID and to participate in a commerce rewards program offered by the commerce cloud platform.

With reference to the method 700 depicted at FIG. 7, at block 705, processing logic operates a commerce cloud platform on behalf of a plurality of merchants, wherein the commerce cloud platform provides at least customer payment processing on behalf of the plurality of merchants.

At block 710, processing logic receives a first purchase transaction for an unknown customer from a first one of the plurality of merchants, wherein the purchase transaction indicates transaction source information.

At block 715, processing logic creates a new global ID for the unknown customer and associating the purchase transaction and the transaction source information with the new global ID at the commerce cloud platform.

At block 720, processing logic allocates commerce rewards points to the unknown customer via the new global ID based on the first purchase transaction.

At block 725, processing logic receives a second purchase transaction for the unknown customer from a second one of the plurality of merchants, wherein the second purchase transaction indicates transaction source information for the second purchase transaction.

At block 730, processing logic prompts the unknown customer associated with the second purchase transaction to confirm they are associated with the first transaction based on at least a partial matching of the transaction source information associated with the first and second purchase transactions.

At block 735, processing logic invites the unknown customer to participate in a commerce rewards program to redeem the commerce rewards points.

According to another embodiment, methods 600 and 700 further include: inviting the unknown customer to create a new single sign-on ID usable to authenticate with any one of the plurality of merchants which utilize the commerce cloud platform.

According to another embodiment, methods 600 and 700 further include: prompting the unknown customer to provide validation information to the commerce cloud platform responsive to the unknown customer accepting the invitation to participate in the commerce rewards program.

According to another embodiment of methods 600 and 700, prompting the unknown customer to provide validation information includes requesting the unknown customer to provide one or more of: a first and last name; an email address; a cellular telephone number; a biometric fingerprint scan; a biometric retina scan; and in which the validation information provided by the unknown customer is associated with the unknown customer's new global ID as part of new validated customer profile.

According to another embodiment of methods 600 and 700, prompting the unknown customer to provide verifiable validation information includes requesting the unknown customer to provide one or more types of third party verifiable information selected from the group including: a government issued identification; a medical ID card; a social security number; a passport; and in which the third party verifiable validation information provided by the unknown customer is associated with the unknown customer's new global ID pending verification.

According to another embodiment, methods 600 and 700 further include: operating a blockchain interface to a permissioned blockchain within which one or more third party verifiers each operate as participating nodes; operating a participating node on the permissioned blockchain from the host organization; querying the permissioned blockchain for confirmation of validity for one of the government issued identification, the medical ID card, the social security number, or the passport provided as third party verifiable information; and receiving third party validation data indicating the third party verifiable information provided is a match.

According to another embodiment, methods 600 and 700 further include: receiving validation information from the unknown customer and creating a validated customer profile for the previously unknown customer; generating a validation score for the validated customer profile, in which the validation score indicates a degree of confidence the previously unknown customer has been correctly identified.

According to another embodiment of methods 600 and 700, receiving the validation information from the previously unknown customer increases the validation score; and in which the increased validation score operates as a multiplier for commerce reward points earned by the previously unknown customer.

According to another embodiment of methods 600 and 700, receiving the second purchase transaction further includes: creating a second new global ID based on the second purchase transaction; allocating commerce rewards points to the unknown customer via the second new global ID based on the second purchase transaction; linking the first and the second new global IDs based on the unknown customer attesting they are associated with both the first and the second purchase transactions; and combining the commerce rewards points allocated based on the first and second purchase transactions.

According to another embodiment of methods 600 and 700, the commerce cloud platform provides one or more additional services on behalf of the plurality of merchants, the one or more additional services including any of fraud detection, custom merchant branding, inventory management, and user authentication.

According to another embodiment of methods 600 and 700, receiving the purchase transaction from the unknown customer includes receiving limited transaction data with the purchase transaction including at least a transaction date, a transaction ID, a transaction amount, and a transaction location for the purchase transaction.

According to another embodiment of methods 600 and 700, the transaction source information indicated by the purchase transaction includes or more of a transaction IP address, a cellular phone Mobile Identification Number (MIN), and a Unique Identifier (UID) of a computer PC or laptop; and in which the partial matching of the transaction source information associated with the first and second purchase transactions includes at least one of the transaction IP address, the cellular phone MIN, or the UID of the computer PC or laptop matching for both the first and the second purchase transactions.

According to another embodiment, methods 600 and 700 further include: facilitating, via the commerce cloud platform, a third purchase transaction on behalf of the previously unknown customer at a brick and mortar physical store via the new global ID for the previously unknown customer; in which facilitating the third purchase transaction includes: authenticating the previously unknown customer at a customer mobile device based on validation information associated with the new global ID; displaying a QR code to the customer mobile device to be scanned by a merchant client device of the brick and mortar physical store; in which the QR code, when scanned by the merchant client device, attests to the validated identity of the previously unknown customer.

According to another embodiment of methods 600 and 700, additional commerce reward points are allocated to the previously unknown customer based on any one of: opting into marketing emails, opting into email communications, opting into data sharing with marketing affiliates.

According to another embodiment, methods 600 and 700 further include: prompting the unknown customer to provide third party verifiable validation information to the commerce cloud platform responsive to the unknown customer accepting the invitation to participate in the commerce rewards program.

According to another embodiment, methods 600 and 700 further include: receiving validation information from the previously unknown customer; pushing a recommendation notification to a display at a client device associated with the previously unknown customer responsive to the previously unknown customer accepting the invitation to participate in the commerce rewards program; and in which the recommendation notification promotes a product or service from any one of the plurality of merchants selected based at least in part on the previously unknown customer's verified validation information.

According to another embodiment, methods 600 and 700 further include: receiving an opt-in from the previously unknown customer indicating the previously unknown customer consents to receiving marketing emails and/or marketing notifications from the plurality of merchants; allocating additional commerce reward points to the previously unknown customer responsive to receiving the opt-in from the previously unknown customer.

According to another embodiment, methods 600 and 700 further include: operating a blockchain interface to a permissioned blockchain within which the plurality of merchants each operate as participating nodes; receiving an opt-in from the previously unknown customer indicating the previously unknown customer consents to receiving marketing emails and/or marketing notifications from the plurality of merchants; and writing an opt-in consent record for the previously unknown customer into the permissioned blockchain, in which the plurality of merchants have access to the opt-in consent record via the permissioned blockchain.

According to another embodiment of methods 600 and 700, one or more of the plurality of merchants reference the opt-in consent record stored within the blockchain and issue a marketing email and/or a push notification recommendation advertising products and services for the respective one or more of the plurality of merchants; and in which the respective one or more of the plurality of merchants update a customer opt-in consent log stored within the permissioned blockchain indicating at least, (i) any merchant sending the marketing email and/or the push notification recommendation based on the opt-in consent record and (ii) to whom the marketing email and/or the push notification recommendation was sent based on the on the opt-in consent record.

According to another embodiment, methods 600 and 700 further include: receiving a consent revocation from the previously unknown customer indicating the previously unknown customer revokes their prior consent to receiving marketing emails and/or marketing notifications from the plurality of merchants or revokes their prior consent to receiving marketing emails and/or marketing notifications from a specified subset of the plurality of merchants; and writing a consent revocation record for the previously unknown customer into the permissioned blockchain, in which the plurality of merchants have access to the consent revocation record via the permissioned blockchain.

According to a particular embodiment, there is non-transitory computer readable storage media having instructions stored thereon that, when executed by a system of a host organization having at least a processor and a memory therein, the instructions cause the system to perform the following operations: operating a commerce cloud platform on behalf of a plurality of merchants, in which the commerce cloud platform provides at least customer payment processing on behalf of the plurality of merchants; receiving a first purchase transaction for an unknown customer from a first one of the plurality of merchants, in which the purchase transaction indicates transaction source information; creating a new global ID for the unknown customer and associating the purchase transaction and the transaction source information with the new global ID at the commerce cloud platform; allocating commerce rewards points to the unknown customer via the new global ID based on the first purchase transaction; receiving a second purchase transaction for the unknown customer from a second one of the plurality of merchants, in which the second purchase transaction indicates transaction source information for the second purchase transaction; prompting the unknown customer associated with the second purchase transaction to confirm they are associated with the first transaction based on at least a partial matching of the transaction source information associated with the first and second purchase transactions; and inviting the unknown customer to participate in a commerce rewards program to redeem the commerce rewards points.

FIG. 8 shows a diagrammatic representation of a system 801 within which embodiments may operate, be installed, integrated, or configured. In accordance with one embodiment, there is a system 801 having at least a processor 890 and a memory 895 therein to execute implementing application code for the methodologies as described herein. Such a system 801 may communicatively interface with and cooperatively execute with the benefit of a hosted computing environment, such as a host organization, a multi-tenant environment, an on-demand service provider, a cloud based service provider, a client-server environment, etc.

According to the depicted embodiment, the system 801, which may operate within a host organization, includes the processor 890 and the memory 895 to execute instructions at the system 801. According to such an embodiment, the processor 890 is to execute a commerce cloud platform 885 on behalf of a plurality of merchants 898, wherein the commerce cloud platform 885 provides at least customer payment processing on behalf of the plurality of merchants. According to such an embodiment, the system 801 further includes a receive interface 826 to receive a first purchase transaction 827 for an unknown customer 886 from a first one of the plurality of merchants 898, wherein the purchase transaction 827 indicates transaction source information 841. According to such an embodiment of the system 801, the commerce cloud platform 885 is to further create a new global ID 886 for the unknown customer and associate the purchase transaction 827 and the transaction source information 841 with the new global ID 886 at the commerce cloud platform.

According to such an embodiment of the system 801, the commerce cloud platform 885 further is to allocate commerce rewards points 841 to the unknown customer via the new global ID 886 based on the first purchase transaction 827.

According to such an embodiment of the system 801, the receive interface 826 is to receive a second purchase transaction for the unknown customer 886 from a second one of the plurality of merchants, in which the second purchase transaction indicates transaction source information for the second purchase transaction.

According to such an embodiment of the system 801, the commerce cloud platform 885 further is to prompt 840 the unknown customer 886 associated with the second purchase transaction to confirm they are associated with the first transaction based on at least a partial matching of the transaction source information associated with the first and second purchase transactions. The commerce cloud platform 885 further is to invite the unknown customer to participate in a commerce rewards program to redeem the commerce rewards points 841.

According to another embodiment of the system 801, there is a blockchain services interface 865 to interact with and provide access to the blockchain 899. The commerce rewards manager 892 provides commerce rewards points to customers who join the commerce rewards program and reimburses the participating merchants 898. The permissioned rights manager 843 provides an access control layer for the permissioned blockchain where necessary in support of the described embodiments, for example, to query for third party validation information from a permissioned blockchain accessible via the system 801.

According to another embodiment of the system 801, the receive interface 826 communicates with a user client device 898 remote from the system and communicatively links the user device with the system via a public Internet. According to such an embodiment, the system operates at a host organization as a cloud based service provider to the user device 899; in which the cloud based service provider hosts a receive interface 826 exposed to the user client device via the public Internet, and further in which the receive interface receives inputs from the user device as a request for services from the cloud based service provider.

Bus 816 interfaces the various components of the system 801 amongst each other, with any other peripheral(s) of the system 801, and with external components such as external network elements, other machines, client devices, cloud computing services, etc. Communications may further include communicating with external devices via a network interface over a LAN, WAN, or the public Internet.

Figure 9A:
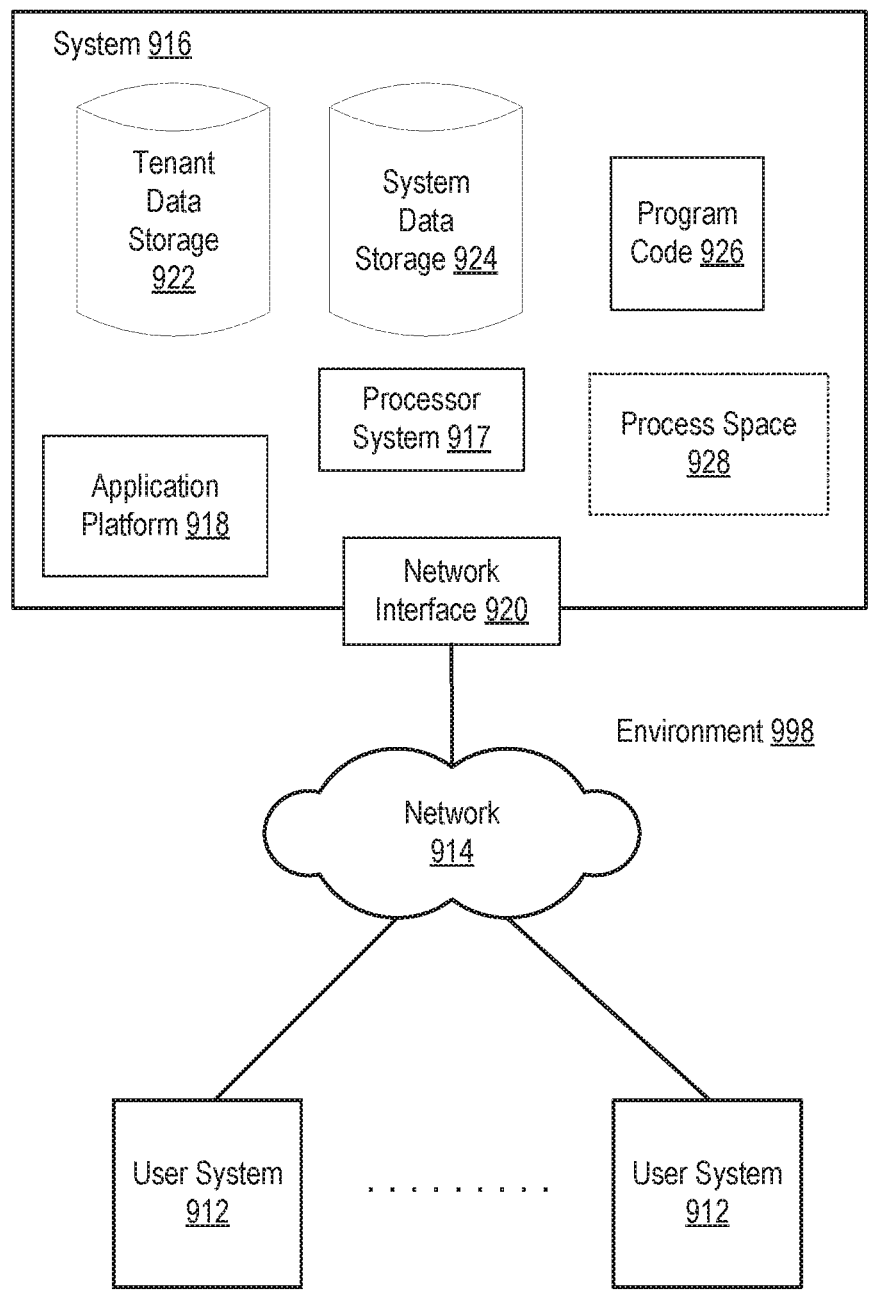
FIG. 9A illustrates a block diagram of an environment in which an on-demand database service may operate in accordance with the described embodiments.

FIG. 9A illustrates a block diagram of an environment 998 in which an on-demand database service may operate in accordance with the described embodiments. Environment 998 may include user systems 912, network 914, system 916, processor system 917, application platform 918, network interface 920, tenant data storage 922, system data storage 924, program code 926, and process space 928. In other embodiments, environment 998 may not have all of the components listed and/or may have other elements instead of, or in addition to, those listed above.

Environment 998 is an environment in which an on-demand database service exists. User system 912 may be any machine or system that is used by a user to access a database user system. For example, any of user systems 912 can be a handheld computing device, a mobile phone, a laptop computer, a work station, and/or a network of computing devices. As illustrated in FIG. 9A (and in more detail in FIG. 9B) user systems 912 might interact via a network 914 with an on-demand database service, which is system 916.

An on-demand database service, such as system 916, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 916" and "system 916" is used interchangeably herein. A database image may include one or more database objects. A relational database management system (RDMS) or the equivalent may execute storage and retrieval of information against the database object(s). Application platform 918 may be a framework that allows the applications of system 916 to run, such as the hardware and/or software, e.g., the operating system. In an embodiment, on-demand database service 916 may include an application platform 918 that enables creation, managing and executing one or more applications developed by the provider of the on-demand database service, users accessing the on-demand database service via user systems 912, or third party application developers accessing the on-demand database service via user systems 912.

The users of user systems 912 may differ in their respective capacities, and the capacity of a particular user system 912 might be entirely determined by permissions (permission levels) for the current user. For example, where a salesperson is using a particular user system 912 to interact with system 916, that user system has the capacities allotted to that salesperson. However, while an administrator is using that user system to interact with system 916, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 914 is any network or combination of networks of devices that communicate with one another. For example, network 914 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed embodiments may utilize are not so limited, although TCP/IP is a frequently implemented protocol.

User systems 912 might communicate with system 916 using TCP/IP and, at a higher network level, use other common Internet protocols to communicate, such as HTTP, FTP, AFS, WAP, etc. In an example where HTTP is used, user system 912 might include an HTTP client commonly referred to as a "browser" for sending and receiving HTTP messages to and from an HTTP server at system 916. Such an HTTP server might be implemented as the sole network interface between system 916 and network 914, but other techniques might be used as well or instead. In some implementations, the interface between system 916 and network 914 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 916, shown in FIG. 9A, implements a web-based Customer Relationship Management (CRM) system. For example, in one embodiment, system 916 includes application servers configured to implement and execute CRM software applications as well as provide related data, code, forms, webpages and other information to and from user systems 912 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 916 implements applications other than, or in addition to, a CRM application. For example, system 916 may provide tenant access to multiple hosted (standard and custom) applications, including a CRM application. User (or third party developer) applications, which may or may not include CRM, may be supported by the application platform 918, which manages creation, storage of the applications into one or more database objects and executing of the applications in a virtual machine in the process space of the system 916.

One arrangement for elements of system 916 is shown in FIG. 9A, including a network interface 920, application platform 918, tenant data storage 922 for tenant data 923, system data storage 924 for system data 925 accessible to system 916 and possibly multiple tenants, program code 926 for implementing various functions of system 916, and a process space 928 for executing MTS system processes and tenant-specific processes, such as running applications as part of an application hosting service. Additional processes that may execute on system 916 include database indexing processes.

Several elements in the system shown in FIG. 9A include conventional, well-known elements that are explained only briefly here. For example, each user system 912 may include a desktop personal computer, workstation, laptop, PDA, cell phone, or any wireless access protocol (WAP) enabled device or any other computing device capable of interfacing directly or indirectly to the Internet or other network connection. User system 912 typically runs an HTTP client, e.g., a browsing program, such as Microsoft's Internet Explorer browser, a Mozilla or Firefox browser, an Opera, or a WAP-enabled browser in the case of a smartphone, tablet, PDA or other wireless device, or the like, allowing a user (e.g., subscriber of the multi-tenant database system) of user system 912 to access, process and view information, pages and applications available to it from system 916 over network 914. Each user system 912 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 916 or other systems or servers. For example, the user interface device can be used to access data and applications hosted by system 916, and to perform searches on stored data, and otherwise allow a user to interact with various GUI pages that may be presented to a user. As discussed above, embodiments are suitable for use with the Internet, which refers to a specific global internetwork of networks. However, it is understood that other networks can be used instead of the Internet, such as an intranet, an extranet, a virtual private network (VPN), a non-TCP/IP based network, any LAN or WAN or the like.

According to one embodiment, each user system 912 and all of its components are operator configurable using applications, such as a browser, including computer code run using a central processing unit such as an Intel Pentium® processor or the like. Similarly, system 916 (and additional instances of an MTS, where more than one is present) and all of their components might be operator configurable using application(s) including computer code to run using a central processing unit such as processor system 917, which may include an Intel Pentium® processor or the like, and/or multiple processor units.

According to one embodiment, each system 916 is configured to provide webpages, forms, applications, data and media content to user (client) systems 912 to support the access by user systems 912 as tenants of system 916. As such, system 916 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 9B:
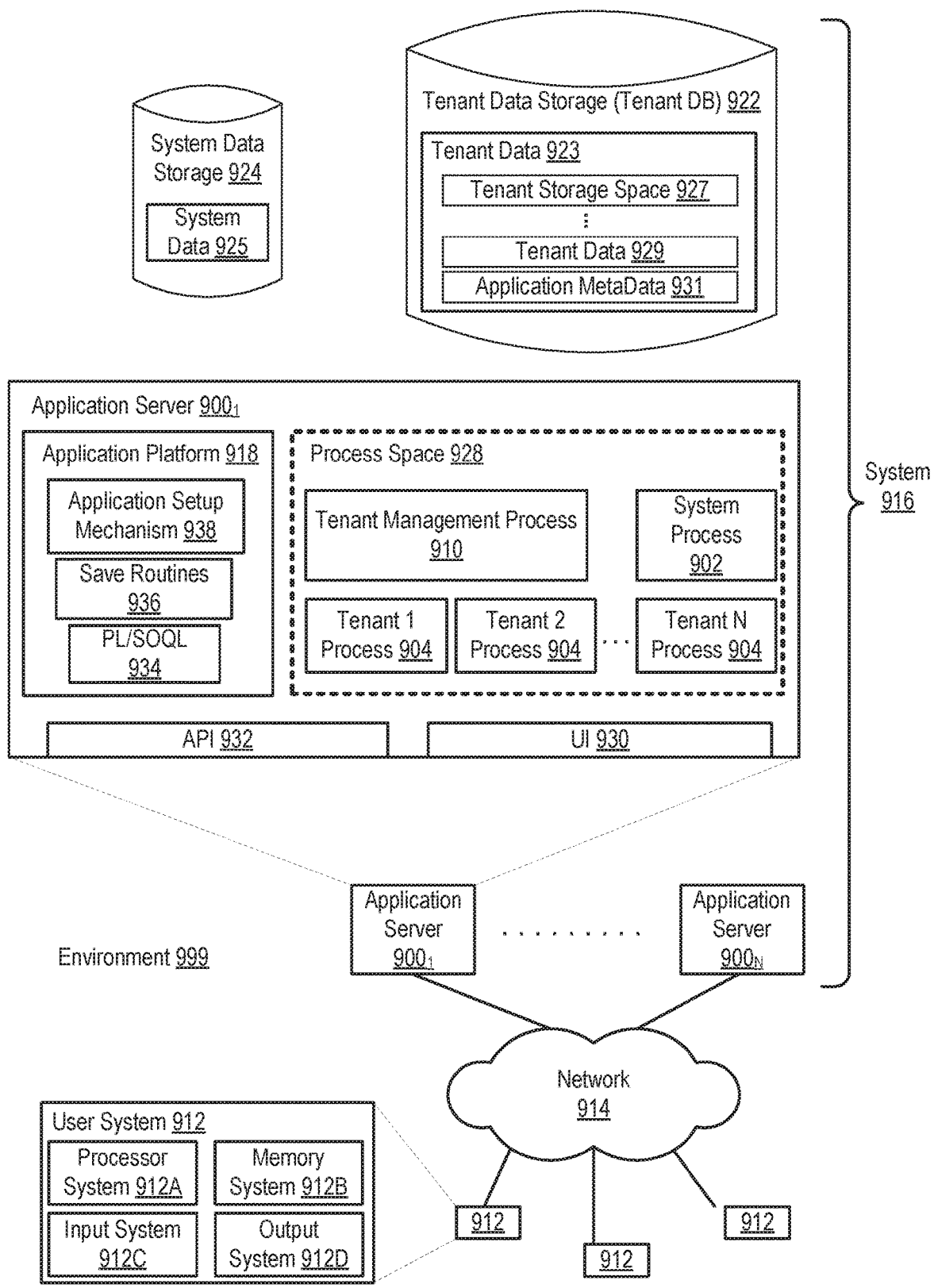
FIG. 9B illustrates another block diagram of an embodiment of elements of FIG. 9A and various possible interconnections between such elements in accordance with the described embodiments.

FIG. 9B illustrates another block diagram of an embodiment of elements of FIG. 9A and various possible interconnections between such elements in accordance with the described embodiments. FIG. 9B also illustrates environment 999. However, in FIG. 9B, the elements of system 916 and various interconnections in an embodiment are illustrated in further detail. More particularly, FIG. 9B shows that user system 912 may include a processor system 912A, memory system 912B, input system 912C, and output system 912D. FIG. 9B shows network 914 and system 916. FIG. 9B also shows that system 916 may include tenant data storage 922, having therein tenant data 923, which includes, for example, tenant storage space 927, tenant data 929, and application metadata 931. System data storage 924 is depicted as having therein system data 925. Further depicted within the expanded detail of application servers $900_{1-N}$ are User Interface (UI) 930, Application Program Interface (API) 932, application platform 918 includes PL/SOQL 934, save routines 936, application setup mechanism 938, process space 928 includes system process space 902, tenant 1-N process spaces 904, and tenant management process space 910. In other embodiments, environment 999 may not have the same elements as those listed above and/or may have other elements instead of, or in addition to, those listed above.

User system 912, network 914, system 916, tenant data storage 922, and system data storage 924 were discussed above in FIG. 9A. As shown by FIG. 9B, system 916 may include a network interface 920 (of FIG. 9A) implemented as a set of HTTP application servers 900, an application platform 918, tenant data storage 922, and system data storage 924. Also shown is system process space 902, including individual tenant process spaces 904 and a tenant management process space 910. Each application server 900 may be configured to tenant data storage 922 and the tenant data 923 therein, and system data storage 924 and the system data 925 therein to serve requests of user systems 912. The tenant data 923 might be divided into individual tenant storage areas (e.g., tenant storage space 927), which can be either a physical arrangement and/or a logical arrangement of data. Within each tenant storage space 927, tenant data 929, and application metadata 931 might be similarly allocated for each user. For example, a copy of a user's most recently used (MRU) items might be stored to tenant data 929. Similarly, a copy of MRU items for an entire organization that is a tenant might be stored to tenant storage space 927. A UI 730 provides a user interface and an API 932 provides an application programmer interface into system 916 resident processes to users and/or developers at user systems 912. The tenant data and the system data may be stored in various databases, such as one or more Oracle™ databases.

Application platform 918 includes an application setup mechanism 938 that supports application developers' creation and management of applications, which may be saved as metadata into tenant data storage 922 by save routines 936 for execution by subscribers as one or more tenant process spaces 904 managed by tenant management process space 910 for example. Invocations to such applications may be coded using PL/SOQL 934 that provides a programming language style interface extension to API 932. Invocations to applications may be detected by one or more system processes, which manages retrieving application metadata 931 for the subscriber making the invocation and executing the metadata as an application in a virtual machine.

Each application server 900 may be communicably coupled to database systems, e.g., having access to system data 925 and tenant data 923, via a different network connection. For example, one application server 900*i* might be coupled via the network 914 (e.g., the Internet), another application server 900N-1 might be coupled via a direct network link, and another application server 900N might be coupled by yet a different network connection. Transfer Control Protocol and Internet Protocol (TCP/IP) are typical protocols for communicating between application servers 900 and the database system. However, it will be apparent to one skilled in the art that other transport protocols may be used to optimize the system depending on the network interconnect used.

In certain embodiments, each application server 900 is configured to handle requests for any user associated with any organization that is a tenant. Because it is desirable to be able to add and remove application servers from the server pool at any time for any reason, there is preferably no server affinity for a user and/or organization to a specific application server 900. In one embodiment, therefore, an interface system implementing a load balancing function (e.g., an F5 Big-IP load balancer) is communicably coupled between the application servers 900 and the user systems 912 to distribute requests to the application servers 900. In one embodiment, the load balancer uses a least connections algorithm to route user requests to the application servers 900. Other examples of load balancing algorithms, such as round robin and observed response time, also can be used. For example, in certain embodiments, three consecutive requests from the same user may hit three different application servers 900, and three requests from different users may hit the same application server 900. In this manner, system 916 is multi-tenant, in which system 916 handles storage of, and access to, different objects, data and applications across disparate users and organizations.

As an example of storage, one tenant might be a company that employs a sales force where each salesperson uses system 916 to manage their sales process. Thus, a user might maintain contact data, leads data, customer follow-up data, performance data, goals and progress data, etc., all applicable to that user's personal sales process (e.g., in tenant data storage 922). In an example of a MTS arrangement, since all of the data and the applications to access, view, modify, report, transmit, calculate, etc., is maintained and accessed by a user system having nothing more than network access, the user is enabled to manage his or her sales efforts and cycles from any of many different user systems. For example, if a salesperson is visiting a customer and the customer has Internet access in their lobby, the salesperson may obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 916 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 916 might also maintain system level data usable by multiple tenants or other data. Such system level data might include industry reports, news, postings, and the like that are sharable among tenants.

In certain embodiments, user systems 912 (which may be client systems) communicate with application servers 900 to request and update system-level and tenant-level data from system 916 that may require sending one or more queries to tenant data storage 922 and/or system data storage 924. System 916 (e.g., an application server 900 in system 916) automatically generates one or more SQL statements (e.g., one or more SQL queries) that are designed to access the desired information. System data storage 924 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

FIG. 10 illustrates a diagrammatic representation of a machine 1000 in the exemplary form of a computer system, in accordance with one embodiment, within which a set of instructions, for causing the machine/computer system 1000 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1000 includes a processor 1002, a main memory 1004 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 1018 (e.g., a persistent storage device including hard disk drives and a persistent database and/or a multi-tenant database implementation), which communicate with each other via a bus 1030. Main memory 1004 includes a commerce cloud platform 1024 and a commerce rewards manager 1023 and a blockchain interface 1025. Main memory 1004 and its sub-elements are operable in conjunction with processing logic 1026 and processor 1002 to perform the methodologies discussed herein.

Processor 1002 represents one or more general-purpose processing devices such as a microprocessor, central processing unit, or the like. More particularly, the processor 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1002 may also be one or more special-purpose processing devices such as an application specific integrated circuit (ASIC), a field programmable gate array (FPGA), a digital signal processor (DSP), network processor, or the like. Processor 1002 is configured to execute the processing logic 1026 for performing the operations and functionality which is discussed herein.

The computer system 1000 may further include a network interface card 1008. The computer system 1000 also may include a user interface 1010 (such as a video display unit, a liquid crystal display, etc.), an alphanumeric input device 1012 (e.g., a keyboard), a cursor control device 1014 (e.g., a mouse), and a signal generation device 1016 (e.g., an integrated speaker). The computer system 1000 may further include peripheral device 1036 (e.g., wireless or wired communication devices, memory devices, storage devices, audio processing devices, video processing devices, etc.).

The secondary memory 1018 may include a non-transitory machine-readable storage medium or a non-transitory computer readable storage medium or a non-transitory machine-accessible storage medium 1031 on which is stored one or more sets of instructions (e.g., software 1022) embodying any one or more of the methodologies or functions described herein. The software 1022 may also reside, completely or at least partially, within the main memory 1004 and/or within the processor 1002 during execution thereof by the computer system 1000, the main memory 1004 and the processor 1002 also constituting machine-readable storage media. The software 1022 may further be transmitted or received over a network 1020 via the network interface card 1008.

FIG. 11 depicts a flow diagram illustrating a method 1100 for implementing consumer data validation, matching, and merging across tenants with optional verification prompts utilizing blockchain technologies in conjunction with a cloud based computing environment such as a database system implementation supported by a processor and a memory to execute such functionality to provide cloud based on-demand functionality to users, customers, and subscribers.

Method 1100 may be performed by processing logic that may include hardware (e.g., circuitry, dedicated logic, programmable logic, microcode, etc.), software (e.g., instructions run on a processing device) to perform various operations such as operating, defining, declaring, associating, writing, receiving, retrieving, adding, transacting, training, distributing, processing, transmitting, analyzing, triggering, pushing, recommending, parsing, persisting, exposing, loading, generating, storing, maintaining, creating, returning, presenting, interfacing, communicating, querying, providing, determining, displaying, updating, sending, etc., in pursuance of the systems and methods as described herein. For example, the hosted computing environment 111, the blockchain services interface 1150, and its database system 130 as depicted at FIG. 1, et seq., and other systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 1100 depicted at FIG. 11, at block 1105, processing logic operates multiple cloud platforms on behalf of a plurality of merchants, in which each of the multiple cloud platforms store customer records on behalf of the plurality of merchants.

At block 1110, processing logic retrieves a first customer record associated with a first tenant of the host organization using one of the multiple cloud platforms.

At block 1115, processing logic retrieves a second customer record for comparison with the first customer record, in which the second customer record is either a customer record from any of the multiple cloud platforms which is associated with a second tenant of the host organization or a customer record associated with the first tenant from a different one of the multiple cloud platforms.

At block 1120, processing logic determines at least a partial match exists for the first customer record and the second customer record and generating a candidate record with a proposed data merge of the first and second customer records.

At block 1125, processing logic creates a new global ID for a user represented by the generated candidate record.

At block 1130, processing logic issues a transaction to the blockchain with a new asset embodying the candidate record.

At block 1135, processing logic subjects the new asset to consensus by one of: (i) the user represented by the candidate record, (ii) the first tenant, (iii) the second tenant, or any combination thereof.

According to another embodiment, method 1100 further includes: triggering a notification to a user device associated with the user represented by the generated candidate record prompting the user to self identify and verify information from the candidate record using a zero knowledge proof protocol based challenge transmitted to the user device associated with the user represented by the generated candidate record.

According to another embodiment, method 1100 further includes: transmitting a notification to the user device prompting an unverified customer represented by the candidate record to provide validation information to the host organization responsive to the notification via a zero knowledge challenge.

According to another embodiment of method 1100, prompting the unverified customer to provide validation information includes requesting the unverified customer to provide one or more of: a first and last name; an email address; a cellular telephone number; a biometric fingerprint scan; a biometric retina scan; and in which the validation information provided by the unverified customer is associated with the new global ID written onto the blockchain as part of new validated and merged candidate record.

According to another embodiment of method 1100, prompting the unverified customer to provide validation information includes requesting express consent from the unverified customer to merge first customer record and the second candidate record into a new validated and merged candidate record; and in which the method further includes writing the new global ID and a profile for the user onto the blockchain as part of new validated and merged candidate record permanently and uniquely identifying the user represented by the new validated and merged candidate record.

According to another embodiment of method 1100, prompting the unverified customer to provide validation information includes requesting express consent from the unverified customer to merge first customer record and the second candidate record into a new validated and merged candidate record; and in which the method further includes: (i) writing the express consent onto the blockchain associated with the new validated and merged candidate record stored by the blockchain; (ii) writing the express consent into a local view of the first customer record maintained by the first tenant of the host organization; and (iii) writing the express consent into a local view of the second customer record maintained by any tenant of the host organization.

According to another embodiment, method 1100 further includes: matching the transaction issued to the blockchain with one of a plurality of enumerated transaction types; triggering a smart contract to execute based on an associated smart contract for the matched transaction type; and executing the smart contract to validate the transaction issued to the blockchain, in which executing the smart contract includes transmitting notifications to the first tenant and the second tenant and to the user represented by the candidate record soliciting validation of the generated candidate record.

According to another embodiment of method 1100, the blockchain rejects the transaction for lack of consensus based on any of the first tenant or the second tenant or the user invalidating the candidate record.

According to another embodiment of method 1100, each of the first and second tenants maintain a local view of customer records within one or more database systems separate from data stored on the blockchain; in which the blockchain rejects the transaction based on the user invalidating the candidate record; and in which the first tenant or the second tenant or both the first tenant and the second tenant adopts the candidate record by updating the local view for the respective first or second tenant within the one or more database systems.

According to another embodiment of method 1100, each of the first and second tenants maintain a local view of customer records within one or more database systems separate from data stored on the blockchain; in which the blockchain rejects the transaction based on the second tenant of the host organization invalidating the candidate record; and in which the first tenant adopts the candidate record by updating the local view of the first tenant within the one or more database systems.

According to another embodiment of method 1100, each of the first and second tenants maintain a local view of customer records within one or more database systems separate from data stored on the blockchain; in which the blockchain attains consensus for the transaction and adds a new block to the blockchain having an asset with payload data recording the candidate record; in which the first tenant adopts the candidate record by updating the local view of the first tenant within the one or more database systems; and in which the second tenant rejects the candidate record and does not update the second tenant's local view within the one or more database systems.

According to another embodiment, method 1100 further includes: transmitting a notification to the user device associated with the user inviting the user to create a new single sign-on ID and profile usable to authenticate with any one of the tenants which utilize the multiple cloud platforms; writing the new single sign-on ID and profile for the user onto the blockchain concurrent with or subsequent to the candidate record being transacted onto the blockchain pursuant to successfully attaining consensus; and in which the new single sign-on ID and profile is recorded within an asset written to the blockchain as the new global ID for the user represented by the candidate record permanently and uniquely associating the candidate record with the new global ID and profile for the user.

According to another embodiment of method 1100, the new global ID written onto the blockchain uniquely identifies the user represented by the candidate record to each of the first and second tenant organizations amongst any of the multiple cloud platforms operated by the host organization on behalf of the plurality of merchants which are tenants of the host organization.

According to another embodiment of method 1100, operating the multiple cloud platforms on behalf of the plurality of merchants includes: operating a service cloud platform at the host organization; operating a commerce cloud platform at the host organization; operating a sales cloud platform at the host organization; operating a service cloud platform at the host organization; operating a marketing cloud platform at the host organization; operating a MuleSoft cloud platform at the host organization; operating a blockchain services interface at the host organization communicatively interfacing tenants with one or more internally or externally hosted blockchains; operating a query interface at the host organization communicatively interfacing tenants with internally hosted host org data stored upon database systems of the host organization; operating an external cloud interface at the host organization communicatively interfacing tenants with externally hosted cloud data maintained by an entity other than the host organization.

According to a particular embodiment, there is a non-transitory computer-readable storage medium having instructions stored thereupon that, when executed by a processor of a system having at least a processor and a memory therein, the instructions cause the system to perform operations including: operating multiple cloud platforms on behalf of a plurality of merchants, in which each of the multiple cloud platforms store customer records on behalf of the plurality of merchants; retrieving a first customer record associated with a first tenant of the host organization using one of the multiple cloud platforms; retrieving a second customer record for comparison with the first customer record, in which the second customer record is either a customer record from any of the multiple cloud platforms which is associated with a second tenant of the host organization or a customer record associated with the first tenant from a different one of the multiple cloud platforms; determining at least a partial match exists for the first customer record and the second customer record and generating a candidate record with a proposed data merge of the first and second customer records; creating a new global ID for a user represented by the generated candidate record; issuing a transaction to the blockchain with a new asset embodying the candidate record; and subjecting the new asset to consensus by one of: (i) the user represented by the candidate record, (ii) the first tenant, (iii) the second tenant, or any combination thereof.

Figure 12:
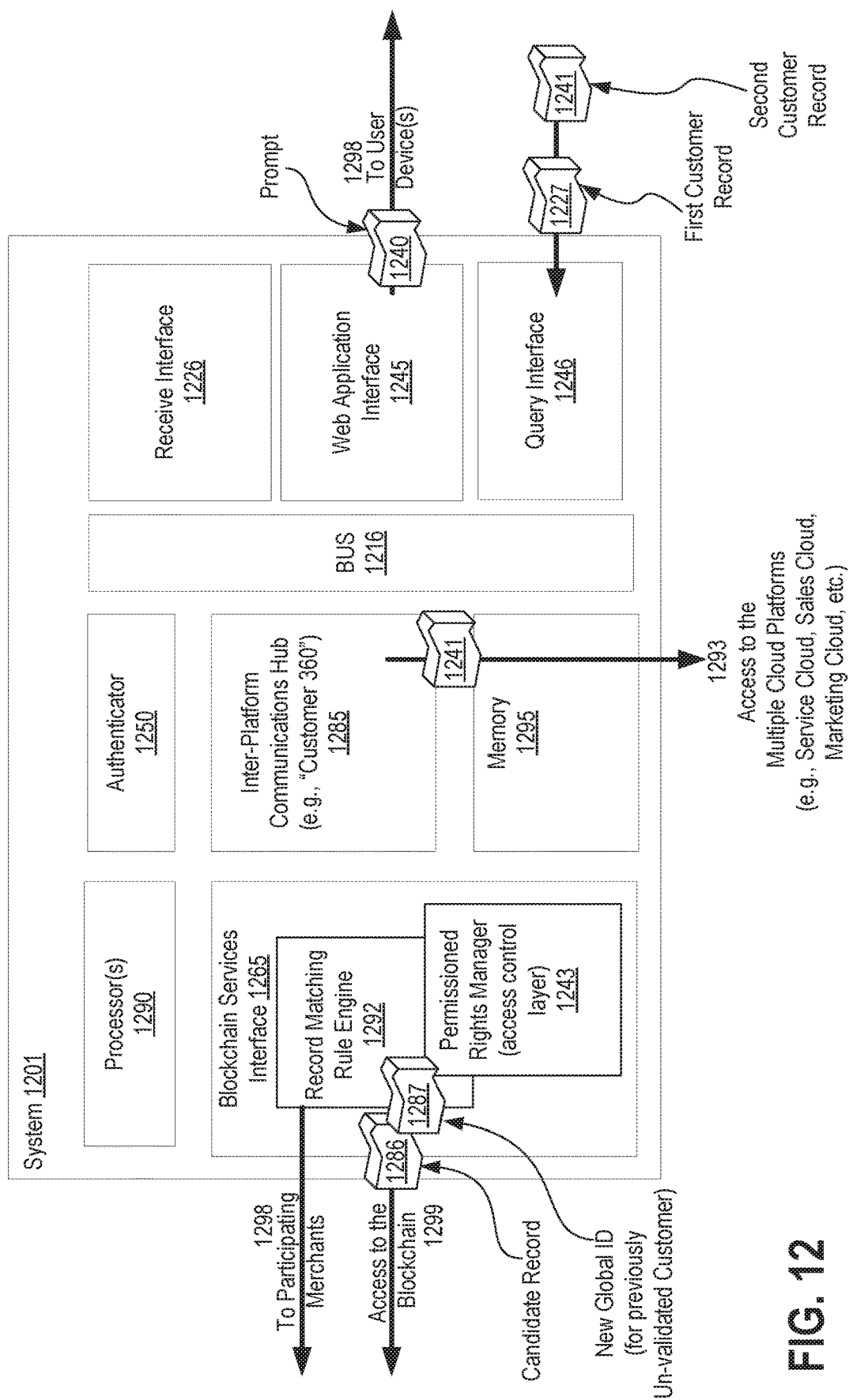
FIG. 12 shows a diagrammatic representation of a system within which embodiments may operate, be installed, integrated, or configured, in accordance with one embodiment.

FIG. 12 shows a diagrammatic representation of a system 1201 within which embodiments may operate, be installed, integrated, or configured. In accordance with one embodiment, there is a system 1201 having at least a processor 1290 and a memory 1295 therein to execute implementing application code for the methodologies as described herein. Such a system 1201 may communicatively interface with and cooperatively execute with the benefit of a hosted computing environment, such as a host organization, a multi-tenant environment, an on-demand service provider, a cloud based service provider, a client-server environment, etc.

According to the depicted embodiment, the system 1201, which may operate within a host organization, includes the processor 1290 and the memory 1295 to execute instructions at the system 1201. According to such an embodiment, the processor 1290 is to execute a "Customer 360" inter-platform communications hub 1285 on behalf of a plurality of merchants 1298, in which the "Customer 360" inter-platform communications hub 1285 provides at least an inter-communications framework between multiple cloud platforms of the host organization on behalf of the plurality of merchants. Such tenants can identify which cloud platforms they utilize and then cross link their data sets amongst those cloud platforms, making data stored within each platform accessible to other cloud platforms without necessitating copying, duplicating, or otherwise replicating the data amongst the cloud platforms.

According to such an embodiment, the "Customer 360" inter-platform communications hub 1285 of the system 1201 provides a communications interface (executed via the processor of the system 1201) to multiple cloud platforms 1293 operated by the host organization on behalf of a plurality of participating merchants 1298, in which each of the multiple cloud platforms 1293 store customer records on behalf of the plurality of merchants 1298. The system further implements a query interface 1246 executed by the processor of the system 1201 to retrieve a first customer record 1227 associated with a first tenant of the host organization using one of the multiple cloud platforms 1293; in which the query interface 1246 is to further retrieve a second customer record 1241 for comparison with the first customer record 1227, in which the second customer record 1241 is either a customer record from any of the multiple cloud platforms which is associated with a second tenant of the host organization or a customer record associated with the first tenant from a different one of the multiple cloud platforms. The processor 1290 of the system is to further execute a record matching rule engine 1292 to determine at least a partial match exists for the first customer record 1227 and the second customer record 1241 and in which the processor 1290 of the system 1201 is to further execute instructions stored in the memory 1295 to generate a candidate record 1286 with a proposed data merge of the first and second customer records 1227 and 1241. According to such an embodiment, the record matching rule engine 1292 is further to create a new global ID 1287 for a user represented by the generated candidate record. In such a system 1201, the processor is to further execute a blockchain services interface 1265 to issue a transaction to the blockchain with a new asset embodying the candidate record 1286, which then in turn causes the new asset to be subjected to consensus at the blockchain by one of: (i) the user represented by the candidate record 1286, (ii) the first tenant, (iii) the second tenant, or any combination thereof.

According to such an embodiment of the system 1201, the "Customer 360" inter-platform communications hub 1285 may further trigger notifications to the user or to clients corresponding to the first and second tenants soliciting their consensus for the data merge. Alternatively, the transaction issued to the blockchain may have a transaction type which is previously associated with a smart contract via a transaction type for the transaction, and when the transaction hits the blockchain, the smart contract will trigger to execute and within the smart contract executing code will issue notifications to the user or to the client tenant organization soliciting their approval for the data merge and thus gaining their consensus for the blockchain transaction, for instance, by issuing prompts 1240 to the user device 1298 associated with the user or the clients from the web application interface 1245.

According to such an embodiment of the system 1201, the receive interface 1226 is to receive consent from the user as well as receive confirmation and validation data of the user's identity in fulfillment of the proposed data merge of the two customer records matched by the record matching rule engine 1292 of the system 1201.

According to another embodiment of the system 1201, there is a blockchain services interface 1265 to interact with and provide access to the blockchain 1299. The permissioned rights manager 1243 provides an access control layer for a permissioned blockchain where necessary in support of the described embodiments, for example, when customer records are stored on a permissioned blockchain rather than on a public or private blockchain.

According to another embodiment of the system 1201, the receive interface 1226 communicates with a user client device 1298 remote from the system and communicatively links the user device with the system via a public Internet. According to such an embodiment, the system operates at a host organization as a cloud based service provider to the user device 1299; in which the cloud based service provider hosts a receive interface 1226 exposed to the user client device via the public Internet, and further in which the receive interface receives inputs from the user device as a request for services from the cloud based service provider.

Bus 1216 interfaces the various components of the system 1201 amongst each other, with any other peripheral(s) of the system 1201, and with external components such as external network elements, other machines, client devices, cloud computing services, etc. Communications may further include communicating with external devices via a network interface over a LAN, WAN, or the public Internet. Authenticator 1250 provides authentication services for users or tenants attempting to "log in" or otherwise access restricted non-public data applications, and services of the host organization.

None of the claims in the are intended to invoke paragraph six of 35 U.S.C. § 112 unless the exact words "means for" are followed by a participle. While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method performed by a system of a host organization, the system having a processor and a memory therein, wherein the method comprises:
   operating multiple cloud platforms on behalf of a plurality of merchants, wherein each of the multiple cloud platforms store customer records on behalf of the plurality of merchants;
   retrieving a first customer record associated with a first tenant of the host organization using one of the multiple cloud platforms;
   retrieving a second customer record for comparison with the first customer record, wherein the second customer record is either a customer record from any of the multiple cloud platforms which is associated with a second tenant of the host organization or a customer record associated with the first tenant from a different one of the multiple cloud platforms;
   determining at least a partial match exists for the first customer record and the second customer record and generating a candidate record with a proposed data merge of the first and second customer records;
   creating a new global ID for a user represented by the generated candidate record;
   issuing a transaction to the blockchain with a new asset embodying the candidate record; and
   subjecting the new asset to consensus by one of: (i) the user represented by the candidate record, (ii) the first tenant, (iii) the second tenant, or any combination thereof.

2. The method of claim 1, further comprising:
   triggering a notification to a user device associated with the user represented by the generated candidate record prompting the user to self identify and verify information from the candidate record using a zero knowledge proof protocol based challenge transmitted to the user device associated with the user represented by the generated candidate record.

3. The method of claim 1, further comprising:
   transmitting a notification to the user device prompting an unverified customer represented by the candidate record to provide validation information to the host organization responsive to the notification via a zero knowledge challenge.

4. The method of claim 3, wherein prompting the unverified customer to provide validation information includes requesting the unverified customer to provide one or more of:
   a first and last name;
   an email address;
   a cellular telephone number;
   a biometric fingerprint scan;
   a biometric retina scan; and
   wherein the validation information provided by the unverified customer is associated with the new global ID written onto the blockchain as part of new validated and merged candidate record.

5. The method of claim 4:
   wherein prompting the unverified customer to provide validation information includes requesting express consent from the unverified customer to merge first customer record and the second candidate record into a new validated and merged candidate record; and
   wherein the method further comprises writing the new global ID and a profile for the user onto the blockchain as part of new validated and merged candidate record permanently and uniquely identifying the user represented by the new validated and merged candidate record.

6. The method of claim 4:
   wherein prompting the unverified customer to provide validation information includes requesting express consent from the unverified customer to merge first customer record and the second candidate record into a new validated and merged candidate record; and
   wherein the method further comprises:
   (i) writing the express consent onto the blockchain associated with the new validated and merged candidate record stored by the blockchain;
   (ii) writing the express consent into a local view of the first customer record maintained by the first tenant of the host organization; and
   (iii) writing the express consent into a local view of the second customer record maintained by any tenant of the host organization.

7. The method of claim 1, further comprising:
   matching the transaction issued to the blockchain with one of a plurality of enumerated transaction types;
   triggering a smart contract to execute based on an associated smart contract for the matched transaction type; and
   executing the smart contract to validate the transaction issued to the blockchain, wherein executing the smart contract includes transmitting notifications to the first tenant and the second tenant and to the user represented by the candidate record soliciting validation of the generated candidate record.

8. The method of claim 1, wherein the blockchain rejects the transaction for lack of consensus based on any of the first tenant or the second tenant or the user invalidating the candidate record.

9. The method of claim 1:
   wherein each of the first and second tenants maintain a local view of customer records within one or more database systems separate from data stored on the blockchain;
   wherein the blockchain rejects the transaction based on the user invalidating the candidate record; and
   wherein the first tenant or the second tenant or both the first tenant and the second tenant adopts the candidate record by updating the local view for the respective first or second tenant within the one or more database systems.

10. The method of claim 1:
    wherein each of the first and second tenants maintain a local view of customer records within one or more database systems separate from data stored on the blockchain;
    wherein the blockchain rejects the transaction based on the second tenant of the host organization invalidating the candidate record; and
    wherein the first tenant adopts the candidate record by updating the local view of the first tenant within the one or more database systems.

11. The method of claim 1:
    wherein each of the first and second tenants maintain a local view of customer records within one or more database systems separate from data stored on the blockchain;
    wherein the blockchain attains consensus for the transaction and adds a new block to the blockchain having an asset with payload data recording the candidate record;

wherein the first tenant adopts the candidate record by updating the local view of the first tenant within the one or more database systems; and wherein the second tenant rejects the candidate record and does not update the second tenant's local view within the one or more database systems.

12. The method of claim 1, further comprising:

transmitting a notification to the user device associated with the user inviting the user to create a new single sign-on ID and profile usable to authenticate with any one of the tenants which utilize the multiple cloud platforms;

writing the new single sign-on ID and profile for the user onto the blockchain concurrent with or subsequent to the candidate record being transacted onto the blockchain pursuant to successfully attaining consensus; and wherein the new single sign-on ID and profile is recorded within an asset written to the blockchain as the new global ID for the user represented by the candidate record permanently and uniquely associating the candidate record with the new global ID and profile for the user.

13. The method of claim 12:

wherein the new global ID written onto the blockchain uniquely identifies the user represented by the candidate record to each of the first and second tenant organizations amongst any of the multiple cloud platforms operated by the host organization on behalf of the plurality of merchants which are tenants of the host organization.

14. The method of claim 1, wherein operating the multiple cloud platforms on behalf of the plurality of merchants comprises:

operating a service cloud platform at the host organization;

operating a commerce cloud platform at the host organization;

operating a sales cloud platform at the host organization;

operating a service cloud platform at the host organization;

operating a marketing cloud platform at the host organization;

operating a MuleSoft cloud platform at the host organization;

operating a blockchain services interface at the host organization communicatively interfacing tenants with one or more internally or externally hosted blockchains;

operating a query interface at the host organization communicatively interfacing tenants with internally hosted host org data stored upon database systems of the host organization;

operating an external cloud interface at the host organization communicatively interfacing tenants with externally hosted cloud data maintained by an entity other than the host organization.

15. Non-transitory computer-readable storage media having instructions stored thereupon that, when executed by a processor of a system having at least a processor and a memory therein, the instructions cause the system to perform operations comprising:

operating multiple cloud platforms on behalf of a plurality of merchants, wherein each of the multiple cloud platforms store customer records on behalf of the plurality of merchants;

retrieving a first customer record associated with a first tenant of the host organization using one of the multiple cloud platforms;

retrieving a second customer record for comparison with the first customer record, wherein the second customer record is either a customer record from any of the multiple cloud platforms which is associated with a second tenant of the host organization or a customer record associated with the first tenant from a different one of the multiple cloud platforms;

determining at least a partial match exists for the first customer record and the second customer record and generating a candidate record with a proposed data merge of the first and second customer records;

creating a new global ID for a user represented by the generated candidate record;

issuing a transaction to the blockchain with a new asset embodying the candidate record; and subjecting the new asset to consensus by one of: (i) the user represented by the candidate record, (ii) the first tenant, (iii) the second tenant, or any combination thereof.

16. The non-transitory computer readable storage medium of claim 15, wherein the instructions when executed by the processor cause the system to perform operations further including:

triggering a notification to a user device associated with the user represented by the generated candidate record prompting the user to self identify and verify information from the candidate record using a zero knowledge proof protocol based challenge transmitted to the user device associated with the user represented by the generated candidate record.

17. The non-transitory computer readable storage medium of claim 15, wherein the instructions when executed by the processor cause the system to perform operations further including:

transmitting a notification to the user device prompting an unverified customer represented by the candidate record to provide validation information to the host organization responsive to the notification via a zero knowledge challenge.

18. The non-transitory computer readable storage medium of claim 15:

wherein prompting the unverified customer to provide validation information includes requesting express consent from the unverified customer to merge first customer record and the second candidate record into a new validated and merged candidate record;

wherein the method further comprises writing the new global ID and a profile for the user onto the blockchain as part of new validated and merged candidate record permanently and uniquely identifying the user represented by the new validated and merged candidate record.

19. The non-transitory computer readable storage medium of claim 18:

wherein prompting the unverified customer to provide validation information includes requesting express consent from the unverified customer to merge first customer record and the second candidate record into a new validated and merged candidate record; and wherein the instructions when executed by the processor cause the system to perform operations further including:

(i) writing the express consent onto the blockchain associated with the new validated and merged candidate record stored by the blockchain;
(ii) writing the express consent into a local view of the first customer record maintained by the first tenant of the host organization; and
(iii) writing the express consent into a local view of the second customer record maintained by any tenant of the host organization.

20. A system to execute at a host organization, wherein the system comprises:
   a memory to store instructions;
   a processor to execute instructions;
   wherein the processor is to execute a communications interface to multiple cloud platforms operated by the host organization on behalf of a plurality of merchants, wherein each of the multiple cloud platforms store customer records on behalf of the plurality of merchants;
   a query interface executed by the processor of the system to retrieve a first customer record associated with a first tenant of the host organization using one of the multiple cloud platforms;
   wherein the query interface is to further retrieve a second customer record for comparison with the first customer record, wherein the second customer record is either a customer record from any of the multiple cloud platforms which is associated with a second tenant of the host organization or a customer record associated with the first tenant from a different one of the multiple cloud platforms;
   wherein the processor is to further execute a record matching rule engine to determine at least a partial match exists for the first customer record and the second customer record and wherein the processor is to further execute instructions stored in the memory to generate a candidate record with a proposed data merge of the first and second customer records;
   wherein the record matching rule engine is further to create a new global ID for a user represented by the generated candidate record;
   wherein the processor is to further execute a blockchain services interface to issue a transaction to the blockchain with a new asset embodying the candidate record; and
   wherein the new asset is subjected to consensus at the blockchain by one of: (i) the user represented by the candidate record, (ii) the first tenant, (iii) the second tenant, or any combination thereof.

21. The system of claim 20, wherein the processor of the system is further configured to execute instructions to cause the system to perform operations including:
   triggering a notification to a user device associated with the user represented by the generated candidate record prompting the user to self identify and verify information from the candidate record using a zero knowledge proof protocol based challenge transmitted to the user device associated with the user represented by the generated candidate record.

22. The system of claim 20, wherein the processor of the system is further configured to execute instructions to cause the system to perform operations including:
   transmitting a notification to the user device prompting an unverified customer represented by the candidate record to provide validation information to the host organization responsive to the notification via a zero knowledge challenge.

* * * * *